(12) United States Patent
Hansen et al.

(10) Patent No.: US 6,378,060 B1
(45) Date of Patent: Apr. 23, 2002

(54) SYSTEM TO IMPLEMENT A CROSS-BAR SWITCH OF A BROADBAND PROCESSOR

(75) Inventors: Craig Hansen, Los Altos; Bruce Bateman, Fremont; John Moussouris, Palo Alto, all of CA (US)

(73) Assignee: Microunity Systems Engineering, Inc., Santa Clara, CA (US)

( * ) Notice: Subject to any disclaimer, the term of this patent is extended or adjusted under 35 U.S.C. 154(b) by 0 days.

(21) Appl. No.: 09/502,856

(22) Filed: Feb. 11, 2000

Related U.S. Application Data

(63) Continuation-in-part of application No. 09/382,402, filed on Aug. 24, 1999, now Pat. No. 6,295,599, which is a continuation-in-part of application No. 09/169,963, filed on Oct. 13, 1998, now Pat. No. 6,006,318.

(60) Provisional application No. 60/119,841, filed on Feb. 12, 1999, and provisional application No. 60/097,635, filed on Aug. 24, 1998.

(51) Int. Cl.[7] .............................................. G06F 13/00
(52) U.S. Cl. ............................ 712/32; 712/28; 712/23; 712/34; 711/209
(58) Field of Search ............................. 712/28, 23, 31, 712/32, 34, 35, 11, 16; 710/132, 127, 131; 340/825.79; 711/202, 208, 209

(56) References Cited

U.S. PATENT DOCUMENTS 4,451,917 A * 5/1984 DeCoursey .................. 370/518

(List continued on next page.)

OTHER PUBLICATIONS

Matthew K. Farrens, Pius Ng, & Phil Nico, "A Comparison of Superscalar & Decoupled Access/Execute Architectures"; Department of Computer Science, University of California—Davis, Davis, CA 95616; Appears in Proceeding of the Twenty–Sixth Annual International Symposium on Microarchitecture, 12/93; http://elysium.c.s.ucdavis.edu/~nico/publications/micro93.ps.

(List continued on next page.)

*Primary Examiner*—Mark Zimmerman
*Assistant Examiner*—Mackly Monestime
(74) *Attorney, Agent, or Firm*—McDermott, Will & Emery; James E. Eakin; Leonard T. Guzman

(57) ABSTRACT

The present invention provides a cross-bar circuit that implements a switch of a broadband processor. In an exemplary embodiment, the present invention provides a cross-bar circuit that, in response to partially-decoded instruction information and in response to datapath information, (1) allows any bit from a $2^n$-bit (e.g. 256-bit) input source word to be switched into any bit position of a $2^m$-bit (e.g. 128-bit) output destination word and (2) provides the ability to set-to-zero any bit in said $2^m$-bit output destination word. The cross-bar circuit includes: (1) a switch circuit which includes $2^m$ $2^n$:1 multiplexor circuits, where each of the $2^n$:1 multiplexor circuits (a) has a unique n-bit (e.g. 8-bit) index input, one disable input, and a $2^n$-bit wide source input, (b) receives (i) an n-bit index at the n-bit index input, (ii) a disable bit at the disable input, and (iii) the $2^n$-bit input source word at the $2^n$-bit wide source input, and (c) decodes the n-bit index either (i) to select and output as an output destination bit one bit from the $2^n$-bit input source word if the disable bit has a logic low value or (ii) outputs a logic low as the output destination bit if the disable bit has a logic high value; (2) a cache memory that (a) has $2^m$ cache datapath inputs and $2^m$ cache index inputs, (b) receives (i) the datapath information on the $2^m$ cache datapath inputs and (ii) $2^m$ n-bit indexes on the $2^m$ cache index inputs, (c) provides a first set of the n-bit indexes for the switch circuit, and (d) includes a small tightly coupled memory array that stores p (e.g. eight) entries of $2^m$ n-bit indexes for the switch circuit, where the cache memory is logically coupled to the switch circuit; and (3) a control circuit that (a) has a plurality (e.g. 100) of control inputs, (b) receives the partially-decoded instruction information on the plurality of control inputs, (c) provides a second set of the n-bit indexes for the switch circuit, and (d) provides the disable bits for the switch circuit, where the control circuit is logically coupled to the switch circuit and to the cache memory.

13 Claims, 28 Drawing Sheets

U.S. PATENT DOCUMENTS

| | | | |
|---|---|---|---|
| 4,661,814 A | * 4/1987 | Granz et al. | 340/825.79 |
| 4,785,393 A | 11/1988 | Chu et al. | |
| 4,914,630 A | * 4/1990 | Fujishima et al. | 365/189.04 |
| 5,031,135 A | 7/1991 | Patel et al. | |
| 5,040,149 A | * 8/1991 | Ebihara et al. | 365/189.05 |
| 5,481,686 A | 1/1996 | Dockser | |
| 5,724,330 A | * 3/1998 | Kobayashi et al. | 369/59 |
| 5,740,093 A | 4/1998 | Sharangpani | |
| 5,742,840 A | 4/1998 | Hansen et al. | |
| 5,794,003 A | 8/1998 | Sachs | |
| 5,794,060 A | 8/1998 | Hansen et al. | |
| 5,794,061 A | 8/1998 | Hansen et al. | |
| 5,809,321 A | 9/1998 | Hansen et al. | |
| 5,822,603 A | 10/1998 | Hansen et al. | |
| 5,931,944 A | 8/1999 | Ginosar et al. | |

OTHER PUBLICATIONS

Dean M. Tullsen, Susan J. Eggers, & Henry M. Levy; "Simultaneous Multithreading: Maximizing On–Chip Parallelism"; Department of Computer Science & Engineering; University of Washington, Seattle, WA 98195; http://www.cs.washington.edu/research/smt/papers/ISCA95.ps.

Jack Lo; Simultaneous Multithreating Project; http://www.cs.washington.edu/research/smt.

Craig Hansen; "Architecture of a Broadband Mediaprocessor"; Text of a paper presented at COMPCON96, 2/25–29/96; Copyright 1996; Institute of Electrical & Electronics Engineers; pp. 1–8.

Eric Rice, Richard Hughey; "Multiprecision Division on an 8–bit processor"; Department of Computer Engineering, University of California, Santa Cruz, CA 95064; 1063–6889/97; 1997 IEEE; pp. 74–81.

* cited by examiner

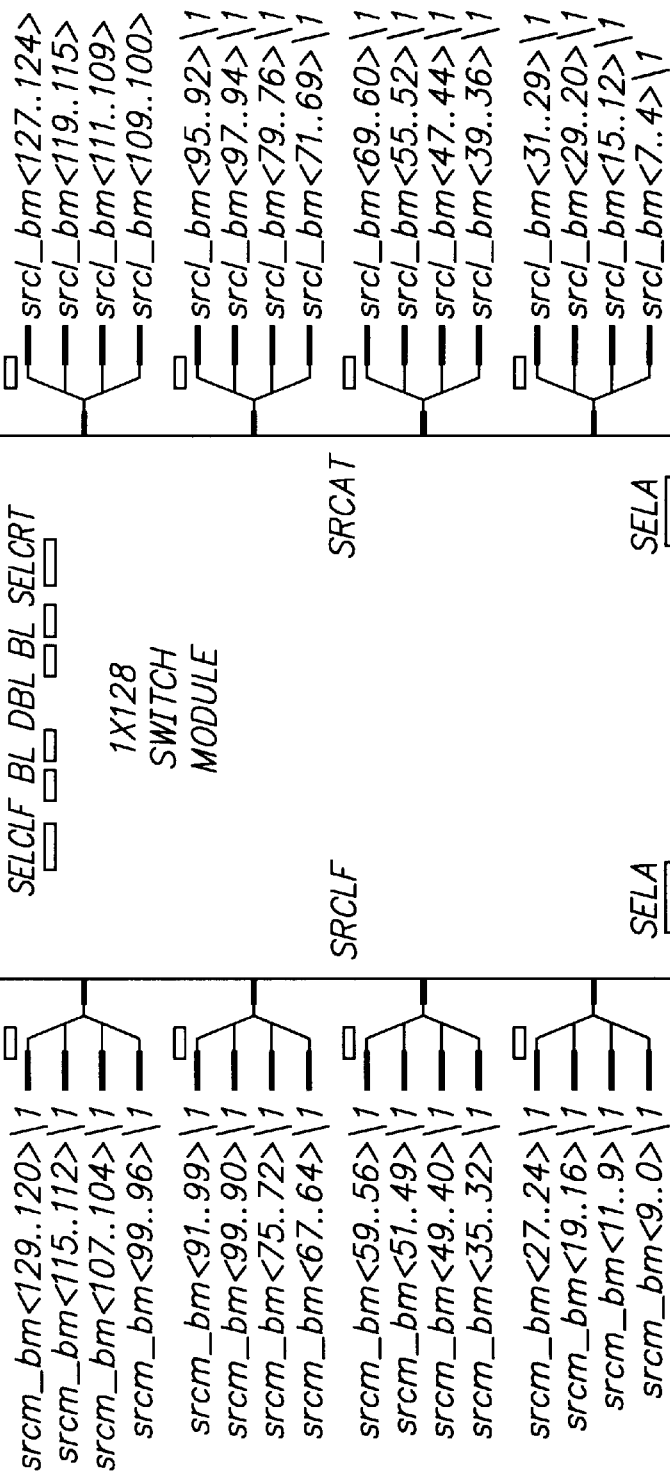

| long name | assembler code | OPNDS DMCL | size S:D |
|---|---|---|---|
| Crossbar rotate right | X.ROTR.size rd=rc,rb | d_cb | 1:1 |
| Crossbar shift right | X.SHR.size rd=rc,rb | d_cb | 1:1 |
| Crossbar unsigned shift right | X.USHR.size rd=rc,rb | d_cb | 1:1 |
| Crossbar shift right merge | X.SHRM.size rd@rc,rb | ddcb | 1:1 |
| Crossbar rotate left | X.ROTL.size rd=rc,rb | d_cb | 1:1 |
| Crossbar shift left | X.SHL.size rd=rc,rb | d_cb | 1:1 |
| Crossbar shift left unsigned overflow | X.SHLUO.size rd=rc,rb | d_cb | 1:1 |
| Crossbar shift left overflow | X.SHLO.size rd=rc,rb | d_cb | 1:1 |
| Crossbar shift left merge | X.SHLM.size rd@rc,rb | ddcb | 1:1 |
| Crossbar rotate right immediate | X.ROTR.I.size rd=rc,shift | d_cl | 1:1 |
| Crossbar shift right immediate | X.SHR.I.size rd=rc,shift | d_cl | 1:1 |
| Crossbar unsigned shift right immediate | X.USHR.I.size rd=rc,shift | d_cl | 1:1 |
| Crossbar shift right merge immediate | X.SHRM.I.size rd@rc,shift | ddcl | 1:1 |
| Crossbar shift left immediate | X.SHL.I.size rd=rc,shift | d_cl | 1:1 |
| Crossbar shift left overflow immediate | X.SHLO.I.size rd=rc,shift | d_cl | 1:1 |
| Crossbar shift left unsigned overflow | X.SHLUO.I.size rd=rc,shift | d_cl | 1:1 |
| Crossbar shift left merge immediate | X.SHLM.I.size rd@rc,shift | ddcl | 1:1 |
| Crossbar withdraw immediate | X.WTH.I.size rd=rc,lshift,lsize | d_cl | 1:1 |
| Crossbar unsigned withdraw immediate | X.UWTH.I.size rd=rc,lshift,lsize | d_cl | 1:1 |
| Crossbar deposit immediate | X.DEP.I.size rd=rc,lshift,lsize | d_cl | 1:1 |
| Crossbar unsigned deposit immediate | X.UDEP.I.size rd=rc,lshift,lsize | d_cl | 1:1 |
| Crossbar merge deposit immediate | X.MDEP.I.size rd@rc,lshift,lsize | ddcl | 1:1 |

FIG. 8A

| FIG. 8A | FIG. 8B |
|---|---|
| FIG. 8C | FIG. 8D |

FIG. 8

| MMasksel | Mask-size | LMasksel | lconst0 | lconst1 | laddam | lshl | lshr | IndBitsel | Enable | Merge | AUX Proc |
|---|---|---|---|---|---|---|---|---|---|---|---|
| s1=size-1 | | | | | | | | | | | |
| s1-rb | size | 0 | | | rb | 0 | 0 | s1? lmainsel:lshrsel | 1 | 1 | |
| s1-rb | size | 0 | s1 | | rb | 0 | 0 | s1? lmainsel:lshrsel | 1 | 1 | |
| s1-rb | size | 0 | | | rb | 0 | 0 | s1? lmainsel:lshrsel | ~MMask | | |
| s1-rb | size | 0 | | | rb | 0 | 0 | s1? lmainsel:lshrsel | 1 | MMask | |
| s1 | size | rb | | | -rb | 0 | 0 | s1? lmainsel:lshrsel | 1 | | |
| s1 | size | rb | | | -rb | 0 | 0 | s1? lmainsel:lshrsel | ~Lmask | | UOVFW |
| s1 | size | rb | | | -rb | 0 | 0 | s1? lmainsel:lshrsel | ~Lmask | | OVFW |
| s1 | size | rb | | | -rb | 0 | 0 | s1? lmainsel:lshrsel | ~Lmask | | |
| s1 | size | rb | | | -rb | 0 | 0 | s1? lmainsel:lshrsel | 1 | LMask | |
| s1-rb | size | 0 | | | rb | 0 | 0 | s1? lmainsel:lshrsel | 1 | | |
| s1-rb | size | 0 | s1 | | rb | 0 | 0 | s1? lmainsel:lshrsel | 1 | | |
| s1-rb | size | 0 | | | rb | 0 | 0 | s1? lmainsel:lshrsel | ~MMask | | |
| s1-rb | size | 0 | | | rb | 0 | 0 | s1? lmainsel:lshrsel | 1 | MMask | |
| s1 | size | rb | | | -rb | 0 | 0 | s1? lmainsel:lshrsel | 1 | | |
| s1 | size | rb | | | -rb | 0 | 0 | s1? lmainsel:lshrsel | ~Lmask | | UOVFW |
| s1 | size | rb | | | -rb | 0 | 0 | s1? lmainsel:lshrsel | ~Lmask | | OVFW |
| s1 | size | rb | | | -rb | 0 | 0 | s1? lmainsel:lshrsel | ~Lmask | | |
| s1 | size | rb | | | -rb | 0 | 0 | s1? lmainsel:lshrsel | 1 | LMask | |
| ls1=lsize-1 | | | | | | | | | | | |
| ls1 | size | 0 | | | lshift | 0 | 0 | s1? lmainsel:lshrsel | 1 | | |
| ls1 | size | 0 | | | lshift | 0 | 0 | s1? lmainsel:lshrsel | ~MMask | | |
| ls1+lshift | size | lshift | ls1 | | -lshift | 0 | 0 | s1? lmainsel:lshrsel | ~Lmask | | |
| ls1+lshift | size | lshift | | ls1 | -lshift | 0 | 0 | s1? lmainsel:lshrsel | ~(MMask\|ILMask) | | |
| ls1+lshift | size | lshift | | | -lshift | 0 | 0 | s1? lmainsel:lshrsel | 1 | MMask ILMask | |

FIG. 8B

| | | |
|---|---|---|
| Crossbar signed expand immediate | X.EXPAND.I.size rd=rc,shift | 1/2:1 d_cl |
| Crossbar unsigned expand immediate | X.UEXPAND.I.size rd=rc,shift | 1/2:1 d_cl |
| Crossbar signed expand | X.EXPAND.size rd=rc,rb | 1/2:1 d_cb |
| Crossbar unsigned expand | X.UEXPAND.size rd=rc,rb | 1/2:1 d_cb |
| Crossbar compress immediate | X.COMPRESS.I.size rd=rc,shift | 1:1/2 d_cl |
| Crossbar unsigned compress immediate | X.UCOMPRESS.I.size rd=rc,shift | 1:1/2 d_cl |
| Crossbar extract | X.EXTRACT ra=rd,rc,rb | (2-m):1 adcb |
| Crossbar signed extract immediate | X.EXTRACT.I.size.rnd rd=rc,rb,shift | 2:1 dcbl |
| Crossbar unsigned extract immediate | X.UEXTRACT.I.size.rnd rd=rc,rb,shift | 2:1 dcbl |
| Crossbar select byte | X.SELECT.8 ra=rd,rc,rb | adcb |
| Crossbar shuffle | X.SHUFFLE.256 rd=rc,rb,v,w,h | 256:128 dcbl |
| Crossbar shuffle | X.SHUFFLE.size rd=rcb,v,w | 1:1 d_bl |
| Crossbar swizzle | X.SWIZZLE rd=rc,lcopy,lswap | d_cl |
| Wide switch big-endian | W.SWITCH.B ra=rc,rd,rb | adb |
| Wide switch little-endian | W.SWITCH.L ra=rc,rd,rb | adb |

FIG. 8C

| hsize=size/2 hs1=size-1 | | | | | | | |
|---|---|---|---|---|---|---|---|
| hs1+shift | size | shift | hs1 | hs1 | -shift | 0 | 1 | s1? lmainsel:lshrsel | ~Lmask ~(MMask \|LMask) |
| hs1+shift | size | shift | | | -shift | 0 | 1 | s1? lmainsel:lshrsel | ~Lmask |
| hs1+rb | size | rb | hs1 | hs1 | -rb | 0 | 1 | s1? lmainsel:lshrsel | ~(MMask \|LMask) |
| hs1+rb | size | rb | | | -rb | 0 | 1 | s1? lmainsel:lshrsel | ~MMask |
| s1-shift | size/2 | 0 | s1 | s1 | shift | 1 | 0 | hs1? lmainsel:lshlsel | 1 |
| s1-shift | size/2 | 0 | | | shift | 1 | 0 | hs1? lmainsel:lshlsel | ~MMask |

***define fsize, gsize, spos, dpos, m, x by formulae in X.EXTRACT definition
***define s1=gsize-1

| fsize-1+dpos | gsize | dpos | fsize+ spos | fsize+ spos | spos-dpos | 1-(m or x) | 0 | s1? lmainsel:lshlsel | m?1 :(sign? ~Lmask: ~(MMask \|LMask)) |
| --- | --- | --- | --- | --- | --- | --- | --- | --- | --- |
| | | | | | | 0 | 0 | Select.8 | 1 |

***define x=log2(size), y=log2(v) codes symbol length, z=log2(w) #decks:
***h=1(0) selects high(low) 128 bits of the 256-bit shuffle

| | | | | 128*h | 8-y-z | z | (v-1)? lmainsel: ((256/w-1))? lshlsel: lshlsel) | 1 |
|---|---|---|---|---|---|---|---|---|
| | | | | | | | (~s1\|(v-1))? lmainsel: | |
| | | | | | x-y-z | z | ((size/w-1))? lshlsel: lshlsel) | 1 |
| 0 | 128 | 0 | lswap | lswap ^lswap | | | lmainsel | 1 |
| 0 | | | | | | | | 1 |

*FIG. 8D*

X.op.size     rd=rc,rb
rd=xopsize(rc,rb)
| 31 | 25 24 | 23 | 18 17 | 12 11 | 6 5 | 2 1 | 0 |
|---|---|---|---|---|---|---|---|
| XSHIFT | s | rd | | rc | rb | op | sz |
| 7 | 1 | 6 | | 6 | 6 | 4 | 2 |
lsize ← log(size)
s ← lsize$_2$
sz ← lsize$_{1..0}$
FIG. 9
X.EXTRACT     ra=rd,rc,rb
ra=xextract(rd,rc,rb)
| 31 | 24 23 | 18 17 | 12 11 | 6 5 | 0 |
|---|---|---|---|---|---|
| op | rd | rc | rb | ra | |
| 8 | 6 | 6 | 6 | 6 | |
FIG. 10A
| 31 | 24 23 | 16 15 14 13 12 11 10 9 8 | 0 |
|---|---|---|---|
| fsize | dpos | x s n m l rnd | gssp |
| 8 | 8 | 1 1 1 1 1 2 | 9 |
FIG. 10B
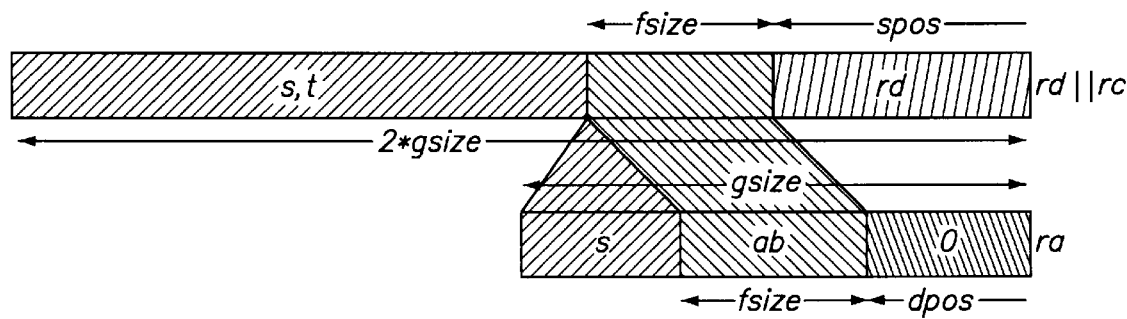
FIG. 10C
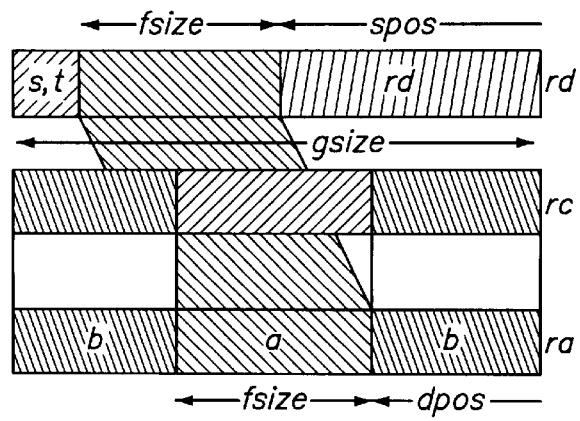
FIG. 10D

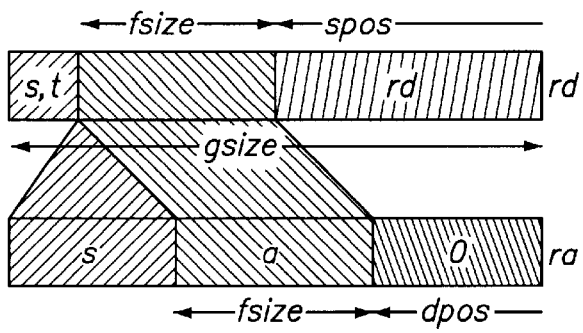
FIG. 10E
X.op.gsize      rd=rc,isize,ishift
rd=xopgsize(rc,isize,ishift)
| 31 | 26 25 24 23 | 18 17 | 12 11 | 6 5 | 0 |
|---|---|---|---|---|---|
| op | ih | rd | rc | gsfp | gsfs |
| 6 | 2 | 6 | 6 | 6 | 6 |
assert isize+ishift ≤ gsize
assert isize ≥ 1
$ih_0 \parallel gsfs \leftarrow 128-gsize+isize-1$
$ih_1 \parallel gsfp \leftarrow 128-gsize+ishift$
FIG. 11A
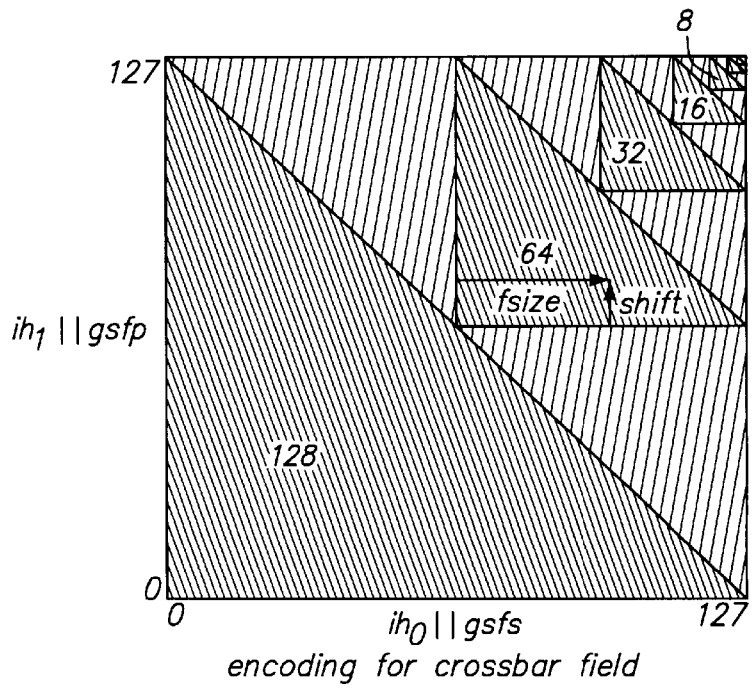
encoding for crossbar field
FIG. 11B

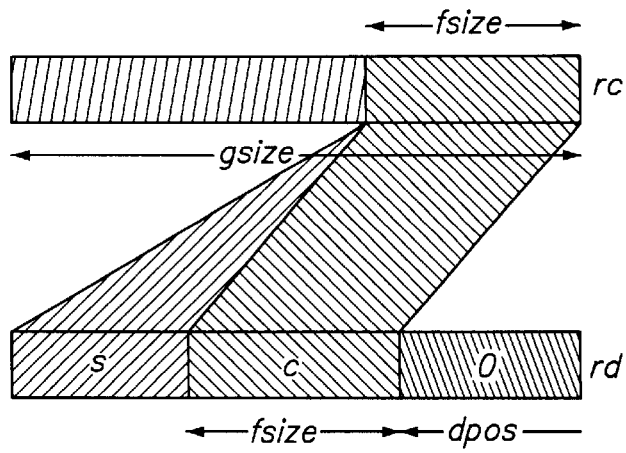
FIG. 11C
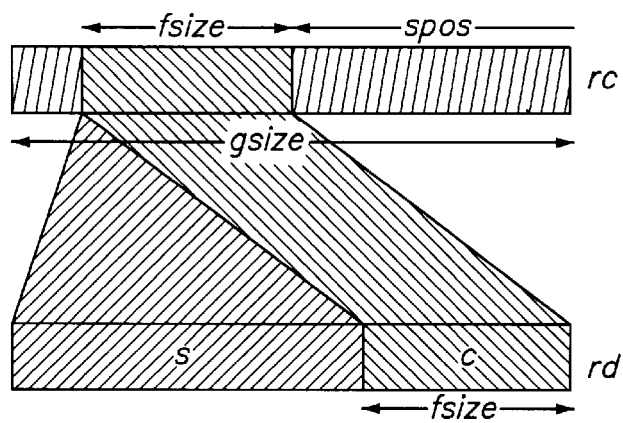
FIG. 11D
X.op.gsize   rd@rc,isize,ishift
rd=xopgsize(rd,rc,isize,ishift)
| 31 | 26 25 24 23 | 18 17 | 12 11 | 6 5 | 0 |
|---|---|---|---|---|---|
| op | ih | rd | rc | gsfp | gsfs |
| 6 | 2 | 6 | 6 | 6 | 6 |
assert isize+ishift ≤ gsize
assert isize ≥ 1
$ih_0$ || gsfs ← 128−gsize+isize−1
$ih_1$ || gsfp ← 128−gsize+ishift
FIG. 12A

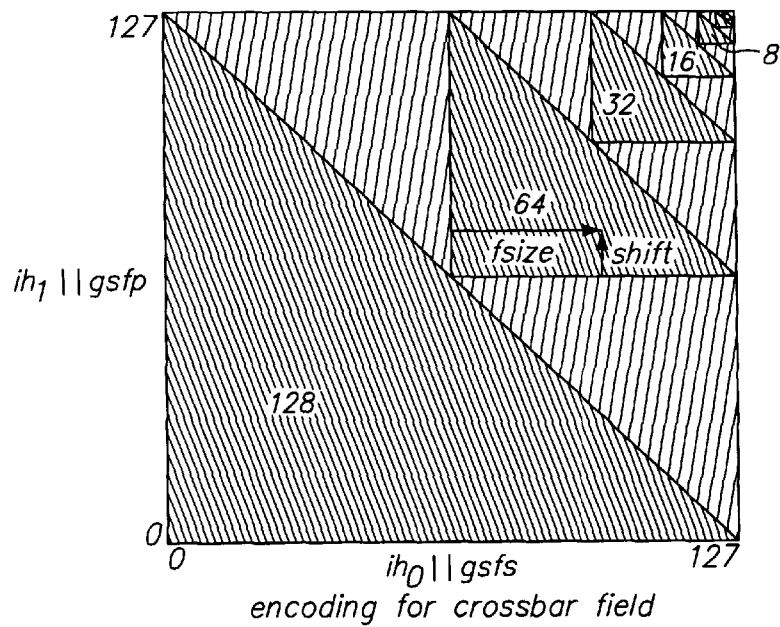
encoding for crossbar field
FIG. 12B
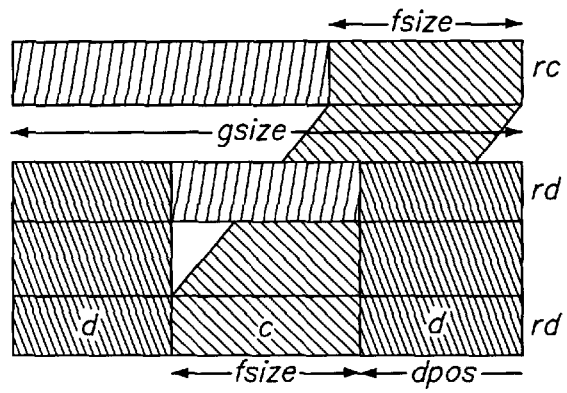
FIG. 12C
X.op.size    rd@rc,rb
rd=xopsize(rd,rc,rb)
| 31 | 25 24 | 23 | 18 17 | 12 11 | 6 5 | 2 1 0 |
|---|---|---|---|---|---|---|
| XSHIFT | s | rd | rc | rb | op | sz |
| 7 | 1 | 6 | 6 | 6 | 4 | 2 |
lsize ← log(size)
s ← lsize$_2$
sz ← lsize$_{1..0}$
FIG. 13

SYSTEM TO IMPLEMENT A CROSS-BAR SWITCH OF A BROADBAND PROCESSOR

RELATED APPLICATIONS

This application is related to Provisional Application No. 60/119,841, filed Feb. 12, 1999, and is a continuation-in-part of U.S. patent application Ser. No. 09/382,402, filed on Aug. 24, 1999, which claims benefit of Provisional Appln No. 60/097,635 filed Aug. 24, 1998, and a continuation-in-part of U.S. patent application Ser. No. 09/169,963, filed Oct. 13, 1998, now U.S. Pat. No. 6,006,318, which is in turn related to U.S. patent application Ser. No. 08/516,036, filed Aug. 16, 1995, now U.S. Pat. No. 5,742,840. The contents of Provisional Application No. 60/119,841, filed Feb. 12, 1999, are hereby incorporated by reference.

REFERENCES TO APPENDICES

All narrative material in the appendices as filed on Feb. 11, 2000, were incorporated into the specification on pages 31–68 of the specification. All graphical illustrations in the appendices as filed on Feb. 11, 2000, were incorporated into the drawings in FIGS. 8, 9, 10A, 10B, 10C, 10D, 10E, 11A, 11B, 11C, 11D, 12A, 12B, 12C, 13, 14, 15, 16A, 16B, 16C, 17, 18, and 19.

FIELD OF THE INVENTION

The present invention relates to cross-bar circuits, and particularly relates to a cross-bar circuit implementing a switch of a broadband processor.

BACKGROUND AND SUMMARY OF THE INVENTION

In digital processing systems, one of the basic operations is rearranging or copying portions of an operand. Prior art systems, such as current general purpose microprocessors (Pentium, MIPS, ARM, SPARC, PowerPC, etc.), implement this basic operation in various special circuits, such as shifters, rotators, field extractors, or byte permuters.

Digital processing is now being extended to new applications such as broadband processing in which very general rearrangements of bits are required to accomplish various sophisticated mathematical algorithms needed for encryption and error correction. Such digital processing requires switching circuits, cross-bar circuits, to help accomplish these algorithms. General switching requires a cross-bar circuit, which conventionally contains more transistors than the specialized shifters, rotator, etc. used in the prior art.

Prior art cross-bar circuits require far more bits of control to specify the mapping between the location of output operand bits and the input operand bits from which they are generated.

The present invention provides a cross-bar circuit that implements a switch of a broadband processor. The present invention describes a system and method for implementing switching operations that perform completely general permutations and copies at the individual bit level within large operands.

The present invention describes a system and method for reducing the transistor count, wire count, and area of a general cross-bar network down to levels comparable to what is achieved in more specialized circuits. This invention involves a novel combination of circuit techniques, including precharged dynamic multiplexors, ground selection, and pseudo-differential sensing against dummy bit lines, which have individually been practiced in digital logic and memory devices.

The present invention implements the system and method for utilizing wide operands further described in commonly-assigned U.S. patent application Ser. No. 09/382,402 to provide these control bits from a small cache memory physically located close to the cross-bar circuit.

The present invention also describes a system and method for utilizing the cross-bar circuits to perform conventional specialized operations as well. These operations have a great deal of redundancy in their control state. The present invention describes a system and method for generating the large number of control bits of the cross-bar circuit (e.g. typically more than 1,000 bits) from a much smaller number of control bits for conventional operations (e.g. typically fewer than 100 bits). This invention conserves the resources and delays that would otherwise be incurred in the use of the wide operand memory referred to in the previous paragraph.

The present invention describes a system and method to implement a cross-bar circuit, memory, and control of a switch of a broadband processor, that (1) requires (a) a small area of silicon, (b) very low power, (c) a small number of transistors, (d) a small number of wires, and (e) only two metal layers, (2) operates at a high speed, and (3) has high functionality.

In an exemplary embodiment, the present invention provides a cross-bar circuit that, in response to partially-decoded instruction information and in response to datapath information, (1) allows any bit from a $2^n$-bit (e.g. 256-bit) input source word to be switched into any bit position of a $2^m$-bit (e.g. 128-bit) output destination word and (2) provides the ability to set-to-zero any bit in said $2^m$-bit output destination word. The cross-bar circuit includes: (1) a switch circuit which includes $2^m$ $2^n$:1 multiplexor circuits, where each of the $2^n$:1 multiplexor circuits (a) has a unique n-bit (e.g. 8-bit) index input, one disable input, and a $2^n$-bit wide source input, (b) receives (i) an n-bit index at the n-bit index input, (ii) a disable bit at the disable input, and (iii) the $2^n$-bit input source word at the $2^n$-bit wide source input, and (c) decodes the n-bit index either (i) to select and output as an output destination bit one bit from the $2^n$-bit input source word if the disable bit has a logic low value or (ii) outputs a logic low as the output destination bit if the disable bit has a logic high value; (2) a cache memory that (a) has $2^m$ cache datapath inputs and $2^m$ cache index inputs, (b) receives (i) the datapath information on the $2^m$ cache datapath inputs and (ii) $2^m$ n-bit indexes on the $2^m$ cache index inputs, (c) provides a first set of the n-bit indexes for the switch circuit, and (d) includes a small tightly coupled memory array that stores p (e.g. eight) entries of $2^m$ n-bit indexes for the switch circuit, where the cache memory is logically coupled to the switch circuit; and (3) a control circuit that (a) has a plurality (e.g. 100) of control inputs, (b) receives the partially-decoded instruction information on the plurality of control inputs, (c) provides a second set of the n-bit indexes for the switch circuit, and (d) provides the disable bits for the switch circuit, where the control circuit is logically coupled to the switch circuit and to the cache memory.

In an exemplary embodiment, the present invention provides a switch circuit that allows any bit from a $2^n$-bit (e.g. 256-bit) input source word to be switched into any bit position of a $2^m$-bit (e.g. 128-bit) output destination word and that provides the ability to set-to-zero any bit in the $2^m$-bit output destination word. The switch circuit includes $2^m$ $2^n$:1 multiplexor circuits, where each of the $2^n$:1 multiplexor circuits (a) has a unique n-bit (e.g. 8-bit) index input and one disable input, (b) decodes an n-bit index received at the n-bit index input to select one bit from the $2^n$-bit input source word if a disable bit received at the disable input has a logic low value, and (c) outputs a logic low if the disable bit has a logic high value. Also, each of the $2^n$:1 multiplexor circuits includes: (1) a $2^q$:1 pass gate selector (e.g. 4:1 pass gate selector), where the $2^q$:1 pass gate selector has $2^q$ precharge/discharge wire-OR bitline inputs; (2) a sense amplifier logically coupled to the $2^q$:1 pass gate selector, where the sense amplifier (a) receives the output of the $2^q$:1 pass gate selector and (b) receives a dummy bitline input to allow differential sensing of small swing signals on the wire-OR bitline inputs; and (3) $2^{n-q}$ unit switch cells (e.g. 64 unit switch cells) per precharge/discharge wire-OR bitline input, where each of the unit switch cells (a) is logically coupled to a wire-OR bitline input of the $2^q$:1 pass gate selector, (b) is logically coupled to one of $2^r$ (e.g. one of 8) active-LOW "SELA" select wires, and (c) is logically coupled to one of $2^{n-q-r}$ (e.g. one of 8) active-HIGH "SELC" select wires.

In addition, an exemplary implementation of the present invention provides a control circuit that provides indexes and disable bits. The control circuit includes: (1) an arithmetic logic unit (ALU), where the ALU includes a plurality of ALU modules; (2) a plurality of ÷ltiplexors logically coupled to the ALU, where each of the multiplexors includes a plurality of multiplexor modules; and (3) a plurality of decoders logically coupled to the ALU and to the plurality of multiplexors, where each of the decoders includes a s-stage (e.g. 5 stage) chain of NAND/NOR gates.

Some of the advantage of the cross-bar circuit are as follows:

1. It requires a uniquely small area of silicon, as provided by the arrangement of the switch circuit, the cache memory, and the control circuit;
2. It requires uniquely low power, as provided by the use of a minimum number of logic gates to implement the switch circuit and the control circuit;
3. It requires a small number of transistors, as provided by the use of a minimum number of logic gates to implement the switch circuit and the control circuit;
4. It requires a small number of wires, as provided by the use of a minimum number of logic gates to implement the switch circuit and the control circuit and by the arrangement of the switch circuit, the cache memory, and the control circuit; and
5. It requires only two layers of metal to implement, as provided by the arrangement of the switch circuit, the cache memory, and the control circuit.

Since the switch circuit requires no more silicon area than a barrel shifter and since the switch circuit can perform the functions of a barrel shifter, the switch circuit can be used in place of a barrel shifter in a circuit design, thus saving space in the circuit design.

Also, the control circuit generates a relatively large number of bits (e.g. 1024 bits), which comprise a pattern of bits. This pattern of bits is often repetitive. Taking advantage of the repetitiveness of this pattern of bits, the control circuit can use a relatively small number of bits (e.g. 64 bits) to generate a relatively large number of bits (e.g. 1024 bits). In an exemplary embodiment, the control circuit generates $n*2^m$ bits (e.g. 1024 bits) as a pattern of bits by using only $2^{n-2}$ input bits (e.g. 64 input bits).

THE FIGURES

FIG. 8 depicts control logic of the cross-bar circuit according to an exemplary embodiment of the present invention.

FIG. 9 depicts the format of a crossbar instruction according to an exemplary embodiment of the present invention.

FIG. 10A depicts the format of a crossbar extract instruction according to an exemplary embodiment of the present invention.

FIG. 10B depicts the control fields of the crossbar extract instruction according to an exemplary embodiment of the present invention.

FIGS. 10C, 10D, and 10E depict the operation of the crossbar extract instruction according to an exemplary embodiment of the present invention.

FIG. 11A depicts the format of a crossbar field instruction according to an exemplary embodiment of the present invention.

FIG. 11B depicts allowed values for fields of the crossbar field instruction according to an exemplary embodiment of the present invention.

FIGS. 11C and 11D depict the operation of the crossbar field instruction according to an exemplary embodiment of the present invention.

FIG. 12A depicts the format of a crossbar field inplace instruction according to an exemplary embodiment of the present invention.

FIG. 12B depicts allowed values for fields of the crossbar field inplace instruction according to an exemplary embodiment of the present invention.

FIG. 12C depicts the operation of the crossbar field inplace instruction according to an exemplary embodiment of the present invention.

FIG. 13 depicts the format of a crossbar inplace instruction according to an exemplary embodiment of the present invention.

Figure 14:
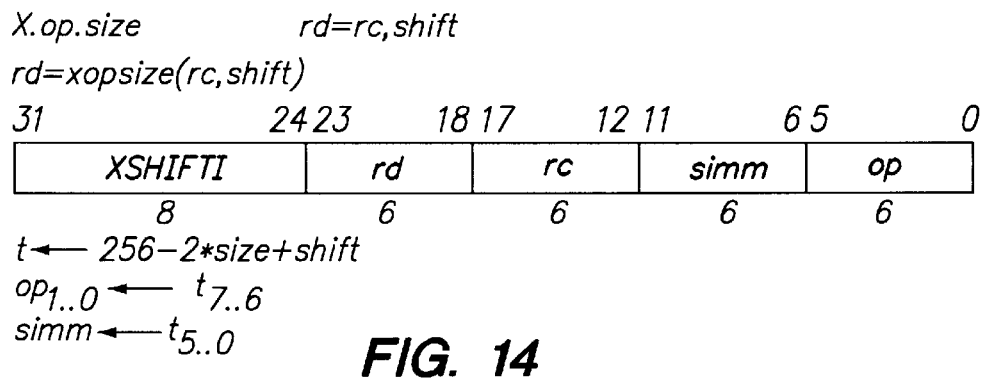

FIG. 14 depicts the format of a crossbar short immediate instruction according to an exemplary embodiment of the present invention.

Figure 15:
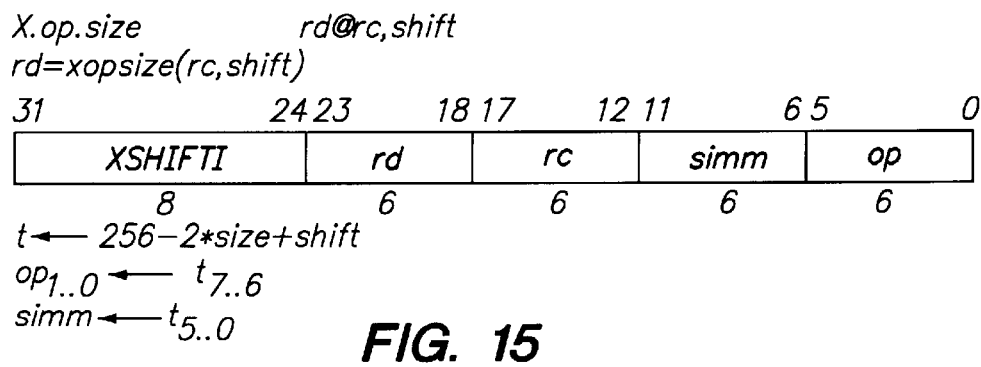

FIG. 15 depicts the format of a crossbar short immediate inplace instruction according to an exemplary embodiment of the present invention.

Figure 16A:
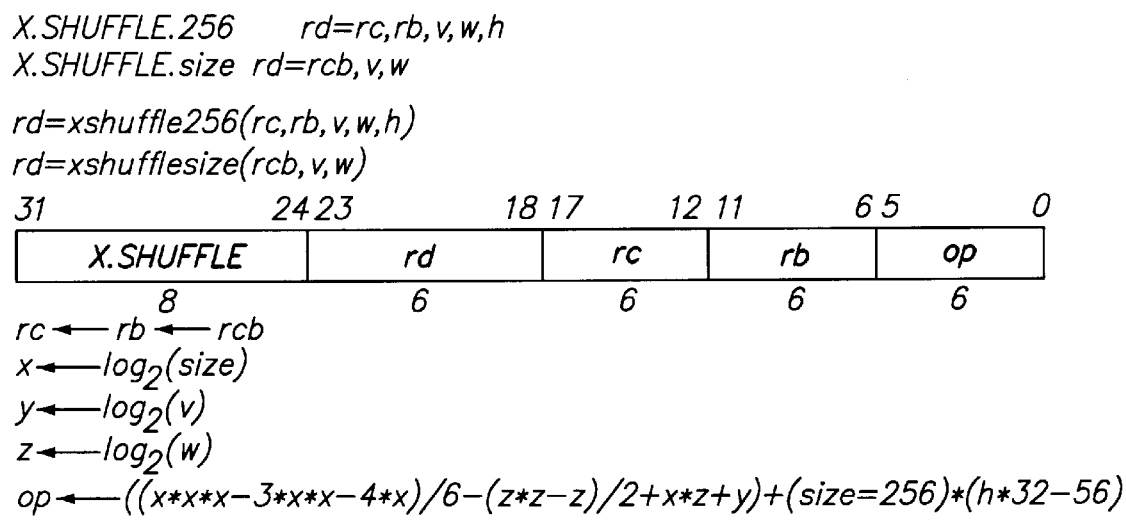
Figure 16B:
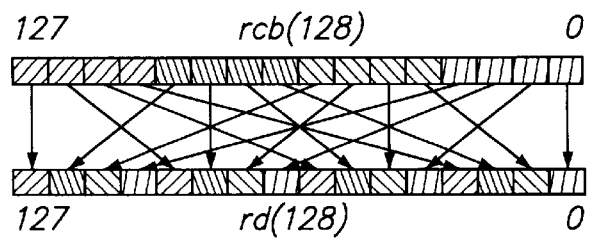
Figure 16C:
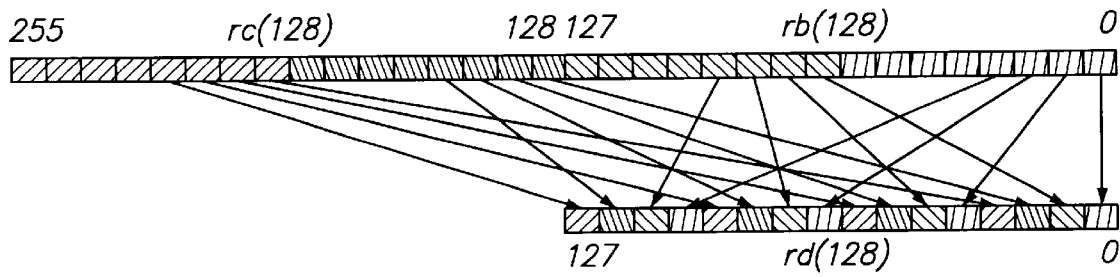

FIG. 16A depicts the format of a crossbar shuffle instruction according to au exemplary embodiment of the present invention FIGS. 16B and 16C depict the operation of the crossbar shuffle instruction according to an exemplary embodiment of the present invention.

Figure 17:
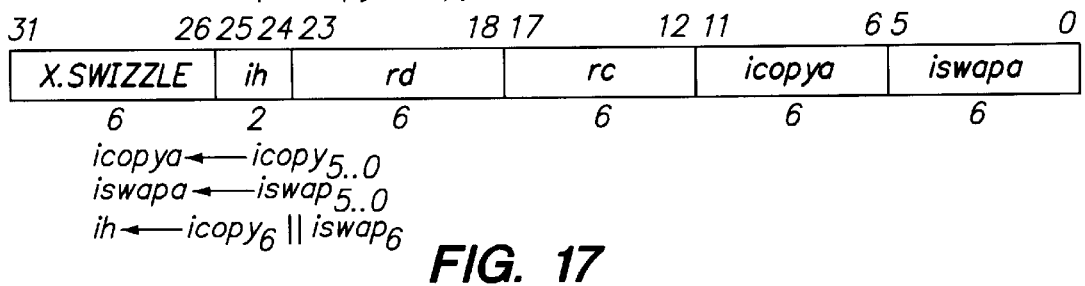

FIG. 17 depicts the format of a crossbar swizzle instruction according to an exemplary embodiment of the present invention.

Figure 18:
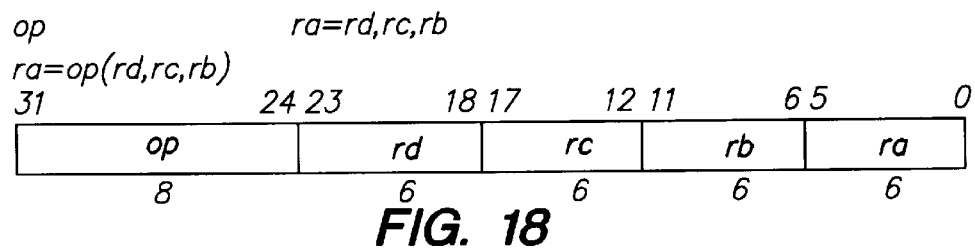

FIG. 18 depicts the format of a crossbar ternary instruction according to an exemplary embodiment of the present invention.

Figure 19:
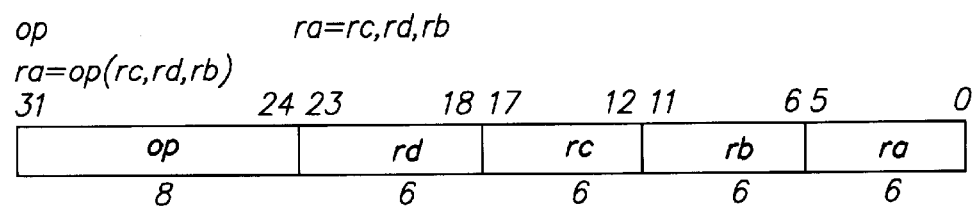

FIG. 19 depicts the format of a wide switch instruction according to an exemplary embodiment of the present invention.

DETAILED DESCRIPTION OF THE INVENTION

Cross-bar Circuit

Figure 1A:
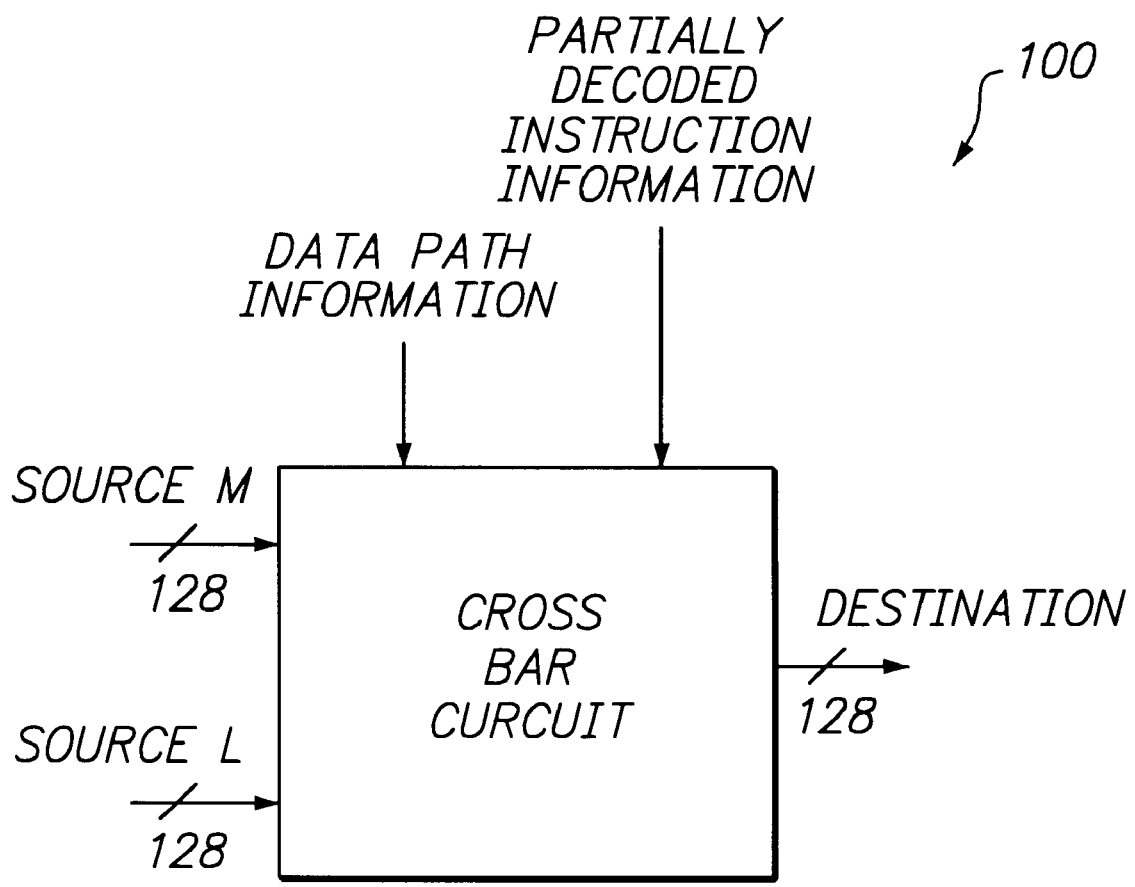
FIG. 1A is a first system level diagram showing the functional blocks of a cross-bar circuit according to an exemplary embodiment of the present invention.

Referring first to FIG. 1A, an exemplary embodiment of a cross-bar circuit 100 which achieves the objectives of the present invention is illustrated in block diagram form. Cross-bar circuit 100 is organized as a 128-bit wide 256:1 multiplexor. Cross-bar circuit 100, in response to partially-decoded instruction information and in response to datapath information, (1) allows any bit from either of two 128-bit input source words, SOURCE M and SOURCE L, to be switched into any bit position of a 128-bit output destination word, DESTINATION and (2) provides the ability to set-to-zero any bit in the 128-bit output destination word, DESTINATION. Although this exemplary embodiment and others discussed thereafter refer to exemplary bit sizes for inputs, outputs, and circuit components, these bit sizes are merely examples and are not intended to limit the invention to the exemplary bit sizes.

In an exemplary embodiment, cross-bar circuit 100, in response to partially-decoded instruction information and in response to datapath information, (1) allows any bit from a 256-bit input source word, comprised of a 128-bit input source word SOURCE M and a 128-bit input source word SOURCE L, to be switched into any bit position of a 128-bit output destination word DESTINATION and (2) provides the ability to set-to-zero any bit in the 128-bit output destination word DESTINATION.

Figure 1B:
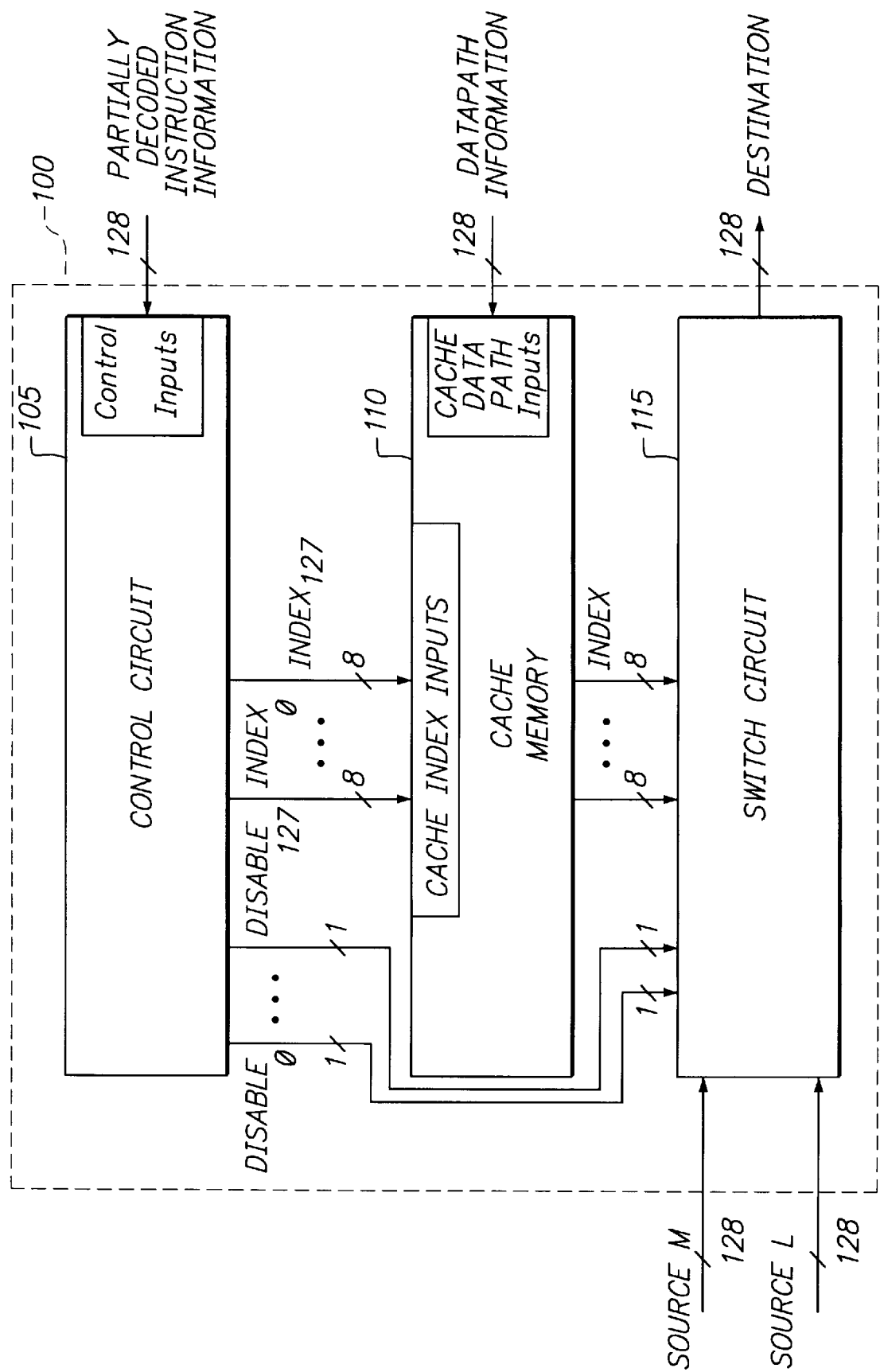
FIG. 1B is a second system level diagram showing the functional blocks of a cross-bar circuit according to an exemplary embodiment of the present invention.

Referring next to FIG. 1B, an exemplary embodiment of cross-bar circuit 100 is shown in block diagram form in greater detail than FIG. 1A. In this exemplary embodiment, cross-bar circuit 100 includes a control circuit 105, a cache memory 110, and a switch circuit 115. In an exemplary embodiment, control circuit 105 (i) receives partially decoded instruction information on 128 control inputs and (ii) generates 128 8-bit indexes and 128 disable bits. In an exemplary embodiment, cache memory 110 (i) receives datapath information on 128 cache datapath inputs, (ii) receives 128 8-bit indexes from control circuit 105, (iii) can generate its own 128 8-bit indexes, and (iv) can store at least 128 8-bit indexes. In an exemplary embodiment, switch circuit 115 (i) receives 128 8-bit indexes, generated by either control circuit 105 or cache memory 110, (2) receives 128 disable bits generated by control circuit 105, (3) receives a 128-bit input source word SOURCE M and a 128-bit input source word SOURCE L, and (4) generates a 128-bit output destination word DESTINATION in response to the received 128 8-bit indexes and the received 128 disable bits.

Figure 1C:
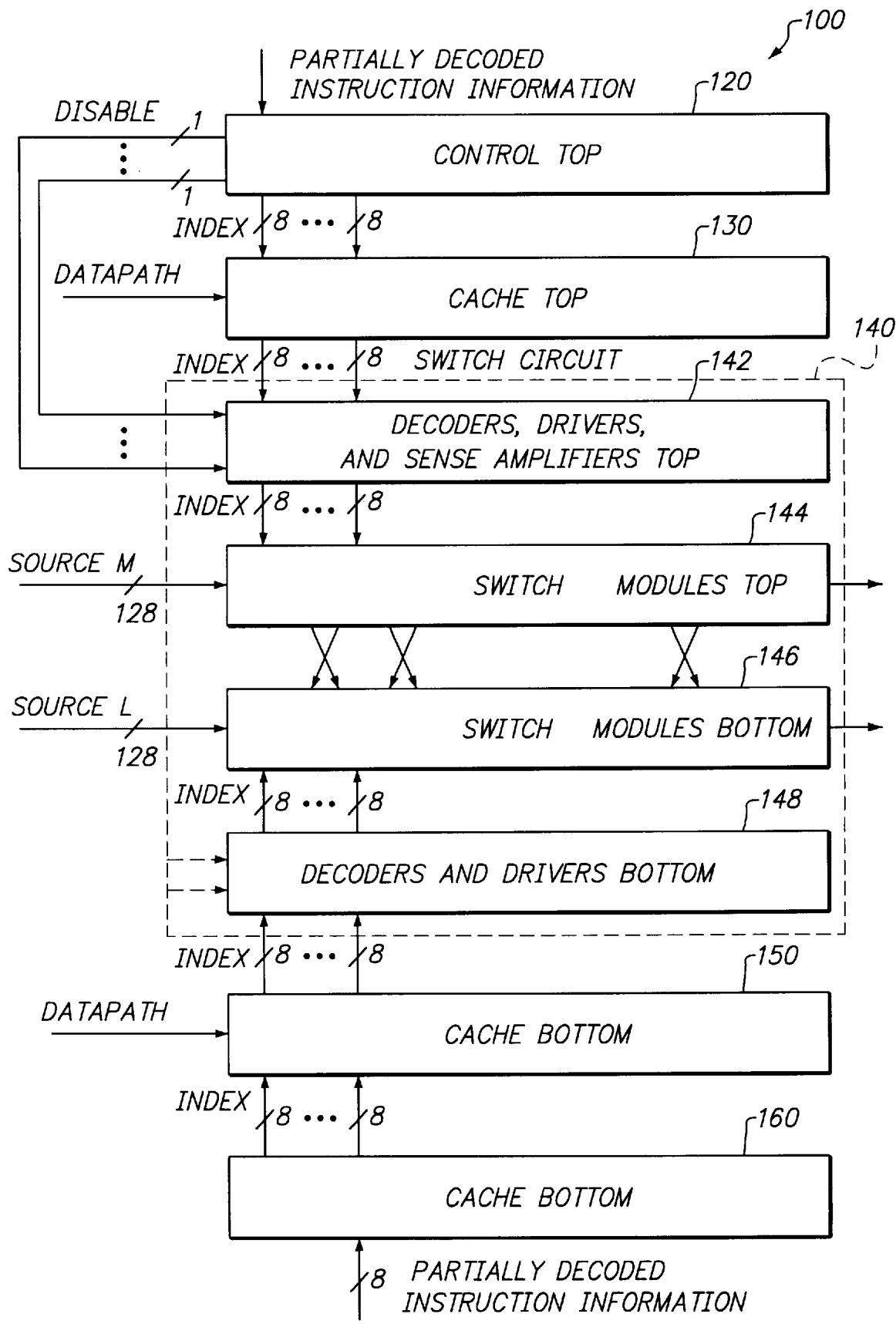
FIG. 1C is a third system level diagram showing the functional blocks of a cross-bar circuit according to an exemplary embodiment of the present invention.

Referring next to FIG. 1C, the exemplary embodiment of cross-bar circuit 100 is illustrated in still greater detail in block diagram form. In this exemplary embodiment, cross-bar circuit 100 includes a control top 120, a cache top 130, a switch circuit 140, a cache bottom 150, and a control bottom 160. In this exemplary embodiment, cross-bar circuit 100 is comprised of three basic building blocks: a switch circuit 140, a cache memory, and a control circuit. In this embodiment, the control circuit is physically divided into the following two blocks: (i) control top 120 which is physically located above switch circuit 140; and (ii) control bottom 160 which is physically located below switch circuit 140. Also in this embodiment, the cache memory is physically divided into the following two blocks: (i) cache top 130 which is physically located above switch circuit 140; and (ii) cache bottom 150 which is physically located below switch circuit 140. In addition, in this embodiment, switch circuit 140 includes decoders, drivers, sense amplifiers, and switch modules. In this embodiment, the decoders, drivers, and sense amplifiers are physically divided into the following two blocks: (i) a decoders, drivers, and sense amplifiers top 142 which is physically located above the switch modules; and (ii) a decoders and drivers bottom 148 which is physically located below the switch modules. In this embodiment, the switch modules are physically divided into the following two blocks: (1) a switch modules top 144; and (2) a switch modules bottom 146, which is physically located below switch modules top 144.

In a preferred embodiment, the circuit design and layout of the cross-bar circuit 100 can be completely implemented in a first metal layer, M1, and a second metal layer, M2. This permits the cross-bar circuit to be placed under global bussing connecting other circuits in a datapath logically coupled to cross-bar circuit 100, where the global bussing for the datapath is implemented in metals layers located physically higher than M1 and M2, such as a third metal layer, M3, and a fourth metal layer, M4. In an exemplary embodiment, the global bussing is implemented vertically in M3 and M4. In sum, the entire circuit layout of cross-bar circuit 100 can be implemented in only M1 and M2 so that cross-bar circuit 100 can fit under the M3 and M4 global bussing.

Switch Circuit

Figures 2A, 3B:
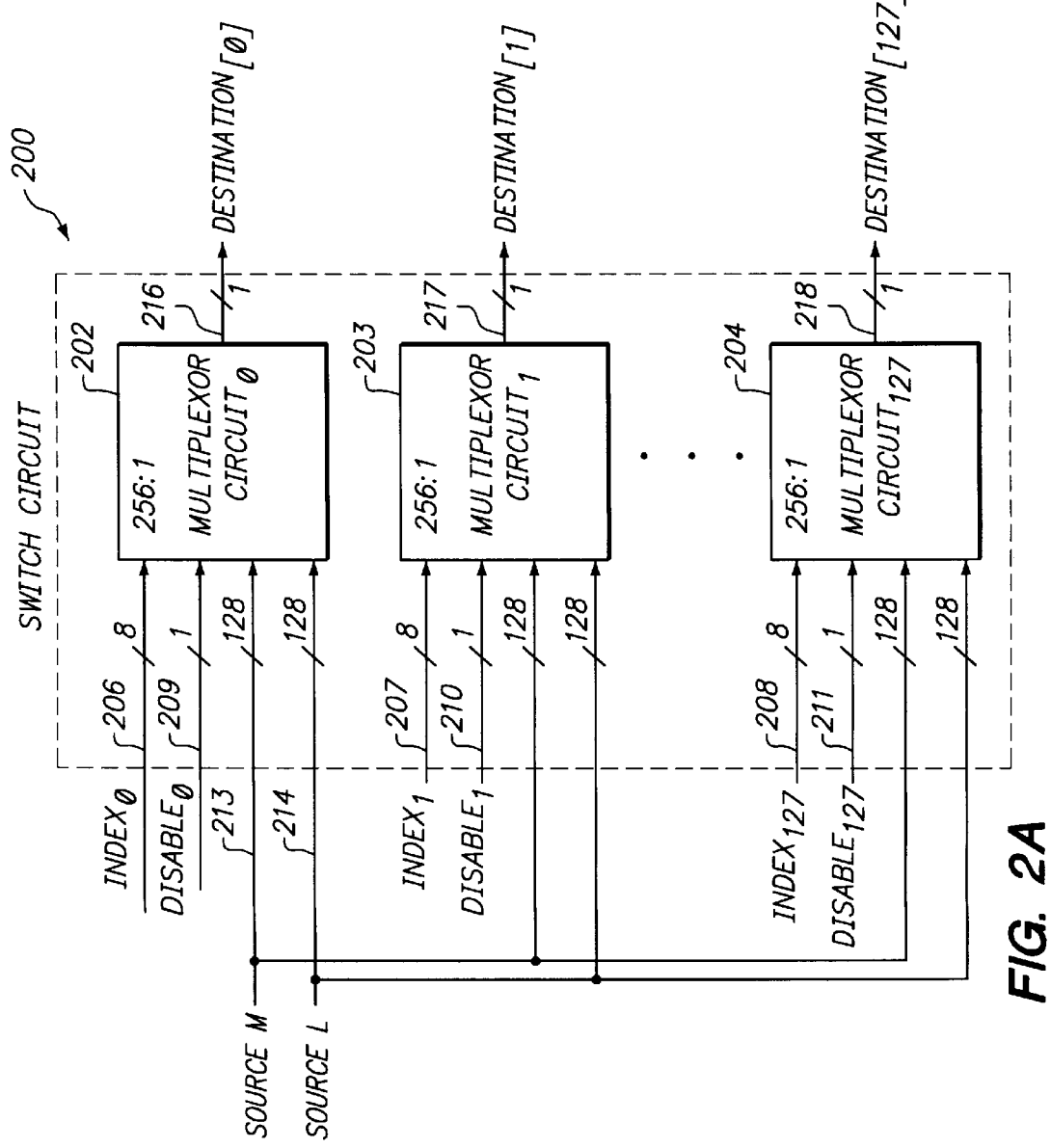
FIG. 2A is a block diagram of the switch circuit according to an exemplary embodiment of the present invention.
FIG. 3B is a diagram of a typical unit switch cell according to an exemplary embodiment of the present invention.

Referring to FIG. 2A, an exemplary embodiment of a switch circuit 200 which helps to achieve the objectives of the present invention is illustrated in block diagram form. In this exemplary embodiment, switch circuit 200 includes the following components, logically interconnected as shown:

(1) 128 256:1 multiplexor circuits 202–204, referred to as 256:1 multiplexor circuit 0–256:1 multiplexor circuit 127;

(2) 128 8-bit wide index input lines 206–208;

(3) 128 disable input lines 209–211;

(4) a 128-bit wide SOURCE M input line 213;

(5) a 128-bit wide SOURCE L input line 214; and (6) 128 DESTINATION output lines 216–218.

Each of the 256:1 multiplexor circuits 202–204 (1) can also be referred to as a bit-slice of switch circuit 200 and (2) has (a) a unique 8-bit index input logically coupled to an 8-bit wide index input line and (b) a unique disable input logically coupled to a disable input line. Each of the 256:1 multiplexor circuits 202–204 (1) receives a 256-bit input source word in the form of a 128-bit input source word SOURCE M on 128-bit wide SOURCE M input line 213 and a 128-bit input source word SOURCE L on 128-bit wide SOURCE L input line 214 and (2) receives an 8-bit index at its 8-bit index input and a disable bit at its disable input. Each of the 256:1 multiplexor circuits 202–204 decodes the received 8-bit index to do the following: (1) either select and output as an output destination bit, DESTINATION[x], one bit from the 256-bit input source word if the disable bit has a logic low value (2) or output a logic low as the output destination bit, DESTINATION[x], if the disable bit has a logic high value.

256:1 Multiplexor Circuit

Figure 2B:
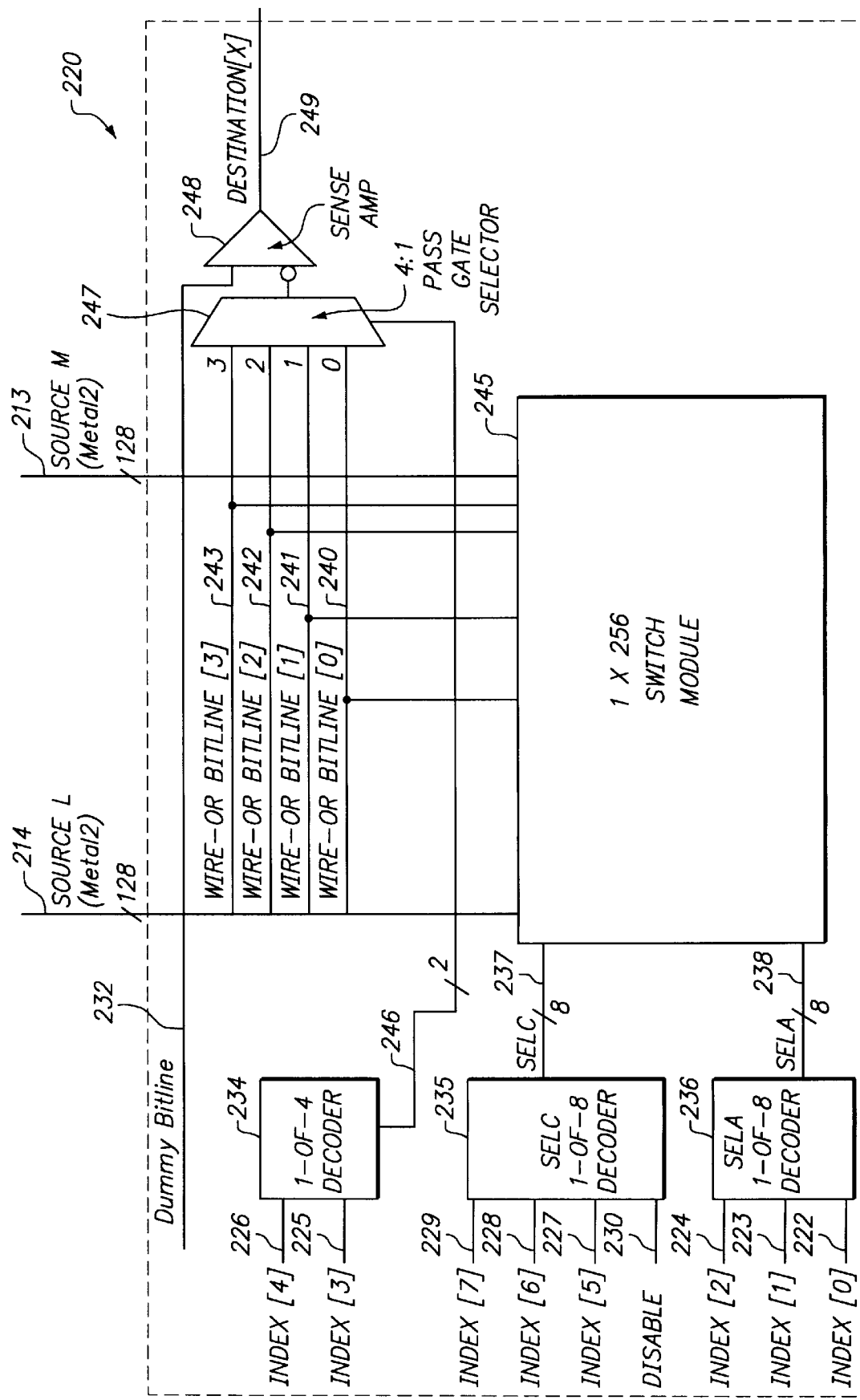
FIG. 2B is a block diagram of a typical 256:1 multiplexor circuit according to an exemplary embodiment of the present invention.

Referring next to FIG. 2B, an exemplary embodiment of a typical 256:1 multiplexor circuit 220, referred to as 256:1 multiplexor circuits 202–204 in FIG. 2A, is illustrated in block diagram form. In this exemplary embodiment, 256:1 multiplexor circuit 220 includes the following components, logically interconnected as shown:

(1) 128-bit wide SOURCE M input line 213;

(2) 128-bit wide SOURCE L input line 214;

(3) eight index input lines 222–229, referred to as INDEX[0]–INDEX[7];

(4) a disable input line 230;

(5) a dummy-bitline 232;

(6) a 1-of-4 decoder 234;

(7) a SELC 1-of-8 decoder 235;

(8) a SELA 1-of-8 decoder 236;

(9) an 8-bit wide SELC select line 237;

(10) an 8-bit wide SELA select line 238;

(11) four wire-OR bitlines 240–243;

(12) a 1×256 switch module 245;

(13) a 2-bit wide bitline select line 246;

(14) a 4:1 pass gate selector 247;

(15) a sense amplifier (sense amp) 248; and

(16) a DESTINATION[x] output line 249.

In an exemplary embodiment, four index input lines enter at the top of 256:1 multiplexor circuit 220, while the remaining four index input lines enter at the bottom of 256:1 multiplexor circuit 220. In an embodiment, index input lines 222–225, INDEX[0]–INDEX[3], enter at the top of 256:1 multiplexor circuit 220, while index input lines 226–229, INDEX[4]–INDEX[7], enter at the bottom of 256:1 multiplexor circuit 220. In an exemplary embodiment, SELC 1-of-8 decoder 235 is physically located at the top of 256:1 multiplexor circuit 220, and SELA 1-of-8 decoder 236 is physically located at the bottom of 256:1 multiplexor circuit 220.

In an exemplary embodiment, 1-of-4 decoder 234 is physically located at the top of 256:1 multiplexor circuit 220. 1-of-4 decoder 234 decodes one index bit, INDEX[3], bussed up from the bottom of multiplexor circuit 220 and another index bit, INDEX[4], from the top of multiplexor circuit 220 (a) to select one of the four wire-OR bitlines 240–243 and (b) to pass the value on the selected wire-OR bitline to 4:1 pass gate selector 247. In an exemplary embodiment, 4:1 pass gate selector 247 is physically located at the top of multiplexor circuit 220. In an exemplary embodiment, sense amplifier 248 is physically located at the top of multiplexor circuit 220. A signal on dummy-bitline 232 is passed into sense amplifier 248. Sense amplifier 248 uses the signal on dummy-bitline 232 to perform differential sensing and to accurately sense the output of 4:1 pass gate selector 247, especially small signal swings.

1×256 Switch Module

Figures 2, 2C:
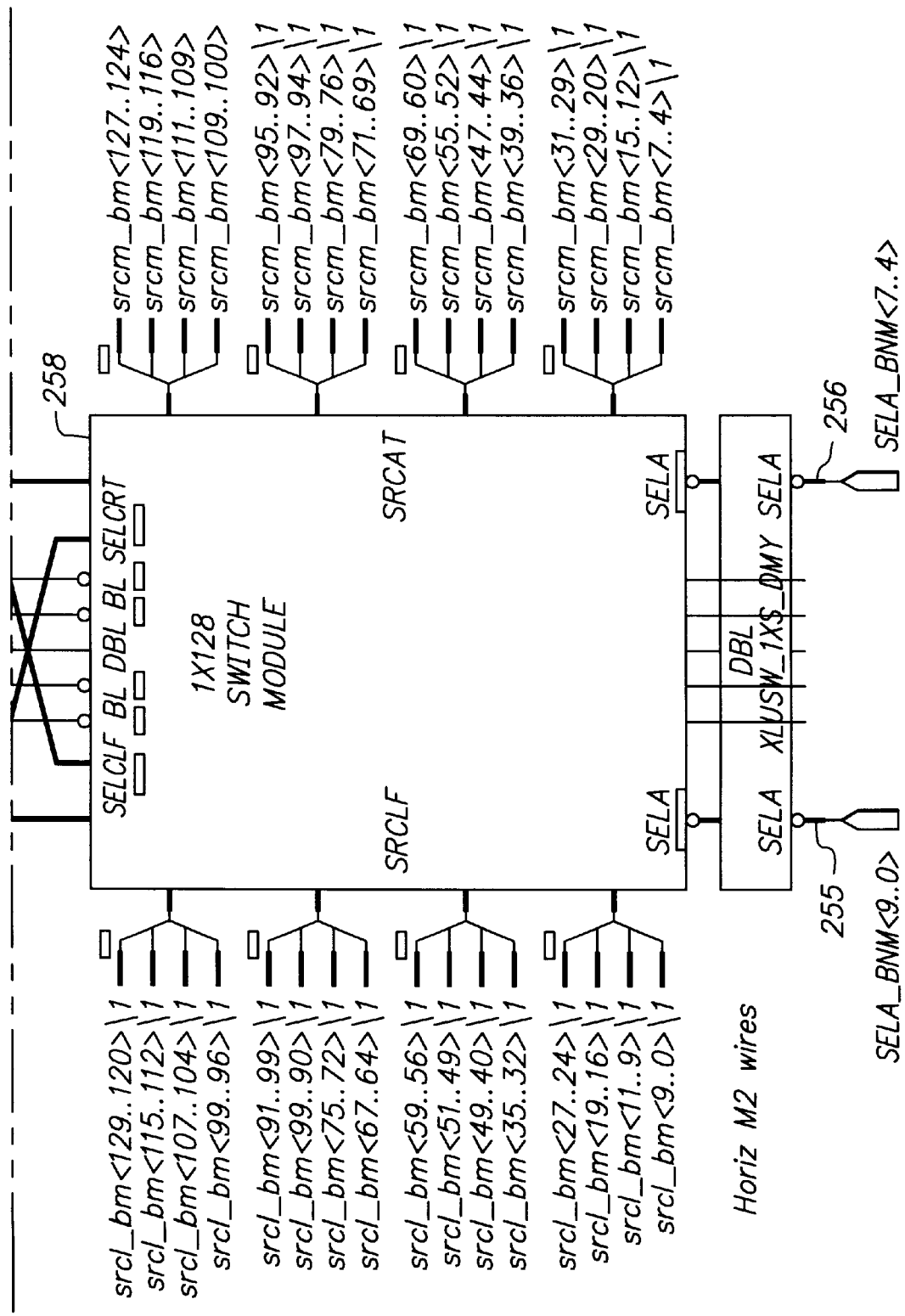
FIG. 2C is a block diagram of a typical 1×256 switch module according to an exemplary embodiment of the present invention.

Referring next to FIG. 2C, an exemplary embodiment of a typical 1×256 switch module 250, referred to as 1×256 switch module 245 in FIG. 2B, is illustrated in block diagram form. In this exemplary embodiment, 1×256 switch module 250 includes the following components, logically interconnected as shown:

(1) a 128-bit wide SOURCE M input line 213, referred to as SRCM_BM<127..0>;

(2) a 128-bit wide SOURCE L input line 214, referred to as SRCL_BM<127..0>;

(3) an 8-bit wide SELC select line comprised of (a) a first 4-bit SELC select line 252, referred to as SELC_BM<3..0>, and (b) a second 4-bit wide SELC select line 253, referred to as SELC_BM<7..4>;

(4) an 8-bit wide SELA select line comprised of (a) a first 4-bit SELA select line 255, referred to as SELA_BNM<3..0>, and (b) a second 4-bit wide SELA select line 256, referred to as SELA_BNM<7..4>;

(5) four wire-OR bitlines 240–243, referred to as BL_BNM<0>–BL_BNM<3>;

(6) a first 1×128 switch module 258; and (7) a second 1×128 switch module 259.

The operation of the 1×256 switch module will be described later.

1×128 Switch Module

Figure 2D:
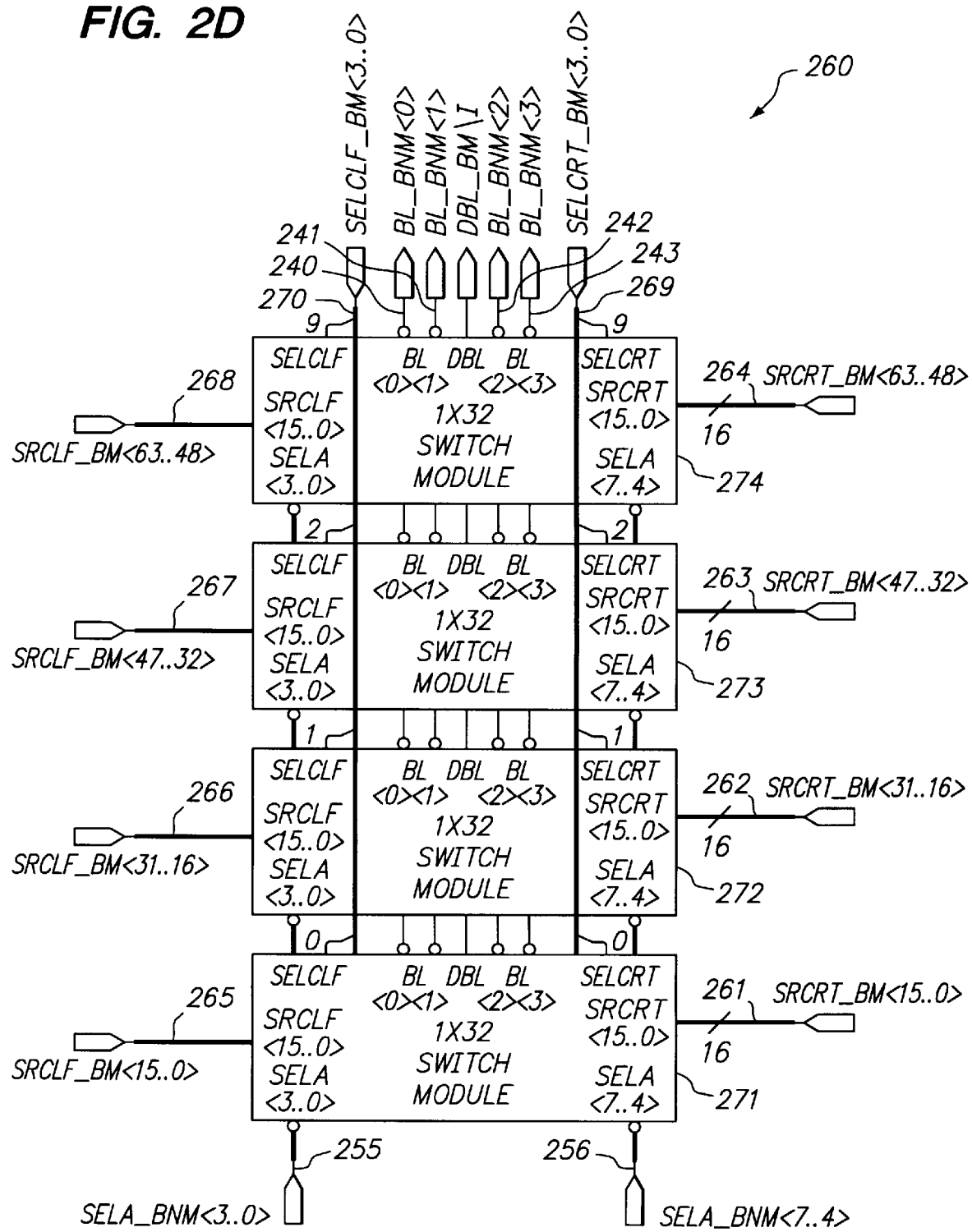
FIG. 2D is a block diagram of a typical 1×128 switch module according to an exemplary embodiment of the present invention.

Referring next to FIG. 2D, an exemplary embodiment of a typical 1×128 switch module 260, referred to as 1×128 switch modules 258 and 259 in FIG. 2C, is illustrated in block diagram form. In this exemplary embodiment, 1×128 switch module 260 includes the following components, logically interconnected as shown:

(1) four wire-OR bitlines 240–243, referred to as BL_BNM<0>–BL_BNM<3>;

(2) four 16-bit wide right input source lines 261–264, referred to as SRCRT_BM<15..0>, SRCRT_BM<31..16>, SRCRT_BM<47..32>, and SRCRT_BM<63..48>;

(3) four 16-bit wide left input source lines 265–268, referred to as SRCLF_BM<15..0>, SRCLF_BM<31..16>, SRCLF_BM<47..32>, and SRCLF_BM<63..48>;

(4) a 3-bit wide right SELC select line 269, referred to as SELCRT_BM<3..0>;

(5) a 3-bit wide left SELC select line 270, referred to as SELCLF_BM<3..0>;

(6) first 4-bit SELA select line 255, SELA_BNM<3..0>;

(7) second 4-bit wide SELA select line 256, referred to as SELA_BNM<7..4>; and (8) four 1×32 switch modules 271–274.

The operation of the 1×128 switch module will be described later.

1×32 Switch Module

Figure 2E:
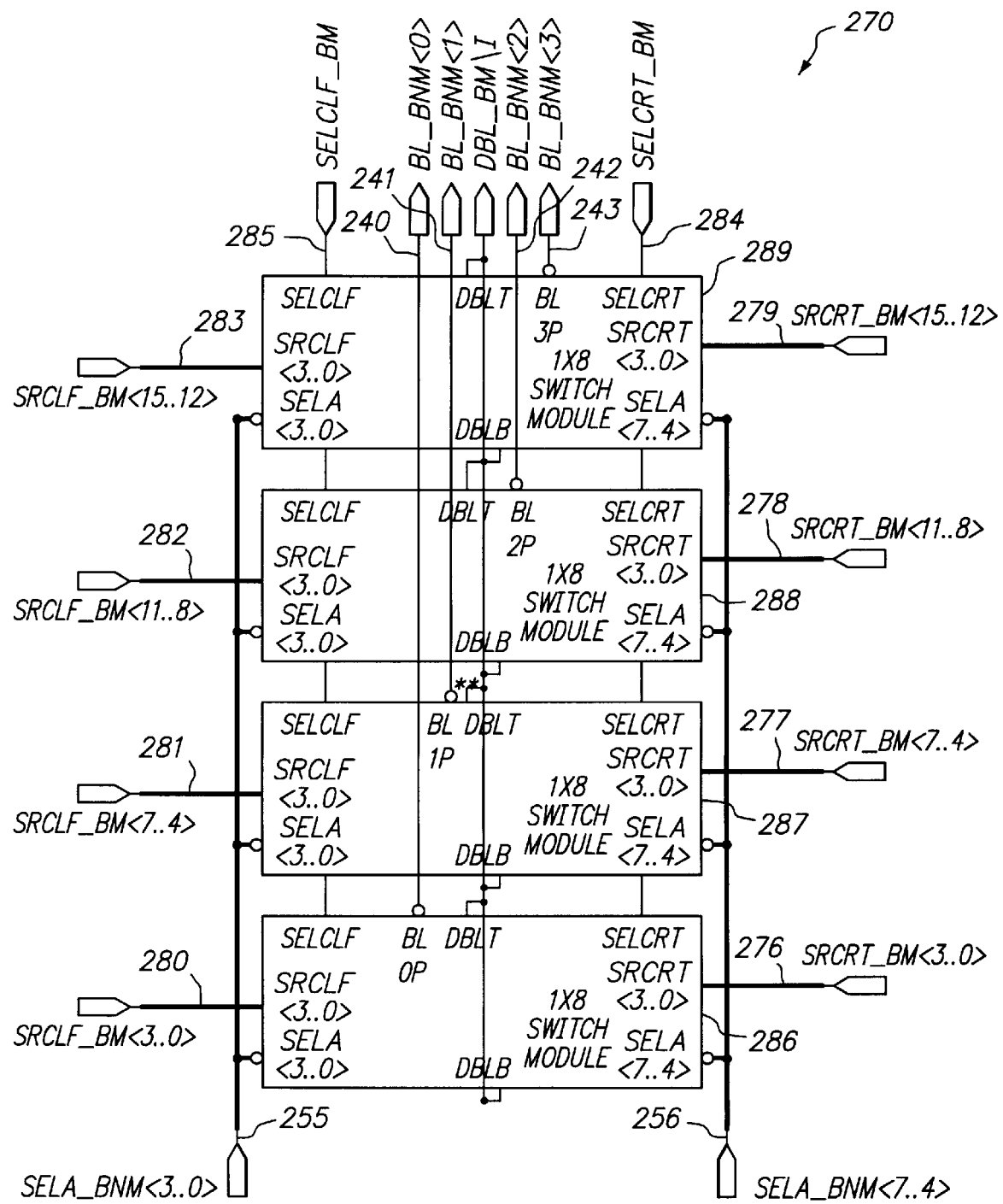
FIG. 2E is a block diagram of a typical 1×32 switch module according to an exemplary embodiment of the present invention.

Referring next to FIG. 2E, an exemplary embodiment of a typical 1×32 switch module 275, referred to as 1×32 switch modules 271–274 in FIG. 2D, is illustrated in block diagram form. In this exemplary embodiment, 1×32 switch module 275 includes the following components, logically interconnected as shown:

(1) four wire-OR bitlines 240–243, referred to as BL_BNM<0>–BL_BNM<3>;

(2) four 4-bit wide right input source lines 276–279, referred to as SRCRT_BM<3..0>, SRCRT_BM<7..4>, SRCRT_BM<11..8>, and SRCRT_BM<15..12>;

(3) four 4-bit wide left input source lines 280–283, referred to as SRCLF_BM<3..0>, SRCLF_BM<7..4>, SRCLF_BM<11..8>, and SRCLF_BM<15..12>;

(4) a right SELC select line 284, referred to as SELCRT_BM;

(5) a left SELC select line 285, referred to as SELCLF_BM;

(6) first 4-bit SELA select line 255, referred to as SELA_BNM<3..0>;

(7) second 4-bit wide SELA select line 256, referred to as SELA_BNM<7..4>; and (8) four 1×8 switch modules 286–289.

The operation of the 1×32 switch module will be described later.

1×8 Switch Module

Figure 3A:
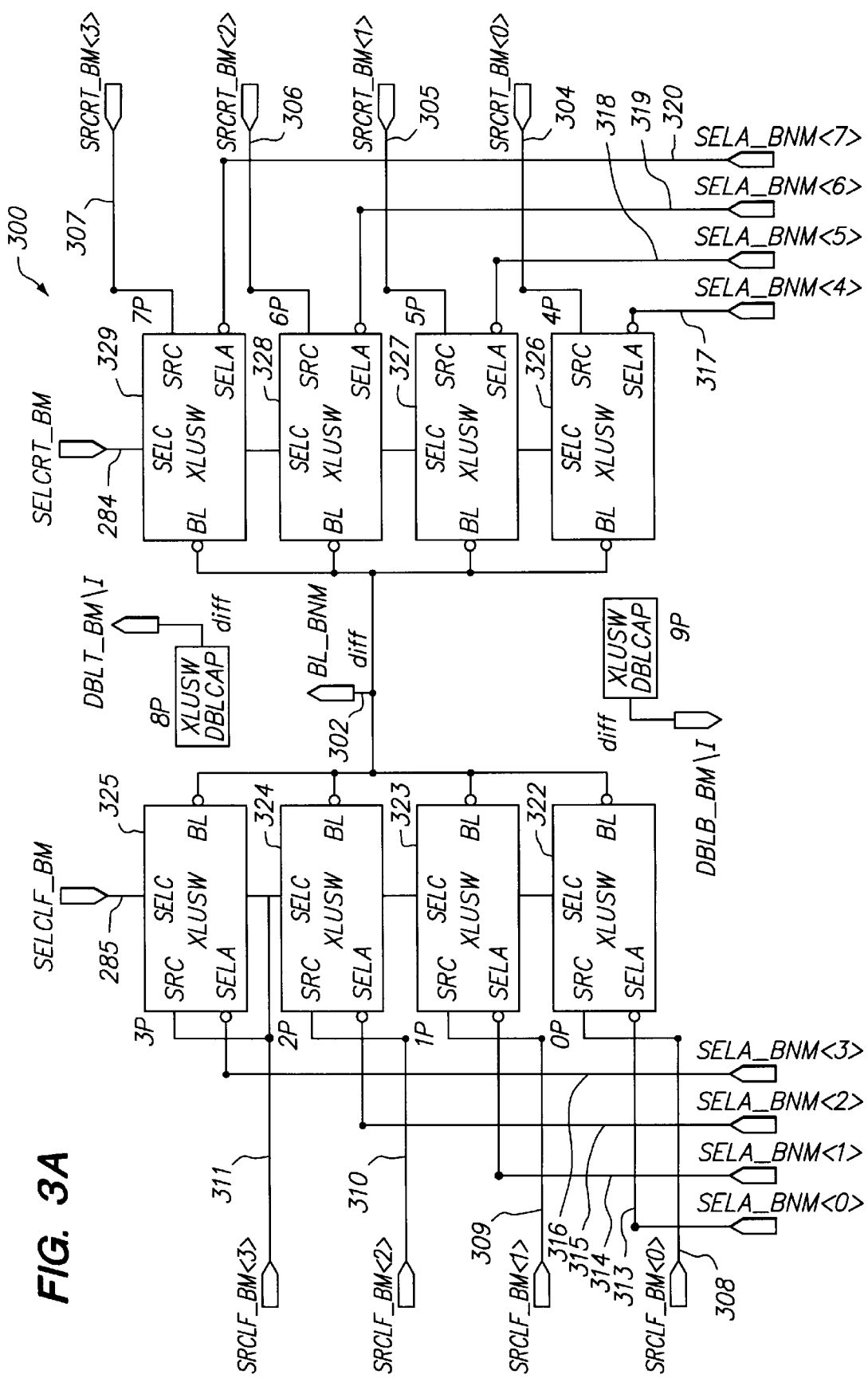
FIG. 3A is a block diagram of a typical 1×8 switch module according to an exemplary embodiment of the present invention.

Referring next to FIG. 3A an exemplary embodiment of a typical 1×8 switch module 300, referred to as 1×8 switch modules 286–289 in FIG. 2E, is illustrated in block diagram form. In this exemplary embodiment, 1×8 switch module 300 includes the following components, logically interconnected as shown:

(1) a wire-OR bitline 302, BL_BNM, corresponding to one of the four wire-OR bitlines 240–243 in FIG. 2E;

(2) four right input source lines 304–307, referred to as SRCRT_BM<0>–SRCRT_BM<3>, where the set SRCRT_BM<0>–SRCRT_BM<3> is exemplary of the four sets SRCRT_BM<3..0>, SRCRT_BM<7..4>, SRCRT_BM<11..8>, and SRCRT_BM<15..12> in FIG. 2E;

(3) four left input source lines 308–311, referred to as SRCLF_BM<0>–SRCLF_BM<3>, where the set SRCLF_BM<0>–SRCLF_BM<3> is exemplary of the four sets SRCLF_BM<3..0>, SRCLF_BM<7..4>, SRCLF_BM<11..8>, and SRCLF_BM<15..12> in FIG. 2E;

(4) right SELC select line 284, referred to as SELCRT_BM;

(5) left SELC select line 285, referred to as SELCLF_BM;

(6) four SELA select lines 313–316, SELA_BNM<0>–SELAEBNM<3>, which form a set of four SELA select lines corresponding to SELA_BNM<3..0> in FIG. 2E;

(7) four SELA select lines 317–320, SELA_BNM<4>–SELA_BNM<7>, which form a set of four SELA select lines corresponding to SELA_BNM<7..4> in FIG. 2E; and (8) eight unit switch cells 322–329.

The operation of the 1×8 switch module will be described later.

Unit Switch Cell

Referring next to FIG. 3B an exemplary embodiment of a typical unit switch cell 340, referred to as unit switch cells 322–329 in FIG. 3A, is illustrated in block diagram form. In this exemplary embodiment, unit switch cell 340 includes the following components, logically interconnected as shown:

(1) a first NFET transistor 342;

(2) a second NFET transistor 344, (3) a SELA select line 346, referred to as SELA_BNM, which is exemplary of one of the eight SELA select lines 313–320 in FIG. 3A;

(4) a SELC select line 347, referred to as SELC_DM, which is exemplary of one of the two SELC select lines 284 or 285 in FIG. 3A;

(5) a SRC source line 350, referred to as SRC_BM, which is exemplary of one of the eight input source lines 304–311, referred to as SRCRT_BM<0>–SRCRTBM<3> and SRCLFBM<0>–SRCLF_BM<3 in FIG. 2E; and (6) wire-OR bitline 302, referred to as BL_BNM, also in FIG. 3A.

If SELA select line 346 has a logic low value and if SELC select line 347 has a logic high value, then the logic value on SRC source line 350 will be transferred to wire-OR bitline 302. In other words, if SELA select line 346 has a logic low value, if SELC select line 347 has a logic high value, and if SRC source line 350 has a logic high value, then wire-OR bitline 302 will have a logic high value. If SELA select line 346 has a logic low value, if SELC select line 347 has a logic high value, and if SRC source line 350 has a logic low value, then wire-OR bitline 302 will have a logic low value. When SELA select line 346 has a logic low value and if SELC select line 347 has a logic high value, then unit switch cell 340 is selected and the logic value on if SRC source line 350 will be transferred to then wire-OR bitline 302.

1×8 Switch Module

In an exemplary embodiment, in the layout of 1×8 switch module 300 eight unit switch cells 322–329 are grouped together in order to meet the following objectives:

1. Fit in the vertical pitch of eight M2 source SRC data input lines;

2. Fit in the practical minimum number of vertical M1 wire pitches; and

3. Within the constraints of #1 and #2, provide the maximum transistor width for the series NFETs, 342 and 344.

Objective #1 is driven by the desire to minimize the height of the XLU structure.

Objective #2 seeks to minimize the bit-pitch of the datapath. The driving limitation is the number of vertical wires needed to accomplish the 1-of-256 wire-OR select plus any overhead needed for interconnection and data sensing. The minimum number of select lines that could be used would be 16: 3 groups of 1-of-4 hot busses and one group of 4 wire-OR bitlines. However, this would require the unit switch cell 340 to use three series connected NFETs which would require additional interconnection overhead and give lower read current for a given transistor width. The preferred embodiment uses two 1-of-8 hot busses for the SELA and SELC lines, and 4 separate wire-OR bitlines (plus one dummy bitline) which go through a 4:1 MUX for the final selection. The 4:1 MUX is placed outside the switch and thus theoretically does not require any additional wire tracks within the array of switch cells to bus the select wires for the MUX. This gives a total of 21 vertical wires for data selection and sensing. Another 4 M1 tracks plus 2 spare tracks were needed for connection of the horizontal M2 "SRC" wires to the gates of the data-in transistors. Finally, 2 M1 Vss wires were needed to shield the small swing bitlines from the full swing select lines and to allow for P-well taps in the array.

Objective #3 attempts to maximize the "read" current of unit switch cell 340 by obtaining the largest possible transistor width. The limiting factor here was the number of transistor that could be stacked in the height of the cell—8 M2 pitches.

In an exemplary embodiment, by putting the wire-OR bitlines in the middle of the cell with four of the eight NFET transistor pairs on each side, a much superior layout of 1×8 switch module 300 is achieved, as shown in FIG. 3A.

Now minimum M2 wires could be used and the transistor width was now limited by the stack of four parallel SELC NFETS, giving a maximum transistor width of:

$$W=\{8*(M2\ pitch)-2*(diff\ sp)-(diff\ sp\ with\ poly\ end\ cap)-(diff\ sp\ with\ contacted\ poly)\}/4$$

$$W=\{8*(0.60\ um)-2*(0.30\ um)-(0.225\ um+0.105\ um)-(2*(0.12\ um+0.105\ um)+0.225\ um)\}/4$$

$$W=0.79875\ um=>0.795\ um.$$

One other consideration in the design and layout of unit switch cell 340 was which NFETs should be connected to which signal. Referring to FIG. 3B, the choice of placing the SELC transistor 342 next to wire-OR bitline 302 was made to both minimize the capacitance on the bitline 302 and to make the capacitance non-varying. The problem was that any data combination can be present on the data-in wires, ranging from all high to all low. If the data-in transistors were placed next to bitline 302, then bitline 302 would see the channel and source terminal capacitance of every data-in transistors whose data-in signal was high. This would make the bitline capacitance higher and also variable as a function of the state of the data-in signals. Since the read current of unit switch cell 340 is limited by the transistor size, it was deemed better to put the variable capacitance on SELA line 346 where the signal drivers can be made large enough to handle the higher capacitance.

Each 1×8 switch module 300 has bits 0–3 of the 8 SELA wires connected on the left side of the cell to four SELA select lines 313–316, SELA_BNM<0>–SELA_BNM<3>, and bits 4–7 of the 8 SELA wires connected on the right side of the cell to four SELA select lines 317–320, SELA_BNM<4>–SELABNM<7>. This means that bits 0–3 of the SELA lines are gated by a different SELC signal than bits 4–7 of the SELA lines. Thus a 1×8 switch module can only select 1-of-4 data inputs depending on whether the left or right SELC signal is "High".

1×32 Switch Module

Referring to FIG. 2E, 1×32 switch module 275 includes four 1×8 switch modules 286–289, with 1×8 switch module 286 connected to wire-OR bitline<0> 240, 1×8 switch module 287 connected to wire-OR bitline<1> 241, 1×8 switch module 288 connected to bitline<2> 242, and 1×8 switch module 289 connected to bitline<3> 243.

1×128 Switch Module

Referring to FIG. 2D, 1×128 switch module 260 includes four 1×32 switch modules 271–274, with the 1×32 switch module 271 having the left SELC input connected to bit<0> of the left group of 4 SELC wires 270 and the right SELC input connected to bit<0> of the right group of 4 SELC wires 269. 1×32 switch module 272 has the SELC inputs connected to bit<1> of the left and right groups of 4 SELC wires, and so forth for the third and fourth cells. At this point, switch circuit 200 has decoded 128 inputs (32 inputs on each of 4 wire-OR bitlines) where the "left" 64 inputs (SRCLF) are selected by the intersection of the "left" 4 SELA bits and the "left" 4 SELC bits, and the "right" 64 inputs are selected by the intersections of the "right" 4 SELA bits and the "right" 4 SELC bits. However, since SELA and SELC are both 1-of-8 hot busses, this only covers half of the possible combinations because when the "hot" SELA wire is on the left side, the "hot" SELC wire could be on the right side and vice-versa.

1×256 Switch Module

Referring to FIG. 2C, 1×256 switch module includes two 1×128 switch modules, 258 and 259, where the left and right SELC groups of 4 bits are reversed (or twisted) between the two 1×128 switch modules. In this manner, the 1×128 switch module 259 decodes the 128 combinations missed by 1×128 switch module 258. The hierarchy of this programming scheme is that the SELA bits have the least significance, then the 1-of-4 wire-OR bitline select, and finally the SELC bits have the highest significance. This hierarchy is driven by the fact that the 8 index bits for each 256:1 multiplexor circuit are physically divided with 4 index bits coming from the bottom of cross-bar circuit 100 and the other 4 coming from the top of the cross-bar circuit 100. This physical division is in conflict with the decoding requirements that want the index bits divided into two groups of 3 bits for the two 1-of-8 decoders and one group of 2 bits for the 1:4 decoder 234. This dictated the decision to place the SELA decoder 236 at the bottom of the slice, and the 1:4 decoder 234 and the SELC decoder 235 at the top of the slice. Thus the first 3 of the 4 bottom index bits go to the SELA decoder 236. The 4th bit is bussed through the column (using one of two spare M1 tracks) and combined with the 1st bit of the 4 top index bits to drive the 1:4 decoder 234. Finally, the last 3 of the 4 top index bits go to the SELC decoder 235.

The result of the "left"/"right" programming of the SELA and SELC wires is that the physical mapping of the SRCL and SRCM data inputs is not a simple linear progression from the bottom to the top of the wire-OR bitlines. Instead, the mapping jumps back and forth between the top and bottom halves of the column in groups of 4 inputs bits.

Consider the case where bitline<0> is selected and SELC<0> is active (i.e.—high). The SELC<0> wire is connected to the left side of the bottom 4 "1×8" cells in the bottom half of the column and is connected to the right side of the bottom 4 "1×8" cells in the top half of the column. Therefore, as the SELA address is incremented, first the 4 left data-inputs in the bottom 4 "1×8" cells of the bottom half of the column are sequentially selected as SELA bits 0–3 are toggled. Then after we jump from SELA<3> to SELA<4>, the 4 right data-inputs in the bottom 4 "1×8" cells of the top half are sequentially selected as SELA bits 4–7 are toggled. Since bitline<0> is selected, this means that we sequentially select the first 4 left data-inputs from the bottom half of the column and then the first 4 right data-inputs from the top half of the column. If we then move from bitline<0> to bitline<1> and wrap SELA back to bit<0>, we next sequentially select the second 4 left data-inputs from the bottom half of the column and then the second 4 right data-inputs from the top half of the column.

This bottom-left-4/top-right-4 sequence continues as the "index" is incremented until we reach the end of the first set of 128 data-inputs and is reflected in the bit-ordering of the SRCL data-inputs in the schematic. At this point, when we jump from SELC<3> to SELC<4>, the pattern reverses and we next select the 4 left data-inputs from the bottom "1×8" cell of the top half of the column followed by the 4 right data-inputs from the bottom "1×8" cell of the bottom half of the column. This top-left-4/bottom-right-4 sequence continues through the second set of 128 data-inputs and is reflected in the bit-ordering of the SRCM data-inputs in the schematic.

Dummy Bitline

Referring to FIG. 2B, because the wire-OR bitlines are relatively high in capacitance and the unit switch cell has limited read current, it is desirable to use small signal swing on the wire-OR bitlines 240–243 to improve the speed performance. This also implies that it is desirable to use differential sensing of some form, but the bitlines are only single-end. Thus a dummy bitline 232 for use in sensing is needed. Only one dummy bitline 232 is needed for all 4 wire-OR bitlines since only one wire-OR bitline is selected for evaluation by the sense amp.

The critical design/layout objective for the dummy bitline 232 is to have it match the wire-OR bitlines 240–243 as closely as possible for both capacitance and read current. Thus we must first evaluate the electrical properties of the wire-OR bitlines.

Each wire-OR bitline is connected to 64 unit switch cells—8 unit cells per "1×8" cell and 8 "1×8" cells per bitline. As was discussed above, the SELC transistor in the switch cell is connected to the bitline. Therefore, since the SELC bus is 1-of-8 hot, the bitline sees 8 unit cells where the SELC transistor is on, exposing the bitline to the capacitance of the intermediate node of the switch cell and to the gate edge capacitance of the data-in transistor.

In the other 56 unit cells the SELC transistor is off and the bitline only sees the gate edge capacitance of the SELC transistor.

For reading, the 8 unit switch cells that are selected have 7 cells where the SELA input is high. In these cells, the state of the data-input is essentially irrelevant since there is no discharge path from the bitline. In the 8th cell, the SELA input is low and thus if the data-input is high, the transistor turns on and provides a discharge path from the "high" bitline to the "low" SELA line.

In order to duplicate this configuration in the dummy bitline, a "dummy 1×8" cell is added at the bottom of the column. This dummy cell is similar to the standard "1×8" cell except for three details. First, the unit cell has a stack of four transistors rather than the two transistors in the standard switch cell. This is done to have the dummy cell provide half the read current of the standard cell. Second, the output of the cell is connected to the dummy bitline instead of to one of the 4 wire-OR bitlines. Third, all the gates in the dummy cell are tied to Vdd rather than to the SELC and data wires. In this manner the dummy "1×8" cell provides a discharge path from the dummy bitline to the "low" SELA line in the same manner as the standard "1×8"cell, but at half the current. Furthermore, the dummy cell nearly duplicates the capacitance of the 8 unit switch cells on the normal wire-OR bitline that are selected by the "high" SELC line.

All that remains now is to duplicate the capacitance of the 56 unit cells on the wire-OR bitline that have the SELC transistor off. Note that in the length of an entire column, the dummy bitline crosses 32 "1×8" cells. Thus two "dummy" NFETs with their gates tied to Vss are included in the standard "1×8" cell that can have their drains connected to the dummy bitline. The layout of these transistors match the transistor width and drain diffusion area and perimeter of the SELC transistor in the unit switch cell. At the level (4 "1×8" cells), 7 of the 8 available dummy transistors is connected to the dummy bitline, giving a total of 56 dummy transistors on the dummy bitline.

At this point with the dummy bitline placed in the middle of the wire-OR bitlines, the dummy bitline now matches the wire-OR bitlines in wire length and nearest neighbor coupling, discharge path, transistor overlap capacitance, and drain junction capacitance.

Cache Memory

Referring to FIG. 1B, cache memory 110 is the first of two sources for the index inputs to the switch. In an exemplary embodiment the cache memory is a small tightly coupled memory array that stores eight entries of 128 8-bit indexes for the switch (e.g.—8 1024 bit words). The cache can be used to store random switching patterns provided by a datapath logically coupled to cross-bar circuit 100 or to capture index patterns generated by the instruction decode logic logically coupled to cross-bar circuit 100. These patterns can then be used repetitively without the datapath having to incur the overhead of repeatedly generating these patterns. The instruction decode logic is described in Appendix 2—Instruction Decode Logic.

Figure 4:
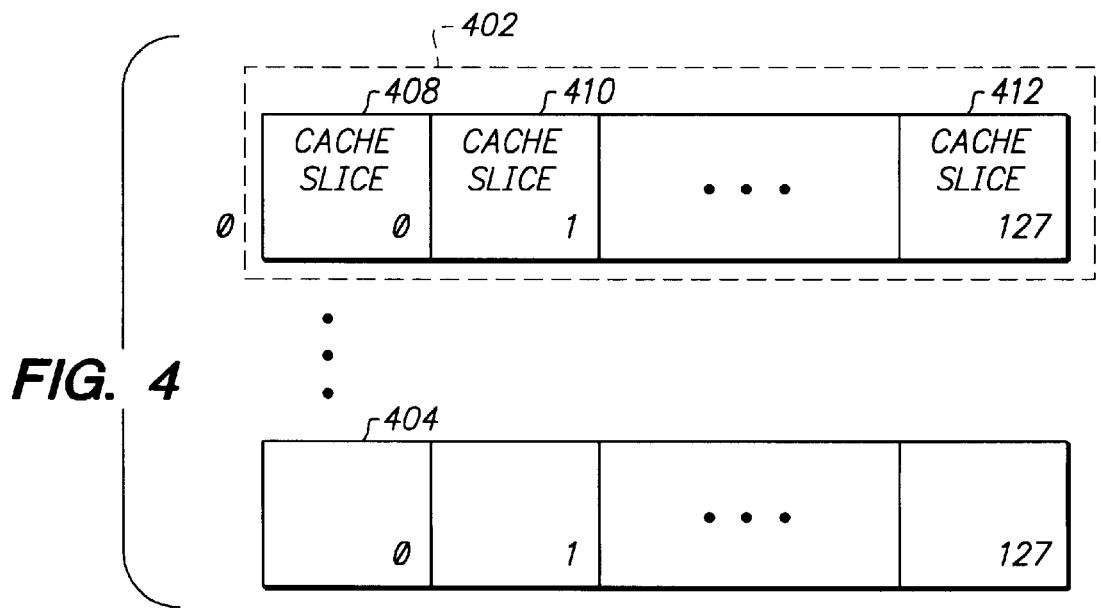
FIG. 4 is a diagram of the cache memory according to an exemplary embodiment of the present invention.

In an exemplary embodiment, as depicted in FIG. 4, the "cache" includes 8 lines, 402–404, of 1024 bits—8 columns per bit-slice of the MUX. As depicted in FIG. 4, the each cache line 402–404 is divided into 128 cache slices 408–412, where each cache slice 408–412 has 8 bits—one column per index bit of the switch circuit 200. In other words, the 1024 bits of the cache line are bundled into 128 cache slices of eight bits each corresponding to the eight index bits for each 256:1 multiplexor circuit 220.

In an exemplary embodiment, cache memory 110 is physically divided into two SRAM arrays each having 8 rows of 512 columns—128 slices" of 4 columns each. The arrays are pitch-matched to the switch circuit 115 such that one 4 column slice in the cache matches up with one 256:1 multiplexor circuit 220 in the switch circuit 200. One array is physically located immediately below the switch circuit 140 and one is physically located immediately above the switch circuit 140, as shown in FIG. 1C, thus providing a total of 8 index bits per 256:1 multiplexor circuit 220, bits 7–4 from cache top 130 and bits 3–0 from cache bottom 150.

Control Circuit

Referring to FIG. 1B, the control circuit 105 is the second source for the index inputs to the switch circuit 115. It is also the source for the 128 disable inputs to the switch circuit 115. In an exemplary embodiment, the control circuit 105 takes partially decoded instruction information from datapath control logic logically coupled to cross-bar circuit 100 and completes the decoding into an appropriate 8-bit index and disable bit for each of the 128 256:1 multiplexor circuits 202–204 in the switch circuit 200. This decoding implements the cross-bar operations provided in the ISA such as rotate, shift, swap, shuffle, deal, and extract. The cross-bar operations provided in the ISA are included in Appendix I—Cross-bar Operations Provided in the ISA. The output of this control circuit 105 is passed through the cache memory 110 on its way to the switch circuit 115, thus allowing the indexes to be captured by the cache memory 110 for subsequent cross-bar operations. Note that the disable bits cached by cache memory 110.

Figure 5A:
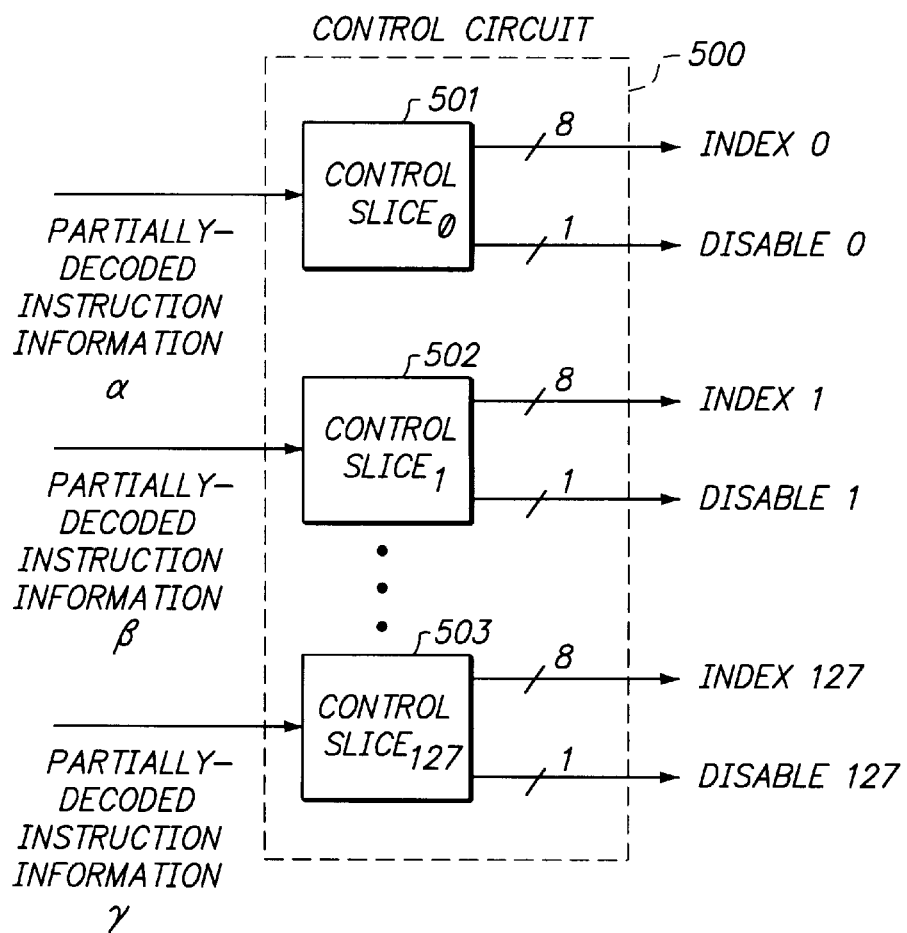
FIG. 5A is a block diagram of the control circuit according to an exemplary embodiment of the present invention.

The control circuit 105 generates 128 8-bit indexes for the switch circuit 115 and the cache memory 110 and generates 128 disable bits for the switch circuit 115. As shown in FIG. 5A, in an exemplary embodiment, the control circuit 500 includes 128 nearly identical control slices 501–503. The control slices 501–503 (i) receive partially-decoded instruction information and (ii) in response to the received partially-decoded instruction information, generate 128 8-bit indexes, INDEX 0–INDEX 127 and 128 disable bits, DISABLE 0–DISABLE 127.

Figure 5B:
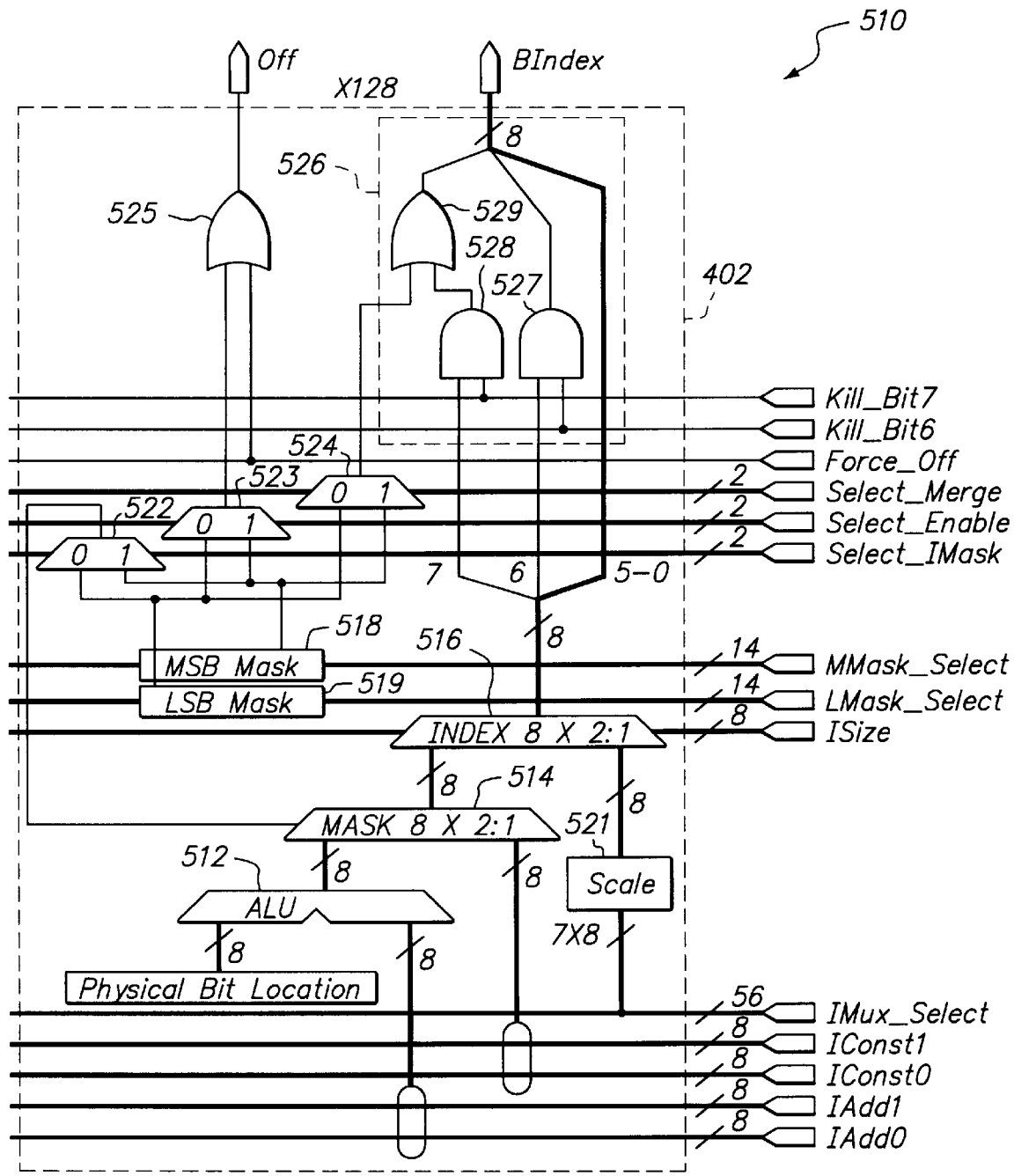
FIG. 5B is a block diagram of a typical control slice a according to an exemplary embodiment of the present invention.

As shown in FIG. 5B, in an exemplary embodiment, each control slice 510 includes an arithmetic logic unit (ALU) 512, an 8× 2:1 MASK multiplexor 514, an 8× 2:1 INDEX multiplexor 516, a Most Significant Bit (MSB) decoder 518, a Least Significant Bit (LSB) decoder 519, and a SCALE decoder 521. In an exemplary embodiment, each control slice 510 has unique programming of the decoders and the ALU/MUX inputs based on the bit position of the control slice 510.

ALU

In an exemplary embodiment a main index for each control slice 510 is calculated by an ALU 512 which adds the 8-bit input TAdd0/LAdd1 amount to the physical location of the control slice to get the main index for the source bit. This function thus supports ISA commands such as shift and rotate.

8× 2:1 MASK Multiplexor

In an exemplary embodiment, the output of the ALU 512 then flows through 8× 2:1 MASK multiplexor 514 which selects either the ALU 8-bit output or a "mask" value provided by the IConst0/IConst1 8-bit inputs. The selection choice is set by the LSB and MSB decoders 518 and 519 and the two Select_IMask bits. Four cases are supported:

1. If neither of the two Select_IMask bits are set, then the main index from the ALU 512 is selected in all 128 control slices 501–503, causing 1.28 contiguous bits in the source field to be indexed;
2. If the Select_IMask "1" bit is set, then the "mask" input is selected for all control slices 501–503 where the output of the MSE decoder 518 is "high";
3. If the Select_IMask "0" bit is set, then the "mask" input is selected for all control slices 501–503 where the output of the LSB decoder 519 is "high"; and
4. If both the Select_IMask "0" and "1" bits are set, then the "mask" input is selected for all control slices 501–503 where the output of either the LSB decoder 519 or the MSB decoder 518 is "high".

MSB Decoders and LSB Decoders

The MSB and LSB decoders 518 and 519 are used to identify leading edge and/or trailing edge bits in bit-groups of the cross-bar circuit output. These bit groups may be nibbles, bytes, doublets, quadlots, octlets, or the full hexlet. The outputs of the MSB and LSB decoders 518 and 519 are used in each control slice 510 to do one or more of the following:

1. Select the "mask" index value provided on the IConst0/IConst1 8-bit inputs;
2. Force the index value of the control slice to address the upper input hexlet, SOURCE M, of the cross-bar circuit; and
3. Set the "Off" bit, or disable bit, to "0" which in turn forces the corresponding output bit of the cross-bar circuit to a "0".

IADDAM & ICONST Programming

In an exemplary embodiment, there are two copies of the IAdd and IConst buses. The "0" or "1" copy of each bit of these buses is connected to ALU 512 and the 8× 2:1 MASK multiplexor 514 depending on whether the corresponding bit of the physical address of the control slice is a "0" or a "1". Thus IAdd0 and IConst0 are connected to the ALU 512 and 8× 2:1 MASK multiplexor 514 inputs in the "even" control slices, while IAdd1 and IConst1 are connected to the ALU 512 and 8× 2:1 MASK multiplexor 514 inputs in the "odd" control slices. IAdd0 and IConst0 are connected to the ALU 512 and 8× 2:1 MASK multiplexor 514 inputs in the even pairs of control slices (0&1, 4&5, 8&9, etc) while IAdd1 and IConst1 are connected to the ALU 512 and 8× 2:1 MASK multiplexor 514 inputs in the odd pairs of control slices (2&3, 6&7, 10&11, etc).

In an exemplary embodiment, generally, IAdd1 and IConst1 are set to the same values as lAdd0 and IConst0, thus supporting identical shift calculations for all 128 indexes outputted from control circuit 100. However, some operations require the splitting of these values, usually with IAdd1 and IConst1 being the inverse of IAdd0 and IConst0.

8× 2:1 INDEX Multiplexor

In an exemplary embodiment, the output of the 8× 2:1 MASK multiplexor 514 then if s flows through the 8× 2:1 INDEX multiplexor 516 which selects either the calculated/masked index or the output of the SCALE decoder 521. This selection is done on a bit-by-bit basis within the control slice 510 as determined by the corresponding bits of the ISize 8-bit input bus. The value on the ISize 8-bit bus is a thermometer value which select the IMask output in the lower order bits and the IScale value in the higher order bits of the index.

In an exemplary embodiment, the SCALE decoder 521 takes a 7-bit field from the IMux_Select bus for each bit of the index and examines selected bits from that field. The bits that are examined are determined by the physical address of the control slice 510. If the physical address of the control slice 510 has a minority of "ones", then the bit positions of the 7-bit IMux_Select field that correspond to the "ones" in the 7-bit physical address are ANDed in the scale decoder. Conversely, if the physical address of the control slice 510 has a minority of "zeros", then the bit positions of the 7-bit IMux_Select field that correspond to the "zeros" in the 7-bit physical address are NANDed in the SCALE decoder 521.

Kill Bits

In an exemplary embodiment, bits 0–5 outputted by 8× 2:1 INDEX multiplexor 514 in each control slice 510 are output directly to the cache memory 110 but bits 6 and 7 go through some additional processing. Both bits 6 and 7 can be overridden by the Kill_Bit6 and Kill_Bit7 inputs, which globally force their respective index bits to "zero".

Select Merge

In an exemplary embodiment, bit 7 sees one final level of processing. This level of processing forces bit 7 of the index to a "one" depending on the state of the two Select_Merge bits and the outputs of MSB decoder 518 and LSB decoder 519. Four cases are supported:

1. If neither of the SelectMerge bits are set, then bit 7 of the index is taken from the SCALE decoder 521 and Kill_Bit7 logic;

2. If Select_Merge "0" bit is set, all bits at or below the LSB Mask decoder 519 decode break point are selected from SOURCE M and all bits above the break point are selected from SOURCE L;

3. If Select_Merge "1" bit is set, all bits below the MSB Mask decoder 518 decode break point are selected from SOURCE L and all bits at or above the break point are selected from SOURCE M; and 4. If both the Select_Merge "0" and bits are set, all bits at or below the LSB Mask decoder 519 decode break point and at or above the MSB Mask decoder 518 decode break point are selected from SOURCE M. All bits between the LSB decoder 519 decode break points and the MSB decoder 518 decode break points are selected from SOURCE L.

Force Off

In an exemplary embodiment, the final function in the control slice 510 is the "Force Off" logic which determines the state of the "Off" output bit. This "Off" output bit passes over the cache memory 110 and sets the state of the disable bit in the 256:1 multiplexor circuit 220.

The state of the "Off" bit is determined by the state of the Select_Enable bits and the MSB and LSB decoders 518 and 519 in a manner identical to the Select_Merge override of bit 7, but with the additional provision that the upper 64 control slices of the control circuit 500 force the "Off" bit to a "one" if the Force_Off input is set.

Layout Information

In an exemplary embodiment, the control circuit 105 is divided into two blocks of 128 control slices 502–504, each in a manner similar to the cache memory 110. One block, control bottom 160 is placed immediately below the cache bottom 150 and generates the lower four index bit, INDEX[0]–INDEX[3]. The other block, control top 120 is placed immediately above the cache top 130 and generates the upper four index bits, INDEX[4]–INDEX[7] plus the "off" bit.

In an embodiment, control bottom 160 contains the following logic for just the lower four index bit, INDEX[0]–INDEX[3]: the ALU 512; the 8× 2:1 MASK multiplexor 514; the 8× 2:1 INDEX multiplexor 516; and the SCALE decoder 521. The select input for the 8× 2:1 MASK multiplexor 514 is bussed down from the control top 120.

In an embodiment, control top 120 contains the same logic as control bottom except for the upper four index bits, INDEX[4]–INDEX[7] plus the "off" bit. Control top 120 also duplicates the carry chain for just the lower four index bit, INDEX[0]–INDEX[3]. Control top 120 also contains the LSB and MSB decoders 519 and 518 and the Kill_Bit, Select_Merge, and Force_Off logic.

The major task in the circuit implementation of the control circuit 500 was to reduce the logic to a form that would minimize global wire count and to minimize the transistor count that had to fit under the global wires in M3 and M4. Wire count reduction required that differential global signals be avoided (such as multiplexor select lines) and that global wires be shared if possible.

ALU Reduction and Programming

Figure 5C:
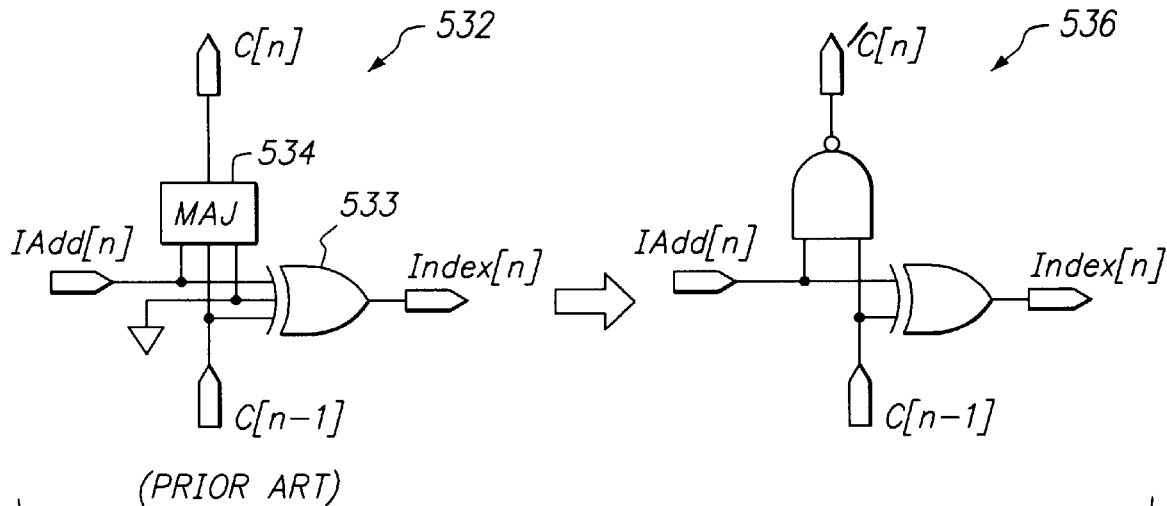
FIG. 5C depicts gate-level diagrams of a typical Arithmetic Logic Unit (ALU) bit when a physical address bit input to the ALU bit is "0" according to an exemplary embodiment of the present invention.
Figure 5D:
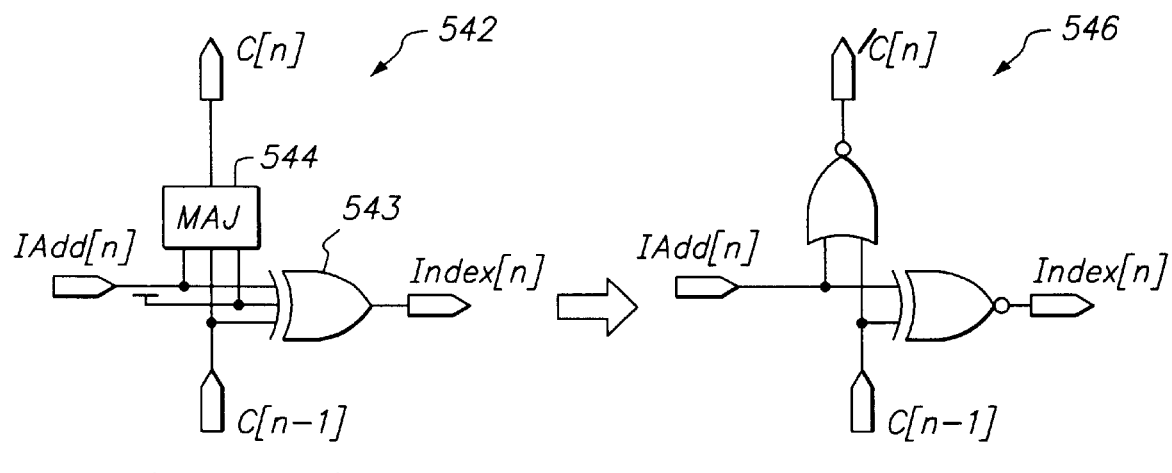
FIG. 5D depicts gate-level diagrams of a typical Arithmetic Logic Unit (ALU) bit when a physical address bit input to the ALU bit is "1" according to an exemplary embodiment of the present invention.

Conventionally, as shown in FIG. 5C and FIG. 5D, the traditional ALU "bit" 532 or 542 includes a 3-input XOR 533 or 543 to do the ADD and a 3-input MAJORITY gate 534 or 544 to generate the CARRY.

However, one input to the ALU 512 is hardwired to the physical address of the control slice 510. In an exemplary embodiment, the hardwired input to the ALU bit is eliminated through logic reduction, as shown in typical ALU bits 536 and 546 in FIG. 5C and FIG. 5D, respectively. The "tradeoff" here is that the programming of the physical address then has to be done by programming which reduced circuits are placed in the control slice 510 rather than by having a contact/metal wiring option to tic the physical address inputs to the appropriate rail. There are two cases to consider:

1. The physical address bit input to the ALU "bit" is "0", traditional ALU bit 532 and an exemplary embodiment of an ALU bit 536, as depicted in FIG. 5C; and 2. The physical address bit input to the ALU "bit" is "1", traditional ALU bit 542 and an exemplary embodiment of an ALU bit 546, as depicted in FIG. 5D.

Figure 5E:
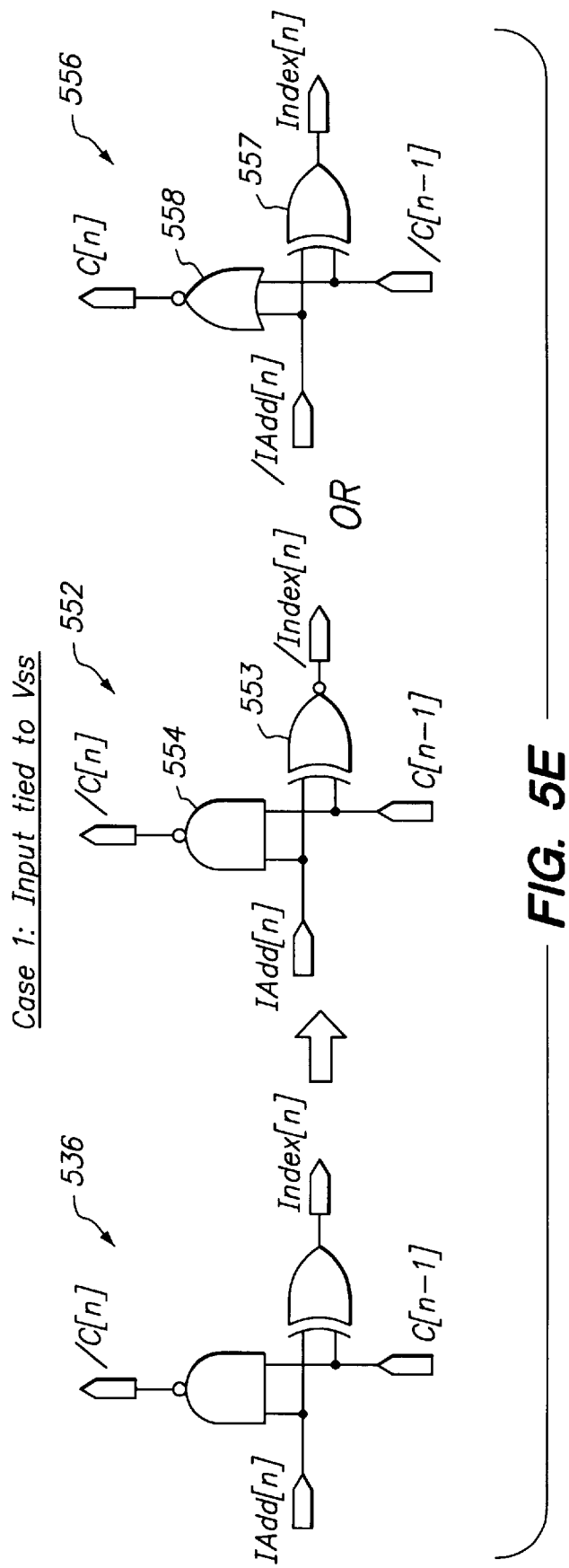
FIG. 5E depicts gate-level diagrams of a typical ALU bit when a physical address bit input to the ALU bit is "0" according to an exemplary embodiment of the present invention.

There is also the situation where the sum and carry bits have opposite polarity. Since the polarity of the individual IAdd inputs can be selected, gate conversions are done that provide consistency in polarity between the outputs of one ALU "bit" and the inputs of the following ALU "bit". The preferred embodiment has "true" inputs and "complement" outputs, or "complement" inputs and "true" outputs. In applying this to the two cases above in FIG. 5C and FIG. 5D, we get:

1. The physical address bit input to the ALU "bit" is "0", represented by ALU modules 552 and 556, as depicted in FIG. 5E; and 2. The physical address bit input to the ALU "bit" is "1", represented by ALU modules 552 and 556, as depicted in FIG. 5F.

Figure 5F:
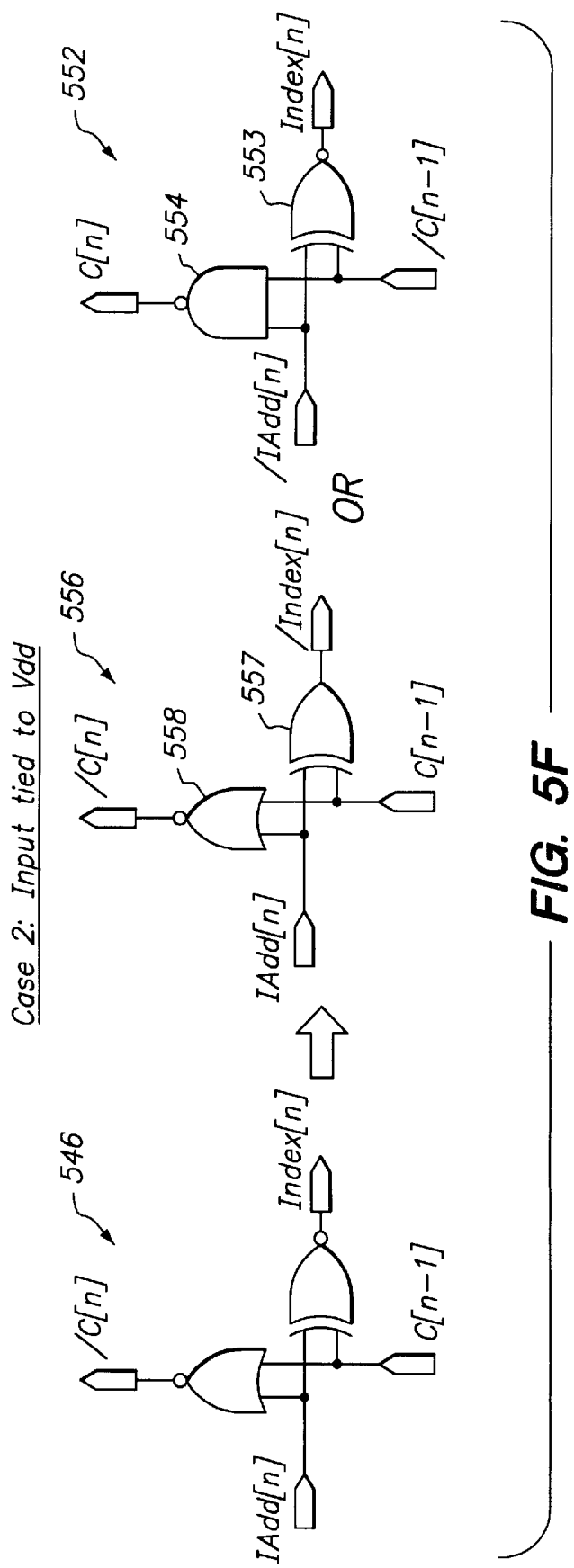
FIG. 5F depicts gate-level diagrams of a typical ALU bit when a physical address bit input to the ALU bit is "1" according to an exemplary embodiment of the present invention.

As a result, two types of ALU modules, (i) ALU module 552 including an XOR 557 and a NOR 558 logically coupled as shown in FIG. 5E and FIG. 5F and (ii) ALU module 552 including an XNOR 553 and a NAND 554 logically coupled as shown in FIG. 5E and FIG. 5F, cover the four permutations of physical address bit value and input/output inversions required for a typical ALU 512.

TABLE 1

| ALU "Bit" Programming | | |
|---|---|---|
| ALU "Bit" | Physical Add Bit = "0" | Physical Add Bit = "1" |
| "Even" | XOR-NOR | XNOR-NAND |
|  | (ALU Module 556) | (ALU Module 552) |
| "Odd" | XNOR-NAND | XOR-NOR |
|  | (ALU Module 552) | (ALU Module 556) |

Given that these two types of ALU modules have the same layout footprint, the ALU programming is done by simple substitution of the ALU modules.

In an exemplary embodiment, for each 256:1 multiplexor circuit 220, there is a corresponding control slice 502–506. Each 256:1 multiplexor circuit 220 has a physical address bit. Each control slice 510 includes an ALU 512. In an embodiment, the ALU 512 is an 8-bit ALU. As an example of the ALU programming, if the physical address of 256:1 multiplexor circuit is $00000000_2$, then for bit 0 of ALU 512, the following is true:

(1) ALU bit 0 is an Even bit (i.e. ALU "Bit" is "Even".);

(2) the value of the bit 0 of the physical address is 0 (i.e. Physical Address (Add) Bit="0".), and, therefore can be considered to be tied to $V_{SS}$ or ground;

(3) thus, the XOR-NOR module, ALU module 556, for the case when the ALU bit is EVEN and the Physical Address (Add) Bit is 0 is used.

As another example of the ALU programming, if the physical address of 256:1 multiplexor circuit is $00000000_2$, then for bit 1 of ALU 512, the following is true:

(1) ALU bit 1 is an Odd bit (i.e. ALU "Bit" is "Odd".);
(2) the value of the bit 1 of the physical address is 0 (i.e. Physical Address (Add) Bit="0".), and, therefore can be considered to be tied to $V_{SS}$ or ground;
(3) thus, the XNOR-NAND module, ALU module 552, for the case when the ALU bit is Odd and the Physical Address (Add) Bit="0" is used.

MUX Reduction and Programming

In an exemplary embodiment, since each control slice 510 contains 16 multiplexors (8 in control top 120 and 8 in the control bottom 160, one of the primary objectives in the cross-bar circuit design is to minimize the layout area of cross-bar circuit 100 by using the minimum number of transistors and wires per multiplexor. The number of wires is of particular concern since the height of the control slice 510 is primarily determined by the number of horizontal input wires that feed the control slice 510.

Figure 5G:
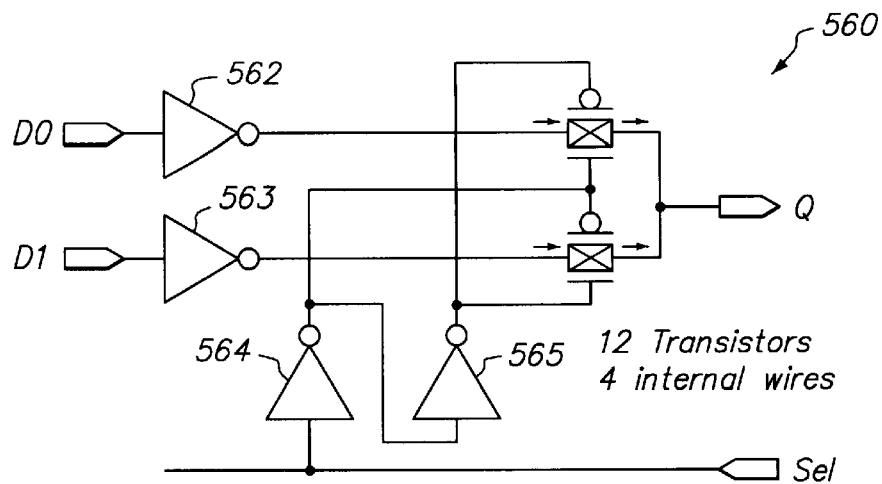
FIG. 5G is a circuit diagram of a prior art CMOS transfer-gate.

In control slice 510, a CMOS transfer-gate multiplexor 560, as shown in FIG. 5G, was not used for the multiplexors in control slice 510 for following reason: since the multiplexors have a mixture of local and global inputs, the use of a transfer-gate multiplexor is problematic unless both the data inputs and the select inputs are buffered locally to prevent unwanted pass gate activation due to either mismatches between local and distance supply levels or to noise on the input lines. In a worst case scenario, a CMOS transfer-gate multiplexor 560 would add 4 inverters, 562–565, to each multiplexor with an additional 4 local wires. This impact could theoretically be reduced by buffering the global signals periodically, such as every eight control slices, but this would then require the addition of more horizontal tracks for the buffered signals. The impact could also be reduced by only buffering the global signals, but then unique designs for the 8× 2:1 MASK multiplexor 514 and SCALE multiplexor 521 would be required. For this reason, a preferred embodiment uses a "logic" implementation for the multiplexors in control slice 510.

22-AOI

Figure 5H:
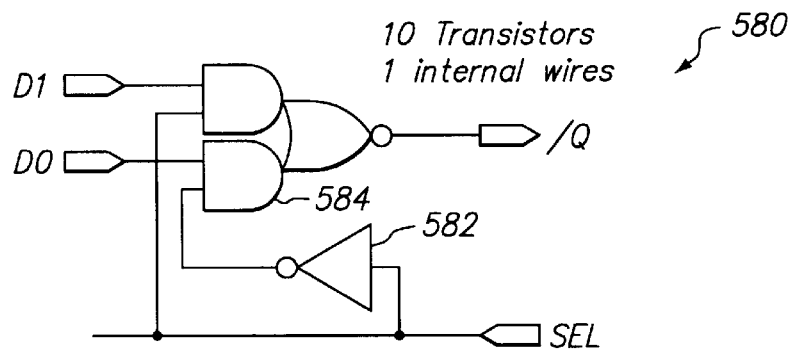
FIG. 5H is a gate-level diagram of a MUX module according to an exemplary embodiment of the present invention.

In an exemplary embodiment, a 22-AOI 580 is used, as shown in FIG. 5H. This approach solves the problem of needing to buffer global signals and has a minimal number of internal wires. It does have the drawback of requiring an additional inverter 582 to eliminate the need for a differential select line.

NOR-21-AOI

In an exemplary embodiment, given the necessity for this additional gate, some logic transformations are made to improve the utility of the multiplexor design. If the data input associated with the inverted select signal is inverted, then the select inverter 582 and the AND gate 584 can be combined into a NOR gate and the 22-AOI reduced to a 21-AOI, as depicted in FIG. 5I.

Figure 5I:
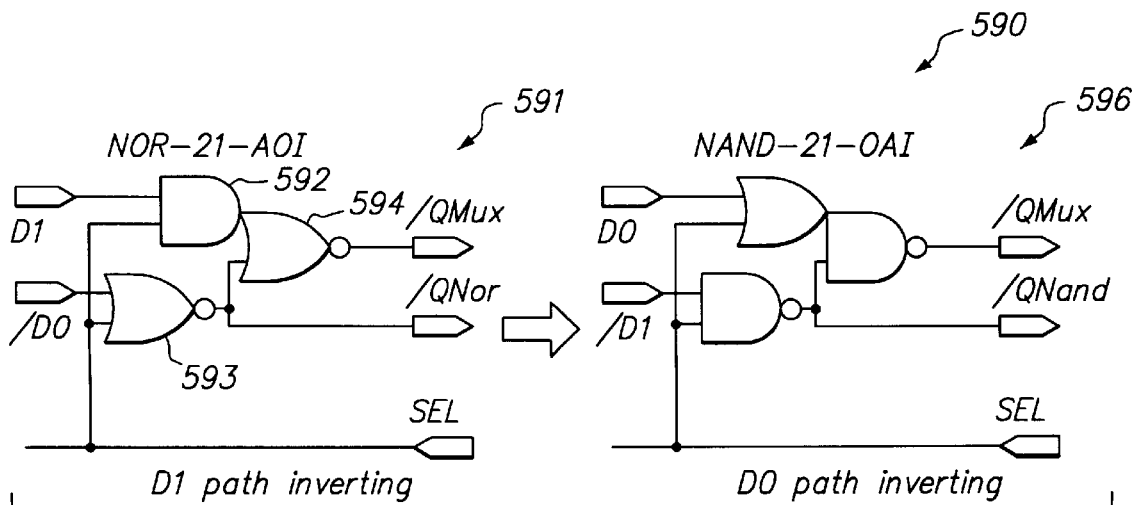
FIG. 5I depicts gate-level diagrams of two MUX modules according to an exemplary embodiment of the present invention.

As shown in FIG. 5I, the resulting circuit, 591, is attractive because it has the same number of transistors and internal wires as the 22-AOI implementation 580 and it offers one "true" data input and one "inverted" data input. The is particularly useful given that the ALU design discussed above outputs alternating "true" and "complement" index bits which then are fed to the 8× 2:1 MASK multiplexor 514. This multiplexor design allows the use of either the "true" or "complement" multiplexor input to convert all the index bits to the same polarity. Furthermore, if the two data inputs to this multiplexor circuit are tied together and the NOR output is pulled out, this circuit can now also be used to implement the XOR-NOR module, ALU module 556, required for the ALU implementation as discussed above. Thus the same primitive can be used for both the ALU and the multiplexors, which greatly simplifies the design.

NAND-21-OAI

In an exemplary embodiment, one additional transformation is still required for this circuit approach. The NOR-21-AOI module, MUX module 591, implementation of the multiplexor selects the non-inverting path when the select input is low and the inverting path when the select input is high. It is also desirable to have a multiplexor implementation that is reverses this select sequence. This allows two multiplexors sharing the same select input to simultaneously invert the input data in one multiplexor and to retain the data polarity in the other multiplexor. This may be accomplished by transforming the design 591 to a NAND-21-OAI module, MUX module 596, as shown in FIG. 5I.

The resulting circuit 596 reverses the selection of the inverting and non-inverting inputs. Furthermore, if the two data inputs to this multiplexor circuit are tied together and the NAND output is pulled out, this circuit can now also be used to implement the XNOR-NAND module, ALU module 552, required for the ALU implementation as discussed above. Now two primitives can satisfy the requirements for both the ALU and the IMask/IScale MUXes.

Figure 6:
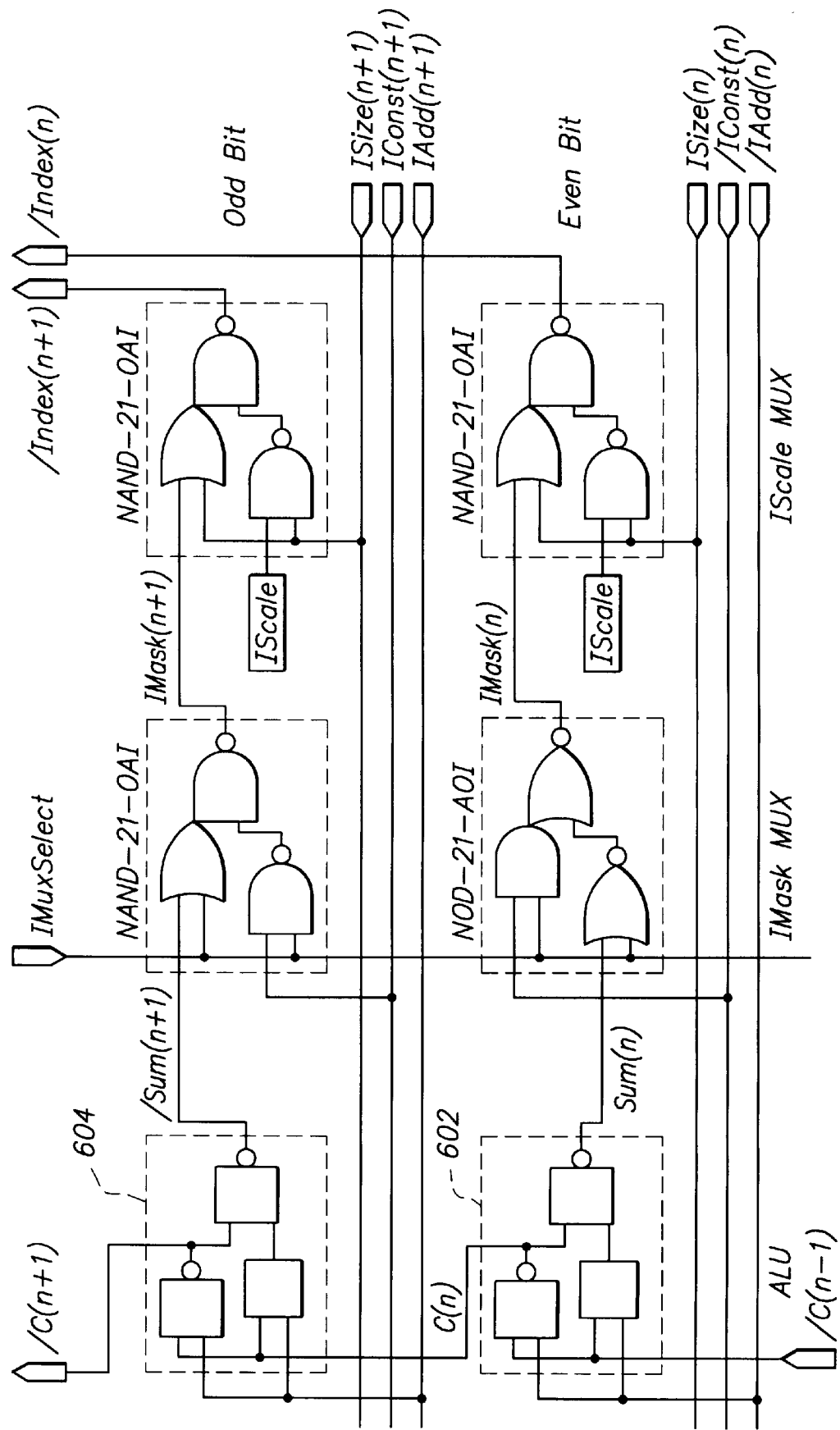
FIG. 6 is a gate-level diagram of an ALU, 8× 2:1 MASK multiplexor, and SCALE multiplexor arrangement according to an exemplary embodiment of the present invention.

Using these two MUX modules, the design of the ALU/MUX portion of the control slice is complete as shown in FIG. 6. The ALU 602 and 604 for even and odd index bits of the control slice is chosen per the rules given above with respect to the ALU Programming in the Table—ALU "Bit" Programming. The "even" ALU bit outputs are "true" while the "odd" ALU bit outputs are "inverted". This prompts the use of the NOR-21-AOI module, MUX module 591, for the 8× 2:1 MASK multiplexor 514 in the even index bits and the NAND-21-OAI module, MUX module 596, for the 8× 2:1 MASK multiplexor 514 in the odd index bits. This restores uniform polarity of the index bits at the output of the 8× 2:1 MASK multiplexor 514. Finally, the NAND-21-OAI module, MUX module 596, is used for the SCALE decoder 521 in all the index bits.

SCALE Decoder Wire Sharing

The SCALE decoder 521 takes a 7-bit input for each index bit position, decodes it to determine a scale value, and if selected, passes it to the index bit. This selection is determined by the ISize bus which always uses a thermometer value, selecting 8× 2:1 MASK multiplexor 514 output in the lower bit positions and the SCALE decoder 521 output in the upper bit positions. A convenient consequence of this is that in these lower order bit positions, the value of the SCALE decoder 521 outputs and thus their inputs are irrelevant. Similarly, in these upper order bit positions, the outputs of the ALU 512 and the 8× 2:1 MASK multiplexor 514 and thus their inputs—IAdd0, IAdd1, IConst0, and IConst1—are irrelevant. This means that these 4 wires can be shared with the 4 of the 7 inputs to SCALE decoder 521. This results in a height savings of 4 metal pitches per "bit" of the ALU 512/the 8× 2:1 MASK multiplexor 514/SCALE decoder 521 for a total saving of 32 metal pitches.

MSB/LSB Decoders

Figure 7:
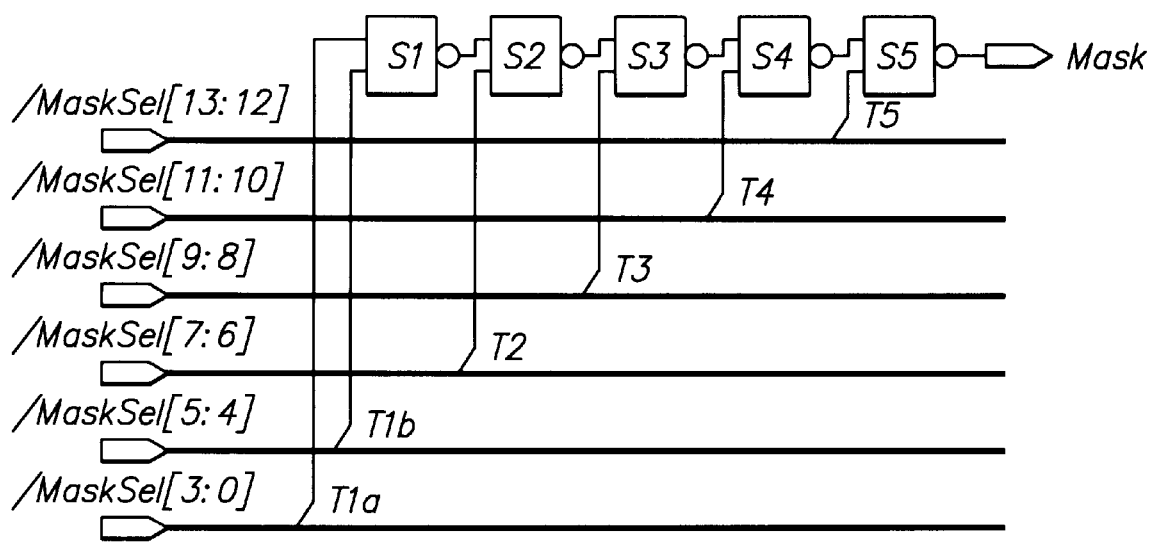
FIG. 7 is a block diagram of a MSB/LSB decoder according to an exemplary embodiment of the present invention.

As depicted in FIG. 7, each of the MSB and LSB decoders 518 and 519, a MSB/LSB decoder include a 5-stage chain of NAND/NOR gates where the connections to the MaskSel bus and the gate types are determined by the physical address of the control slice. The programming for the MSB decoder 518 is determined by the following rules:

TABLE 2A

MSB Mask Decode Programming

| Stage | Physical Add Bit | Add Bit Value = 0 Mask Bit Tap | Gate Type | Add Bit Value = 1 Mask Bit Tap | Gate Type | Add Bit Value = 2 Mask Bit Tap | Add Bit Value = 3 Mask Bit Tap |
|---|---|---|---|---|---|---|---|
| 1a | 1:0 | 0 | na | 1 | na | 2 | 3 |
| 1b | 2 | 4 | NOR | 5 | NAND | | |
| 2 | 3 | 6 | NAND | 7 | NOR | | |
| 3 | 4 | 8 | NOR | 9 | NAND | | |
| 4 | 5 | 10 | NAND | 11 | NOR | | |
| 5 | 6 | 12 | NOR | 13 | NAND | | |

The rules for the LSB decoder 519 are identical except that the NAND/NOR selections are reversed.

The nibble is the smallest unit that can be selected for masking. Individual bits in the nibble are selected for masking by bits 0, 1, 2, and 3 of the MaskSel bus. These bits are "inverted", so setting any combination of these bits "low" activates masking in the corresponding bits of the nibble of "slices".

The remaining bits of the MaskSelect bus are used to determine the "grouping" in which this nibble is repeated/expanded (byte, doublet, etc) and to enforce masking on one side of this "group" and to prevent masking on the other side of this "group". Masking is forced on the MSB (Most Significant Bit) side of the "group" in the MSB decoder 518 and on the LSB (Least Significant Bit) side of the "group" in the LSB decoder 519. The rules for programming this grouping are as follows:

TABLE 2B

Mask Decode Input Rules

| Controlling Bits | Effected "Group" | MSB Decoder | LSB Decoder |
|---|---|---|---|
| /MaskSel[3:0] | Corresponding Bits in Nibble | "Hi" = Don't Mask "Lo" = Mask | "Hi" = Don't Mask "Lo" = Mask |
| /MaskSel[4] | Even Nibbles | "Hi" = Prevent Masking "Lo" = Allow Masking | "Hi" = Allow Masking "Lo" = Force Masking |
| /MaskSel[5] | Odd Nibbles | "Hi" = Allow Masking "Lo" = Force Masking | "Hi" = Prevent Masking "Lo" = Allow Masking |
| /MaskSel[6] | Even Bytes | "Lo" = Prevent Masking "Hi" = Allow Masking | "Lo" = Allow Masking "Hi" = Force Masking |
| /MaskSel[7] | Odd Bytes | "Lo" = Allow Masking "Hi" = Force Masking | "Lo" = Prevent Masking "Hi" = Allow Masking |
| /MaskSel[8] | Even Doublets | "Hi" = Prevent Masking "Lo" = Allow Masking | "Hi" = Allow Masking "Lo" = Force Masking |
| /MaskSel[9] | Odd Doublets | "Hi" = Allow Masking "Lo" = Force Masking | "Hi" = Prevent Masking "Lo" = Allow Masking |
| /MaskSel[10] | Even Quadlets | "Lo" = Prevent Masking "Hi" = Allow Masking | "Lo" = Allow Masking "Hi" = Force Masking |
| /MaskSel[11] | Odd Quadlets | "Lo" = Allow Masking "Hi" = Force Masking | "Lo" = Prevent Masking "Hi" = Allow Masking |
| /MaskSel[12] | Even Octlet | "Hi" = Prevent Masking "Lo" = Allow Masking | "Hi" = Allow Masking "Lo" = Force Masking |
| /MaskSel[13] | Odd Octlet | "Hi" = Allow Masking "Lo" = Force Masking | "Hi" = Prevent Masking "Lo" = Allow Masking |

These selected "groups" overlay each other to determine the total masking pattern. The "groups" selected by the higher order MaskSel bits take priority over lower "groups".

As an example, suppose that we wished to have the mask pattern "5" (i.e.—0101) occur in the two nibbles of byte number 5 of the cross-bar DESTINATION output word, with bytes 15–6 masked and bytes 4–0 not masked. This would be done as follows:

| Byte # | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| /MMaskSel[3:0] = 5 | 55 | 55 | 55 | 55 | 55 | 55 | 55 | 55 | 55 | 55 | 55 | 55 | 55 | 55 | 55 | 55 |
| /MMaskSel[5:4] = 10 | ?? | ?? | ?? | ?? | ?? | ?? | ?? | ?? | ?? | ?? | ?? | ?? | ?? | ?? | ?? | ?? |
| MMaskSel[7:6] = 00 | ?? | — | ?? | — | ?? | — | ?? | — | ?? | — | ?? | — | ?? | — | ?? | — |
| /MMaskSel[9:8] = 00 | XX | XX | ?? | ?? | XX | XX | ?? | ?? | XX | XX | ?? | ?? | XX | XX | ?? | ?? |
| MMaskSel[11:10] = 00 | ?? | ?? | ?? | ?? | — | — | — | — | ?? | ?? | ?? | ?? | — | — | — | — |
| /MMaskSel[13:12] = 00 | XX | XX | XX | XX | XX | XX | XX | XX | ?? | ?? | ?? | ?? | ?? | ?? | ?? | ?? |
| Resulting Mask Pattern | XX | XX | XX | XX | XX | XX | XX | XX | XX | XX | 55 | — | — | — | — | — |

"X" = masked
"—" = not masked

Note that bits 6,7,10, and 11 of the MaskSel bus are "true" while the remaining bits are "inverted". The schematics use two separate busses, one "true" and one "inverted", to carry these bits. This is done only as a convenience in the schematics since the schematic editor does not allow mixing of signal names in a bus. The layout combines the used signals in one single bus.

The outputs of the MSB/LSB decoders 518 and 519 go to three sets of multiplexors IMsk 522, IOff 523, & ISet 524 which in turn feed the 8× 2:1 MASK multiplexor 514, the Force_Off logic 525, and the Kill_Bit7 logic 526. These multiplexors 522–524 are simple AND-OR multiplexors built with AOIs and inverters and/or NAND gates.

Kill_Bit Logic

The Kill_Bit logic 526 combines the Kill_Bit signals and the output of the ISet multiplexor 524 to override the state of index bits 6 and 7. The logic 526 is implemented with AOI, inverter, and NAND gates.

Instruction Decoding

Instructions are decoded from the 32-bit form, shown in FIGS. 9, 10A, 11A, 12A, 13, 14, 15, 16A, 17, 18, and 19, into the signals required for the control logic, shown in FIG. 8. For each instruction, the control logic signals can be determined by use of FIG. 8.

The DMLC field defines which registers are used as: D: the register destination of the crossbar switch result, ML: the M and L inputs to the switch array, and C: which values are used to control the switch (The C field is an i to indicate an immediate value or a b to indicate the contrents of register rb).

Mmask_Select is defined by the value of Mmasksel and Mask_size in the table.

Lmask_Select is defined by the value of Lmasksel and Mask_size in the table.

Isize is defined by the selection value described in Ind-Bitsel as the size for which imainsel is selected.

Isize is also used to select either the corresponding Imux_select controls or the Iconst1, Iconst0, Iadd1, Iadd0 controls for each index bit as a single set of wires is used to control both circuits. The wires can be shared because the Isize control selects either the Scale or ALU/Mask subcircuits in FIG. 8, and the results of the unselected unit is a "don't care" for these bits.

Imux_Select is defined to arrange to shift index bits left or right by the value of ishl and ishr, as selected in IndBitSel. Note in particular that the Crossbar Shuffle instruction shifts certain index bits to the left and others to the right, as defined by the instruction immediate values.

Iconst1 and Iconst0 are defined by the values of iconst1 and iconst0 in the table.

Iadd1 is defined by the value of iaddam in the table, but is exclusively-or'ed with Mask_size for Crossbar compress and Crossbar extract instructions.

Iadd0 is defined by the value of iaddam in the table.

Select_Marge is defined to select the mask define by the value of Merge in the table.

Select_Enable and Select_Imask are defined to select the mask defined by the value of Enable in the table.

Force_Off is defined as a 1 for instructions in which the upper 64 bits of the result is not used. Crossbar compress immediate and Crossbar unsigned compress immediate.

Kill_Bit6 is defined as a 1 for Crossbar expand and Crossbar unsigned expand instructions.

Kill_Bit7 is defined as a 1 for instructions in which the M operand is not used, as shown by an underscore () under the M portion of the DMLC control of the table.

Crossbar

These operations take operands from two registers, perform operations on partitions of bits in the operands, and place the concatenated results in a third register.

TABLE 3A

| | |
|---|---|
| X.COMPRESS.2 | Crossbar compress signed pecks |
| X.COMPRESS.4 | Crossbar compress signed nibbles |
| X.COMPRESS.8 | Crossbar compress signed bytes |
| X.COMPRESS.16 | Crossbar compress signed doublets |
| X.COMPRESS.32 | Crossbar compress signed quadlets |
| X.COMPRESS.64 | Crossbar compress signed octlets |
| X.COMPRESS.128 | Crossbar compress signed hexlet |
| X.COMPRESS.U.2 | Crossbar compress unsigned pecks |
| X.COMPRESS.U.4 | Crossbar compress unsigned nibbles |
| X.COMPRESS.U.8 | Crossbar compress unsigned bytes |
| X.COMPRESS.U.16 | Crossbar compress unsigned doublets |
| X.COMPRESS.U.32 | Crossbar compress unsigned quadlets |
| X.COMPRESS.U.64 | Crossbar compress unsigned octlets |
| X.COMPRESS.U.128 | Crossbar compress unsigned hexlet |
| X.EXPAND.2 | Crossbar expand signed pecks |
| X.EXPAND.4 | Crossbar expand signed nibbles |
| X.EXPAND.8 | Crossbar expand signed bytes |
| X.EXPAND.16 | Crossbar expand signed doublets |
| X.EXPAND.32 | Crossbar expand signed quadlets |
| X.EXPAND.64 | Crossbar expand signed octlets |
| X.EXPAND.128 | Crossbar expand signed hexlet |
| X.EXPAND.U.2 | Crossbar expand unsigned pecks |
| X.EXPAND.U.4 | Crossbar expand unsigned nibbles |
| X.EXPAND.U.8 | Crossbar expand unsigned bytes |
| X.EXPAND.U.16 | Crossbar expand unsigned doublets |
| X.EXPAND.U.32 | Crossbar expand unsigned quadlets |
| X.EXPAND.U.64 | Crossbar expand unsigned octlets |
| X.EXPAND.U.128 | Crossbar expand unsigned hexlet |
| X.ROTL.2 | Crossbar rotate left pecks |
| X.ROTL.4 | Crossbar rotate left nibbles |
| X.ROTL.8 | Crossbar rotate left bytes |
| X.ROTL.16 | Crossbar rotate left doublets |
| X.ROTL.32 | Crossbar rotate left quadlets |
| X.ROTL.64 | Crossbar rotate left octlets |
| X.ROTL.128 | Crossbar rotate left hexlet |
| X.ROTR.2 | Crossbar rotate right pecks |
| X.ROTR.4 | Crossbar rotate right nibbles |
| X.ROTR.8 | Crossbar rotate right bytes |
| X.ROTR.16 | Crossbar rotate right doublets |
| X.ROTR.32 | Crossbar rotate right quadlets |
| X.ROTR.64 | Crossbar rotate right octlets |

TABLE 3A-continued

| | |
|---|---|
| X.ROTR.128 | Crossbar rotate right hexlet |
| X.SHL.2 | Crossbar shift left pecks |
| X.SHL.2.O | Crossbar shift left signed pecks check overflow |
| X.SHL.4 | Crossbar shift left nibbles |
| X.SHL.4.O | Crossbar shift left signed nibbles check overflow |
| X.SHL.8 | Crossbar shift left bytes |
| X.SHL.8.O | Crossbar shift left signed bytes check overflow |
| X.SHL.16 | Crossbar shift left doublets |
| X.SHL.16.O | Crossbar shift left signed doublets check overflow |
| X.SHL.32 | Crossbar shift left quadlets |
| X.SHL.32.O | Crossbar shift left signed quadlets check overflow |
| X.SHL.64 | Crossbar shift left octlets |
| X.SHL.64.O | Crossbar shift left signed octlets check overflow |
| X.SHL.128 | Crossbar shift left hexlet |
| X.SHL.128.O | Crossbar shift left signed hexlet check overflow |
| X.SHL.U.2.O | Crossbar shift left unsigned pecks check overflow |
| X.SHL.U.4.O | Crossbar shift left unsigned nibbles check overflow |
| X.SHL.U.8.O | Crossbar shift left unsigned bytes check overflow |
| X.SHL.U.16.O | Crossbar shift left unsigned doublets check overflow |
| X.SHL.U.32.O | Crossbar shift left unsigned quadlets check overflow |
| X.SHL.U.64.O | Crossbar shift left unsigned octlets check overflow |
| X.SHL.U.128.O | Crossbar shift left unsigned hexlet check overflow |
| X.SHR.2 | Crossbar signed shift right pecks |
| X.SHR.4 | Crossbar signed shift right nibbles |
| X.SHR.8 | Crossbar signed shift right bytes |
| X.SHR.16 | Crossbar signed shift right doublets |
| X.SHR.32 | Crossbar signed shift right quadlets |
| X.SHR.64 | Crossbar signed shift right octlets |
| X.SHR.128 | Crossbar signed shift right hexlet |
| X.SHR.U.2 | Crossbar shift right unsigned pecks |
| X.SHR.U.4 | Crossbar shift right unsigned nibbles |
| X.SHR.U.8 | Crossbar shift right unsigned bytes |
| X.SHR.U.16 | Crossbar shift right unsigned doublets |
| X.SHR.U.32 | Crossbar shift right unsigned quadlets |
| X.SHR.U.64 | Crossbar shift right unsigned octlets |
| X.SHR.U.128 | Crossbar shift right unsigned hexlet |

TABLE 3B

| class | op | | | size | | | | | | |
|---|---|---|---|---|---|---|---|---|---|---|
| precision | EXPAND | | EXPAND.U | | 2 | 4 | 8 | 16 | 32 | 64 | 128 |
| | COMPRESS | | COMPRESS.U | | | | | | | | |
| shift | ROTR | ROTL | SHR | SHL | 2 | 4 | 8 | 16 | 32 | 64 | 128 |
| | SHL.O | SHL.U.O | SHR.U | | | | | | | | |

The format is shown in FIG. 9.

Description

Two values are taken from the contents of registers rc and rb. The specified operation is performed, and the result is placed in register rd.

The Definition is as follows:

```
def Crossbar(op,size,rd,rc,rb)
    c ← RegRead(rc, 128)
    b ← RegRead(rb, 128)
    shift ← b and (size-1)
    case op_{5..2} || 0^2 of
        X.COMPRESS:
            hsize ← size/2
            for i ← 0 to 64-hsize by size
                if shift ≤ hsize then
                    a_{i+hsize-1..i} ← c_{i+i+shift+hsize-1..i+i+shift}
                else
                    a_{i+hsize-1..i} ← 0^{shift-hsize} || c_{i+i+size-1..i+i+shift}
                endif
            endfor
            a_{127..64} ← 0
        X.EXPAND:
            hsize ← size/2
            for i ← 0 to 64-hsize by size
                if shift ≤ hsize then
                    a_{i+i+size-1..i+i} ← c_{i+hsize-1}^{hsize-shift} || c_{i+hsize-1..i} || 0^{shift}
                else
                    a_{i+i+size-1..i+i} ← c_{i+size-shift-1..i} || 0^{shift}
                endif
            endfor
        X.EXPAND.U:
            hsize ← size/2
            for i ← 0 to 64-hsize by size
                if shift ≤ hsize then
                    a_{i+i+size-1..i+i} ← 0^{hsize-shift} || c_{i+hsize-1..i} || 0^{shift}
                else
                    a_{i+i+size-1..i+i} ← c_{i+size-shift-1..i} || 0^{shift}
                endif
            endfor
        X.ROTL:
            for i ← 0 to 128-size by size
                a_{i+size-1..i} ← c_{i+size-1-shift..i} || c_{i+size-1..i+size-1-shift}
            endfor
        X.ROTR:
            for i ← 0 to 128-size by size
                a_{i+size-1..i} ← c_{i+shift-1..i} || c_{i+size-1..i+shift}
            endfor
        X.SHL:
            for i ← 0 to 128-size by size
                a_{i+size-1..i} ← c_{i+size-1-shift..i} || 0^{shift}
            endfor
        X.SHL.O:
            for i ← 0 to 128-size by size
                if c_{i+size-1..i+size-1-shift} ≠ c_{i+size-1-shift}^{shift+1} then
                    raise FixedPointArithmetic
                endif
                a_{i+size-1..i} ← c_{i+size-1-shift..i} || 0^{shift}
            endfor
        X.SHL.U.O:
            for i ← 0 to 128-size by size
                if c_{i+size-1..i+size-shift} ≠ 0^{shift} then
                    raise FixedPointArithmetic
                endif
                a_{i+size-1..i} ← c_{i+size-1-shift..i} || 0^{shift}
            endfor
        X.SHR:
            for i ← 0 to 128-size by size
                a_{i+size-1..i} ← c_{i+size-1}^{shift} || c_{i+size-1..i+shift}
            endfor
        X.SHR.U:
            for i ← 0 to 128-size by size
                a_{i+size-1..i} ← 0^{shift} || c_{i+size-1..i+shift}
            endfor
    endcase
    RegWrite(rd, 128, a)
enddef.
```

The Exception is Fixed-point arithmetic.

Crossbar Extract

These operations take operands from three registers, perform operations on partitions of bits in the operands, and place the concatenated results in a fourth register.

TABLE 4A

| | |
|---|---|
| X.EXTRACT | Crossbar extract |

The Format is shown in FIG. 10A.

Description

The contents of registers rd, rc, and rb are fetched. The specified operation is performed on these operands. The result is placed into register ra.

Bits 31..0 of the contents of register rb specifies several parameters that control the manner in which data is extracted, and for certain operations, the manner in which the operation is performed. The position of the control fields allows for the source position to be added to a fixed control value for dynamic computation, and allows for the lower 16 bits of the control field to be set for some of the simpler extract cases by a single GCOPYI.128 instruction. The control fields are further arranged so that if only the low order 8 bits are non-zero, a 128-bit extraction with truncation and no rounding is performed, as shown in FIG. 10B.

The table below describes the meaning of each label, as shown in Table 4B.

TABLE 4B

| label | bits | meaning |
|---|---|---|
| fsize | 8 | field size |
| dpos | 8 | destination position |
| x | 1 | extended vs. group size result |
| s | 1 | signed vs. unsigned |
| n | 1 | reserved |
| m | 1 | merge vs. extract |
| l | 1 | reserved |
| rnd | 2 | reserved |
| gssp | 9 | group size and source position |

The 9-bit gssp field encodes both the group size, gsize, and source position, spos, according to the formula gssp=512−4*gsize+spos. The group size, gsize, is a power of two in the range 1 . . . 128. The source position, spos, is in the range 0..(2*gsize)−1.

The values in the x, s, n, m, l, and rnd fields have the following meaning in Table 4C.

TABLE 4C

| values | x | s | n | m | l | rnd |
|---|---|---|---|---|---|---|
| 0 | group | unsigned |  | extract |  |  |
| 1 | extended | signed |  | merge |  |  |
| 2 |  |  |  |  |  |  |
| 3 |  |  |  |  |  |  |

For the X.EXTRACT instruction, when m=0 amd x=0, the parameters specified by the contents of register rb are interpreted to select a fields from double-size symbols of the the catenated contents of registers rd and rc, extracting values which are catenated and placed in register ra as shown in FIG. 10C.

For a crossbar-merge-extract (X.EXTRACT when m=1), the parameters specified by the contents of register rb are interpreted to merge a fields from symbols of the contents of register rd with the contents of register rc. The results are catenated and placed in register ra. The x field has no effect a when m=1 as shown in FIG. 10D.

For an crossbar-expand-extract (X.EXTRACT when m=0 and x=1), the parameters specified by the contents of register rb are interpreted to extract fields from symbols of the contents of register rd. The results are catenated and placed in register ra. Note that the value of rc is not used as shown in FIG. 10E.

The Definition is as follows:

```
def CrossbarExtract(op,ra,r,rc,rd) as
    d ← RegRead(rd, 128)
    c ← RegRead(rc, 128)
    b ← RegRead(rb, 128)
```

-continued

```
case b_{8..0} of
    0..255:
        gsize ← 128
    256..383:
        gsize ← 64
    384..447:
        gsize ← 32
    448..479:
        gsize ← 16
    480..495:
        gsize ← 8
    496..503:
        gsize ← 4
    504..507:
        gsize ← 2
    508..511:
        gsize ← 1
endcase
m ← b_{12}
as ← signed ← b_{14}
x ← b_{15}
h ← (2−(m or x))*gsize
spos ← (b_{8..0}) and ((2−m)*gsize−1)
dpos ← (0 ∥ b_{23..16}) and (gsize−1)
sfsize ← (0 ∥ b_{31..24}) and (gsize−1)
tfsize ← (sfsize = 0) or ((sfsize+dpos) > gsize) ? gsize-dpos : sfsize
fsize ← (tfsize + spos > h) ? h − spos : tfsize
for i ← 0 to 128-gsize by size
    case op of
        X.EXTRACT:
            if m or x then
                p ← d_{gsize+i−1..i}
            else
                p ← (d ∥ c)_{2*(gsize+1)−1..2*i}
            endif
    endcase
    v ← (as & p_{h−1})∥p
    w ← (as & v_{spos+fsize−1})^{gsize-fsize-dpos} ∥ v_{fsize−1+spos..spos} ∥ 0^{dpos}
    if m then
        a_{gsize−1+i..i} ← c_{gsize−1+i..dpos+fsize+i} ∥ w_{dpos+fsize−1..dpos} ∥ c_{dpos−1+1..i}
    else
        a_{gsize−1+i..i} ← w
    endif
endfor
RegWrite(ra, 128, a)
enddef.
```

The are no Exceptions.

Crossbar Field

These operations take operands from a register and two immediate values, perform operations on partitions of bits in the operands, and place the concatenated results in the second register.

TABLE 5A

| X.DEPOSIT.2 | Crossbar deposit signed pecks |
|---|---|
| X.DEPOSIT.4 | Crossbar deposit signed nibbles |
| X.DEPOSIT.8 | Crossbar deposit signed bytes |
| X.DEPOSIT.16 | Crossbar deposit signed doublets |
| X.DEPOSIT.32 | Crossbar deposit signed quadlets |
| X.DEPOSIT.64 | Crossbar deposit signed octlets |
| X.DEPOSIT.128 | Crossbar deposit signed hexlet |
| X.DEPOSIT.U.2 | Crossbar deposit unsigned pecks |
| X.DEPOSIT.U.4 | Crossbar deposit unsigned nibbles |
| X.DEPOSIT.U.8 | Crossbar deposit unsigned bytes |
| X.DEPOSIT.U.16 | Crossbar deposit unsigned doublets |
| X.DEPOSIT.U.32 | Crossbar deposit unsigned quadlets |
| X.DEPOSIT.U.64 | Crossbar deposit unsigned octlets |
| X.DEPOSIT.U.128 | Crossbar deposit unsigned hexlet |
| X.WITHDRAW.U.2 | Crossbar withdraw unsigned pecks |
| X.WITHDRAW.U.4 | Crossbar withdraw unsigned nibbles |
| X.WITHDRAW.U.8 | Crossbar withdraw unsigned bytes |
| X.WITHDRAW.U.16 | Crossbar withdraw unsigned doublets |
| X.WITHDRAW.U.32 | Crossbar withdraw unsigned quadlets |
| X.WITHDRAW.U.64 | Crossbar withdraw unsigned octlets |
| X.WITHDRAW.U.128 | Crossbar withdraw unsigned hexlet |

TABLE 5A-continued

| | |
|---|---|
| X.WITHDRAW.2 | Crossbar withdraw pecks |
| X.WITHDRAW.4 | Crossbar withdraw nibbles |
| X.WITHDRAW.8 | Crossbar withdraw bytes |
| X.WITHDRAW.16 | Crossbar withdraw doublets |
| X.WITHDRAW.32 | Crossbar withdraw quadlets |
| X.WITHDRAW.64 | Crossbar withdraw octlets |
| X.WITHDRAW.128 | Crossbar withdraw hexlet |

TABLE 5B

| | |
|---|---|
| X.SEX.I.2 | Crossbar extend immediate signed pecks |
| X.SEX.I.4 | Crossbar extend immediate signed nibbles |
| X.SEX.I.8 | Crossbar extend immediate signed bytes |
| X.SEX.I.16 | Crossbar extend immediate signed doublets |
| X.SEX.I.32 | Crossbar extend immediate signed quadlets |
| X.SEX.I.64 | Crossbar extend immediate signed octlets |
| X.SEX.I.128 | Crossbar extend immediate signed hexlet |
| X.ZEX.I.2 | Crossbar extend immediate unsigned pecks |
| X.ZEX.I.4 | Crossbar extend immediate unsigned nibbles |
| X.ZEX.I.8 | Crossbar extend immediate unsigned bytes |
| X.ZEX.I.16 | Crossbar extend immediate unsigned doublets |
| X.ZEX.I.32 | Crossbar extend immediate unsigned quadlets |
| X.ZEX.I.64 | Crossbar extend immediate unsigned octlets |
| X.ZEX.I.128 | Crossbar extend immediate unsigned hexlet |
| X.SHL.I.gsize rd=rc,i | → X.DEPOSIT.gsize rd=rc,size-i,i |
| X.SHR.I.gsize rd=rc,i | → X.WITHDRAW.gsize rd=rc,size-i,i |
| X.SHRU.I.gsize rd=rc,i | → X.WITHDRAW.U.gsize rd=rc,size-i,i |
| X.SEX.I.gsize rd=rc,i | → X.DEPOSIT.gsize rd=rc,i,0 |
| X.ZEX.I.gsize rd=rc,i | → X.DEPOSIT.U.gsize rd=rc,i,0 |

TABLE 5C

| | | |
|---|---|---|
| X.DEPOSIT.gsize rd=rc,gsize,0 | ⇔ | X.COPY rd=rc |
| X.DEPOSIT.U.gsize rd=rc,gsize,0 | ⇔ | X.COPY rd=rc |
| X.WITHDRAW.gsize rd=rc,gsize,0 | ⇔ | X.COPY rd=rc |
| X.WITHDRAW.U.gsize rd=rc,gsize,0 | ⇔ | X.COPY rd=rc |

The Format is shown in FIG. 11A.

Description

The contents of register rc is fetched, and 7-bit immediate values are taken from the 2-bit ih and the 6-bit gsfp and gsfs fields. The specified operation is performed on these operands. The result is placed into register rd.

The diagram below shows legal values for the ih, gsfp and gsfs fields, indicating the group size to which they apply as shown in FIG. 11B.

The ih, gsfp and gsfs fields encode three values: the group size, the field size, and a shift amount. The shift amount can also be considered to be the source bit field position for group-withdraw instructions or the destination bit field position for group-deposit instructions. The encoding is designed so that combining the gsfp and gsfs fields with a bitwise-and produces a result which can be decoded to the group size, and so the field size and shift amount can be easily decoded once the group size has been determined.

The crossbar-deposit instructions deposit a bit field from the lower bits of each group partition of the source to a specified bit position in the result. The value is either sign-extended or zero-extended, as specified in FIG. 11C.

The crossbar-withdraw instructions withdraw a bit field from a specified bit position in the each group partition of the source and place it in the lower bits in the result. The value is either sign-extended or zero-extended, as specified in FIG. 11D.

The Definition is as shown below:

```
def CrossbarField(op,rd,rc,gsfp,gsfs) as
    c ← RegRead(rc, 128)
    case ((op₁ ∥ gsfp) and op₀ ∥gsfs)) of
        0..63:
            gsize ← 128
        64..95:
            gsize ← 64
        96..111:
            gsize ← 32
        112..119:
            gsize ← 16
        120..123:
            gsize ← 8
        124..125:
            gsize ← 4
        126:
            gsize ← 2
        127:
            raise ReservedInstruction
    endcase
    ishift ← (op₁ ∥ gsfp) and (gsize−1)
    isize ← ((op₀ ∥ gsfs) and (gsize−1))+1
    if (ishift+isize>gsize)
        raise ReservedInstruction
    endif
    case op of
        X.DEPOSIT:
            for i ← 0 to 128-gsize by gsize
                a_{i+gsize−1..i} ← c_{i+size−1}^{gsize-isize-ishift} ∥ c_{i+isize−1..i} ∥ 0^{ishift}
            endfor
        X.DEPOSIT.U:
            for i ← 0 to 128-gsize by gsize
                a_{i+gsize−1..i} ← 0^{gsize-isize-ishift} ∥ c_{i+size−1..i} 0^{ishift}
            endfor
        X.WITHDRAW:
            for i ← 0 to 128-gsize by gsize
                a_{i+gsize−1..i} ← c_{i+isize+ishift−1}^{size-isize} ∥ c_{i+isize+ishift−1..i+shift}
            endfor
        X.WITHDRAW.U:
            for i ← 0 to 128-gsize by gsize
                a_{i+gsize−1..i} ← 0^{gsize-isize} ∥ c_{i+isize+ishift−1..i+shift}
            endfor
    endcase
    RegWrite(rd, 128, a)
enddef.
```

The Exception is a Reserved instruction.

Crossbar Field Inplace

These operations take operands from two registers and two immediate values, perform operations on partitions of bits in the operands, and place the concatenated results in the second register.

The Operation codes are as follows in TABLT 6A.

TABLE 6A

| | |
|---|---|
| X.DEPOSIT.M.2 | Crossbar deposit merge pecks |
| X.DEPOSIT.M.4 | Crossbar deposit merge nibbles |
| X.DEPOSIT.M.8 | Crossbar deposit merge bytes |
| X.DEPOSIT.M.16 | Crossbar deposit merge doublets |
| X.DEPOSIT.M.32 | Crossbar deposit merge quadlets |
| X.DEPOSIT.M.64 | Crossbar deposit merge octlets |
| X.DEPOSIT.M.128 | Crossbar deposit merge hexlet |

The Equivalencies are as follows in TABLE 6B.

TABLE 6B

| | |
|---|---|
| X.DEPOSIT.M.1 | Crossbar deposit merge bits |
| X.DEPOSIT.M.1 rd@rc,1,0 | → X.COPY rd = rc |

The Redundancies are as follows in TABLE 6C.

TABLE 6C

| XDEPOSIT.M.gsize rd@rc,gsize,0 | <=> X.COPY rd = rc |
|---|---|

The Format is as shown in FIG. 12A.

Description

The contents of registers rd and rc are fetched, and 7-bit immediate values are taken from the 2-bit ih and the 6-bit gsfp and gsfs fields. The specified operation is performed on these operands. The result is placed into register rd.

The diagram below shows legal values for the ih, gsfp and gsfs fields, indicating the group size to which they apply as shown in FIG. 12B.

The ih, gsfp and gsfs fields encode three values: the group size, the field size, and a shift amount. The shift amount can also be considered to be the source bit field position for group-withdraw instructions or the destination bit field position for group-deposit instructions. The encoding is designed so that combining the gsfp and gsfs fields with a bitwise-and produces a result which can be decoded to the group size, and so the field size and shift amount can be easily decoded once the group size has been determined.

The crossbar-deposit-merge instructions deposit a bit field from the lower bits of each group partition of the source to a specified bit position in the result. The value is merged with the contents of register rd at bit positions above and below the deposited bit field. No sign- or zero-extension is performed by this instruction as shown in FIG. 12C.

The Definition is as follows:

```
def CrossbarFieldInplace(op,rd,rc,gsfp,gsfs) as
    c ← RegRead(rc, 128)
    d ← RegRead(rd, 128)
    case ((op₁ ∥ gsfp) and (op₀ ∥ gsfs)) of
        0..63:
            gsize ← 128
        64..95:
            gsize ← 64
        96..111:
            gsize ← 32
        112..119:
            gsize ← 16
        120..123:
            gsize ← 8
        124..125:
            gsize ← 4
        126:
            gsize ← 2
        127:
            raise ReservedInstruction
    endcase
    ishift ← (op₁ ∥ gsfp) and (gsize-1)
    isize ← ((op₀ ∥ gsfs) and (gsize-1))+1
    if (ishift+isize>gsize)
        raise ReservedInstruction
    endif
    for i ← 0 to 128-gsize by gsize
        a_{i+gsize-1..i} ← d_{i+gsize-1..i+isize+ishift} ∥ c_{i+isize-1..i} ∥ d_{i+ishift-1..i}
    endfor
    RegWrite(rd, 128, a)
enddef
```

The Exception is a Reserved instruction.

Crossbar Inplace

These operations take operands from three registers, perform operations on partitions of bits in the operands, and place the concatenated results in the third register.

The Operation Codes are as follows in TABLE 7A.

TABLE 7A

| X.SHL.M.2 | Crossbar shift left merge pecks |
|---|---|
| X.SHL.M.4 | Crossbar shift left merge nibbles |
| X.SHL.M.8 | Crossbar shift left merge bytes |
| X.SHL.M.16 | Crossbar shift left merge doublets |
| X.SHL.M.32 | Crossbar shift left merge quadlets |
| X.SHL.M.64 | Crossbar shift left merge octlets |
| X.SHL.M.128 | Crossbar shift left merge hexlet |
| X.SHR.M.2 | Crossbar shift right merge pecks |
| X.SHR.M.4 | Crossbar shift right merge nibbles |
| X.SHR.M.8 | Crossbar shift right merge bytes |
| X.SHR.M.16 | Crossbar shift right merge doublets |
| X.SHR.M.32 | Crossbar shift right merge quadlets |
| X.SHR.M.64 | Crossbar shift right merge octlets |
| X.SHR.M.128 | Crossbar shift right merge hexlet |

The Format is as shown in FIG. 13.

Description

The contents of registers rd, rc and rb are fetched. The specified operation is performed on these operands. The result is placed into register rd.

Register rd is both a source and destination of this instruction.

The Definition is as follows:

```
def CrossbarInplace(op,size,rd,rc,rb) as
    d ← RegRead(rd, 128)
    c ← RegRead(rc, 128)
    b ← RegRead(rb, 128)
    shift ← b and (size-1)
    for i ← 0 to 128-size by size
        case op of
            X.SHR.M:
                a_{i+size-1..i} ← c_{i+shift-1..i} ∥ d_{i+size-1..i+shift}
            X.SHL.M:
                a_{i+size-1..i} ← d_{i+size-1-shift..i} ∥ c_{i+shift-1..i}
    endfor
    Regwrite(rd, 128, a)
enddef
```

There are no Exceptions.

Crossbar Short Immediate

These operations take operands from a register and a short immediate value, perform operations on partitions of bits in the operands, and place the concatenated results in a register.

The Operation codes are as shown in TABLE 8A.

TABLE 8A

| X.COMPRESS.I.2 | Crossbar compress immediate signed pecks |
|---|---|
| X.COMPRESS.I.4 | Crossbar compress immediate signed nibbles |
| X.COMPRESS.I.8 | Crossbar compress immediate signed bytes |
| X.COMPRESS.I.16 | Crossbar compress immediate signed doublets |
| X.COMPRESS.I.32 | Crossbar compress immediate signed quadlets |
| X.COMPRESS.I.64 | Crossbar compress immediate signed octlets |
| X.COMPRESS.I.128 | Crossbar compress immediate signed hexlet |
| X.COMPRESS.I.U.2 | Crossbar compress immediate unsigned pecks |
| X.COMPRESS.I.U.4 | Crossbar compress immediate unsigned nibbles |
| X.COMPRESS.I.U.8 | Crossbar compress immediate unsigned bytes |
| X.COMPRESS.I.U.16 | Crossbar compress immediate unsigned doublets |
| X.COMPRESS.I.U.32 | Crossbar compress immediate unsigned quadlets |
| X.COMPRESS.I.U.64 | Crossbar compress immediate unsigned octlets |
| X.COMPRESS.I.U.128 | Crossbar compress immediate unsigned hexlet |
| X.EXPAND.I.2 | Crossbar expand immediate signed pecks |
| X.EXPAND.I.4 | Crossbar expand immediate signed nibbles |
| X.EXPAND.I.8 | Crossbar expand immediate signed bytes |
| X.EXPAND.I.16 | Crossbar expand immediate signed doublets |
| X.EXPAND.I.32 | Crossbar expand immediate signed quadlets |

TABLE 8A-continued

| | |
|---|---|
| X.EXPAND.I.64 | Crossbar expand immediate signed octlets |
| X.EXPAND.I.128 | Crossbar expand immediate signed hexlet |
| X.EXPAND.I.U.2 | Crossbar expand immediate unsigned pecks |
| X.EXPAND.I.U.4 | Crossbar expand immediate unsigned nibbles |
| X.EXPAND.I.U.8 | Crossbar expand immediate unsigned bytes |
| X.EXPAND.I.U.16 | Crossbar expand immediate unsigned doublets |
| X.EXPAND.I.U.32 | Crossbar expand immediate unsigned quadlets |
| X.EXPAND.I.U.64 | Crossbar expand immediate unsigned octlets |
| X.EXPAND.I.U.128 | Crossbar expand immediate unsigned hexlet |
| X.ROTL.I.2 | Crossbar rotate left immediate pecks |
| X.ROTL.I.4 | Crossbar rotate left immediate nibbles |
| X.ROTL.I.8 | Crossbar rotate left immediate bytes |
| X.ROTL.I.16 | Crossbar rotate left immediate doublets |
| X.ROTL.I.32 | Crossbar rotate left immediate quadlets |
| X.ROTL.I.64 | Crossbar rotate left immediate octlets |
| X.ROTL.I.128 | Crossbar rotate left immediate hexlet |
| X.ROTR.I.2 | Crossbar rotate right immediate pecks |
| X.ROTR.I.4 | Crossbar rotate right immediate nibbles |
| X.ROTR.I.8 | Crossbar rotate right immediate bytes |
| X.ROTR.I.16 | Crossbar rotate right immediate doublets |
| X.ROTR.I.32 | Crossbar rotate right immediate quadlets |
| X.ROTR.I.64 | Crossbar rotate right immediate octlets |
| X.ROTR.I.128 | Crossbar rotate right immediate hexlet |
| X.SHL.I.2 | Crossbar shift left immediate pecks |
| X.SHL.I.2.O | Crossbar shift left immediate signed pecks check overflow |
| X.SHL.I.4 | Crossbar shift left immediate nibbles |
| X.SHL.I.4.O | Crossbar shift left immediate signed nibbles check overflow |
| X.SHL.I.8 | Crossbar shift left immediate bytes |
| X.SHL.I.8.O | Crossbar shift left immediate signed bytes check overflow |
| X.SHL.I.16 | Crossbar shift left immediate doublets |
| X.SHL.I.16.O | Crossbar shift left immediate signed doublets check overflow |
| X.SHL.I.32 | Crossbar shift left immediate quadlets |
| X.SHL.I.32.O | Crossbar shift left immediate signed quadlets check overflow |
| X.SHL.I.64 | Crossbar shift left immediate octlets |
| X.SHL.I.64.O | Crossbar shift left immediate signed octlets check overflow |
| X.SHL.I.128 | Crossbar shift left immediate hexlet |
| X.SHL.I.128.O | Crossbar shift left immediate signed hexlet check overflow |
| X.SHL.I.U.2.O | Crossbar shift left immediate unsigned pecks check overflow |
| X.SHL.I.U.4.O | Crossbar shift left immediate unsigned nibbles check overflow |
| X.SHL.I.U.8.O | Crossbar shift left immediate unsigned bytes check overflow |
| X.SHL.I.U.16.O | Crossbar shift left immediate unsigned doublets check overflow |
| X.SHL.I.U.32.O | Crossbar shift left immediate unsigned quadlets check overflow |
| X.SHL.I.U.64.O | Crossbar shift left immediate unsigned octlets check overflow |
| X.SHL.I.U.128.O | Crossbar shift left immediate unsigned hexlet check overflow |
| X.SHR.I.2 | Crossbar signed shift right immediate pecks |
| X.SHR.I.4 | Crossbar signed shift right immediate nibbles |
| X.SHR.I.8 | Crossbar signed shift right immediate bytes |
| X.SHR.I.16 | Crossbar signed shift right immediate doublets |
| X.SHR.I.32 | Crossbar signed shift right immediate quadlets |
| X.SHR.I.64 | Crossbar signed shift right immediate octlets |
| X.SHR.I.128 | Crossbar signed shift right immediate hexlet |
| X.SHR.I.U.2 | Crossbar shift right immediate unsigned pecks |
| X.SHk.I.U.4 | Crossbar shift right immediate unsigned nibbles |
| X.SHR.I.U.8 | Crossbar shift right immediate unsigned bytes |
| X.SHR.I.U.16 | Crossbar shift right immediate unsigned doublets |
| X.SHR.I.U.32 | Crossbar shift right immediate unsigned quadlets |
| X.SHR.I.U.64 | Crossbar shift right immediate unsigned octlets |
| X.SHR.I.U.128 | Crossbar shift right immediate unsigned hexlet |

The Equivalencies are as shown in TABLE 8B.

TABLE 8B

| | |
|---|---|
| X.COPY | Crossbar copy |
| X.NOP | Crossbar no operation |
| X.COPY rd = rc | ← X.ROTL.I.128 rd = rc,0 |
| X.NOP | ← X.COPY r0 = r0 |

The Redundancies are as shown in TABLE 8C.

TABLE 8C

| | |
|---|---|
| X.ROTL.I.gsize rd = rc,0 | <=> X.COPY rd = rc |
| X.ROTR.I.gsize rd = rc,0 | <=> X.COPY rd = rc |
| X.ROTR.I.gsize rd = rc,shift | <=> X.ROTL.I.gsize rd = rc,gsize-shift |
| X.SHL.I.gsize rd = rc,0 | <=> X.COPY rd = rc |
| X.SHL.I.gsize.O rd = rc,0 | <=> X.COPY rd = rc |
| X.SHL.I.U.gsize.O rd = rc,0 | <=> X.COPY rd = rc |
| X.SHR.I.gsize rd = rc,0 | <=> X.COPY rd = rc |
| X.SHR.I.U.gsize rd = rc,0 | <=> X.COPY rd = rc |

The Selection is as shown in TABLE 8D.

TABLE 8D

| class | op | size |
|---|---|---|
| precision | COMPRESS.I COMPRESS.I.U EXPAND.I EXPAND.I.U | 2 4 8 16 32 64 128 |
| shift | ROTL.I ROTR.I SHL.I SHL.I.O SHL.I.U.O SHR.I SHR.I.U | 2 4 8 16 32 64 128 |
| copy | COPY | |

The Format is as shown in FIG. 14.

Description

A 128-bit value is taken from the contents of register rc. The second operand is taken from simm. The specified operation is performed, and the result is placed in register rd.

The Definition is as follows:

```
def CrossbarShortImmediate(op,rd,rc,simm)
    case (op_{1..0} || simm) of
        0..127:
            size ← 128
        128..191:
            size ← 64
        192..223:
            size ← 32
        224..239:
            size ← 16
        240..247:
            size ← 8
        248..251:
            size ← 4
        252..253:
            size ← 2
        254..255:
            raise ReservedInstruction
    endcase
    shift ← (op_0 || simm) and (size-1)
    c ← RegRead(rc, 128)
    case (op_{5..2} || 0^2) of
        X.COMPRESS.I:
            hsize ← size/2
            for i ← 0 to 64-hsize by hsize
                if shift ≤ hsize then
                    a_{i+hsize-1..i} ← c_{i+i+shift+hsize-1..i+i+shift}
                else
                    a_{i+hsize-1..i} ← c_{i+i+size-1}^{shift-hsize} || c_{i+i+size-1..i+i+shift}
                endif
```

```
        endfor
        a_{127..64} ← 0
X.COMPRESS.I.U:
    hsize ← size/2
    for i ← 0 to 64-hsize by hsize
        if shift ≤ hsize then
            a_{i+hsize-1..i} ← c_{i+i+shift+hsize-1..i+i+shift}
        else
            a_{i+hsize-1..i} ← 0^{shift-hsize} || c_{i+i+size-1..i+i+shift}
        endif
    endfor
    a_{127..64} ← 0
X.EXPAND.I:
    hsize ← size/2
    for i ← 0 to 64-hsize by hsize
        if shift ≤ hsize then
            a_{i+i+size-1..i+i} ← c_{i+hsize-1}^{hsize-shift} || c_{i+hsize-1..i} || 0^{shift}
        else
            a_{i+i+size-1..i+i} ← c_{i+size-shift-1..i} || 0^{shift}
        endif
    endfor
X.EXPAND.I.U:
    hsize ← size/2
    for i ← 0 to 64-hsize by hsize
        if shift ≤ hsize then
            a_{i+i+size-1..i+i} ← 0^{hsize-shift} || c_{i+hsize-1..i} || 0^{shift}
        else
            a_{i+i+size-1..i+i} ← c_{i+size-shift-1..i} || 0^{shift}
        endif
    endfor
X.SHL.I:
    for i ← 0 to 128-size by size
        a_{i+size-1..i} ← c_{i+size-1-shift..i} || 0^{shift}
    endfor
X.SHL.I.O:
    for i ← 0 to 128-size by size
        if c_{i+size-1..i+size-1-shift} ≠ c_{i+size-1-shift}^{shift+1} then
            raise FixedPointArithmetic
        endif
        a_{i+size-1..i} ← c_{i+size-1-shift..i} || 0^{shift}
    endfor
X.SHL.I.U.O:
    for i ← 0 to 128-size by size
        if c_{i+size-1..i+size-shift} ≠ 0^{shift} then
            raise FixedPointArithmetic
        endif
        a_{i+size-1..i} ← c_{i+size-1-shift..i} || 0^{shift}
    endfor
X.ROTR.I:
    for i ← 0 to 128-size by size
        a_{i+size-1..i} ← c_{i+shift-1..i} || c_{i+size-1..i+shift}
    endfor
X.SHR.I:
    for i ← 0 to 128-size by size
        a_{i+size-1..i} ← c_{i+size-1}^{shift} || c_{i+size-1..i+shift}
    endfor
X.SHR.I.U:
    for i ← 0 to 128-size by size
        a_{i+size-1..i} ← 0^{shift} || c_{i+size-1..i+shift}
    endfor
    endcase
    RegWrite(rd, 128, a)
enddef
```

The Exceptions are Fixed-point arithmetic and a Reserved Instruction.

Crossbar Short Immediate Inplace

These operations take operands from two registers and a short immediate value, perform operations on partitions of bits in the operands, and place the concatenated results in the second register.

The Operation codes are as shown in TABLE 9A.

TABLE 9A

| | |
|---|---|
| X.SHL.M.I.2 | Crossbar shift left merge immediate pecks |
| X.SHL.M.I.4 | Crossbar shift left merge immediate nibbles |
| X.SHL.M.I.8 | Crossbar shift left merge immediate bytes |
| X.SHL.M.I.16 | Crossbar shift left merge immediate doublets |
| X.SHL.M.I.32 | Crossbar shift left merge immediate quadlets |
| X.SHL.M.I.64 | Crossbar shift left merge immediate octlets |
| X.SHL.M.I.128 | Crossbar shift left merge immediate hexlet |
| X.SHR.M.I.2 | Crossbar shift right merge immediate pecks |
| X.SHR.M.I.4 | Crossbar shift right merge immediate nibbles |
| X.SHR.M.I.8 | Crossbar shift right merge immediate bytes |
| X.SHR.M.I.16 | Crossbar shift right merge immediate doublets |
| X.SHR.M.I.32 | Crossbar shift right merge immediate quadlets |
| X.SHR.M.I.64 | Crossbar shift right merge immediate octlets |
| X.SHR.M.I.128 | Crossbar shift right merge immediate hexlet |

The Format is as shown in FIG. 15.

Description

Two 128-bit values arr taken from the contents of registers rd and rc. A third operand is taken from simm. The specified operation is performed, and the result is placed in register rd.

This instruction is undefined and causes a reserved instruction exception if the simm field is greater or equal to the size specified.

The Definition is as follows:

```
def CrossbarShortImmediateInplace(op,rd,rc,simm)
    case (op_{1..0} || simm) of
        0..127:
            size ← 128
        128..191:
            size ← 64
        192..223:
            size ← 32
        224..239:
            size ← 16
        240..247:
            size ← 8
        248..251:
            size ← 4
        252..253:
            size ← 2
        254..255:
            raise ReservedInstruction
    endcase
    shift ← (op_0 || simm) and (size-1)
    c ← RegRead(rc, 128)
    d ← RegRead(rd, 128)
    for i ← 0 to 128-size by size
        case (op_{5..2} || 0^2) of
            X.SHR.M.I:
                a_{i+size-1..i} ← c_{i+shift-1..i} || d_{i+size-1..i+shift}
            X.SHL.M.I:
                a_{i+size-1..i} ← d_{i+size-1-shift..i} || c_{i+shift-1..i}
        endcase
    endfor
    RegWrite(rd, 128, a)
enddef
```

The Exception is a Reserved Instruction.

Crossbar Shuffle

These operations take operands from two registers, perform operations on partitions of bits in the operands, and place the concatenated results in a register.

The Operation codes are as shown in TABLE 10A.

TABLE 10A

| | |
|---|---|
| X.SHUFFLE.4 | Crossbar shuffle within pecks |
| X.SHUFFLE.8 | Crossbar shuffle within bytes |

TABLE 10A-continued

| | |
|---|---|
| X.SHUFFLE.16 | Crossbar shuffle within doublets |
| X.SHUFFLE.32 | Crossbar shuffle within quadlets |
| X.SHUFFLE.64 | Crossbar shuffle within octlets |
| X.SHUFFLE.128 | Crossbar shuffle within hexlet |
| X.SHUFFLE.256 | Crossbar shuffle within triclet |

The Format is as shown in FIG. 16A.

Description

One of two operations are performed, depending on whether the rc and rb fields are equal.

If the rc and rb fields are equal, a 128-bit operand is taken from the contents of register rc. Items of size v are divided into w piles and shuffled together, within groups of size bits, according to the value of op. The result is placed in register rd.

If the rc and rb fields are not equal, the contents of registers rc and rb are catenated into a 256-bit operand. Items of size v are divided into w piles and shuffled together, according to the value of op. Depending on the value of h, a sub-field of op, the low 128 bits (h=0), or the high 128 bits (h=1) of the 256-bit shuffled contents are selected as the result. The result is placed in register rd.

This instruction is undefined and causes a reserved instruction exception if rc and rb are not equal and the op field is greater or equal to 56, or if rc and rb are equal and op4..0 is greater or equal to 28.

A crossbar 4-way shuffle of bytes within hexlet instruction (X.SHUFFLE.128 rd=rcb,8,4) divides the 128-bit operand into 16 bytes and partitions the bytes 4 ways indicated by varying shade). The 4 partitions are perfectly shuffled, producing a 128-bit result as shown in FIG. 16B.

A crossbar 4-way shuffle of bytes within triclet instruction (X.SHUFFLE.256 rd=rc,rb,8,4,0) catenates the contents of rc and rb, then divides the 256-bit content into 32 bytes and partitions the bytes 4 ways (indicated by varying shade). The low-order halves of the 4 partitions are perfectly shuffled, producing a 128-bit result as shown in FIG. 16C.

Changing the last immediate value h to 1 (X.SHUFFLE.256 rd=rc,rb,8,4,1) modifies the operation to perform the same function on the high-order halves of the 4 partitions.

When rc and rb are equal, the table below shows the value of the op field and associated values for size, v, and w as shown in Table 10B.

TABLE 10B

| op | size | v | w |
|---|---|---|---|
| 0 | 4 | 1 | 2 |
| 1 | 8 | 1 | 2 |
| 2 | 8 | 2 | 2 |
| 3 | 8 | 1 | 4 |
| 4 | 16 | 1 | 2 |
| 5 | 16 | 2 | 2 |
| 6 | 16 | 4 | 2 |
| 7 | 16 | 1 | 4 |
| 8 | 16 | 2 | 4 |
| 9 | 16 | 1 | 8 |
| 10 | 32 | 1 | 2 |
| 11 | 32 | 2 | 2 |
| 12 | 32 | 4 | 2 |
| 13 | 32 | 8 | 2 |
| 14 | 32 | 1 | 4 |
| 15 | 32 | 2 | 4 |
| 16 | 32 | 4 | 4 |
| 17 | 32 | 1 | 8 |
| 18 | 32 | 2 | 8 |
| 19 | 32 | 1 | 16 |
| 20 | 64 | 1 | 2 |
| 21 | 64 | 2 | 2 |
| 22 | 64 | 4 | 2 |
| 23 | 64 | 8 | 2 |
| 24 | 64 | 16 | 2 |
| 25 | 64 | 1 | 4 |
| 26 | 64 | 2 | 4 |
| 27 | 64 | 4 | 4 |
| 28 | 64 | 8 | 4 |
| 29 | 64 | 1 | 8 |
| 30 | 64 | 2 | 8 |
| 31 | 64 | 4 | 8 |
| 32 | 64 | 1 | 16 |
| 33 | 64 | 2 | 16 |
| 34 | 64 | 1 | 32 |
| 35 | 128 | 1 | 2 |
| 36 | 128 | 2 | 2 |
| 37 | 128 | 4 | 2 |
| 38 | 128 | 8 | 2 |
| 39 | 128 | 16 | 2 |
| 40 | 128 | 32 | 2 |
| 41 | 128 | 1 | 4 |
| 42 | 128 | 2 | 4 |
| 43 | 128 | 4 | 4 |
| 44 | 128 | 8 | 4 |
| 45 | 128 | 16 | 4 |
| 46 | 128 | 1 | 8 |
| 47 | 128 | 2 | 8 |
| 48 | 128 | 4 | 8 |
| 49 | 128 | 8 | 8 |
| 50 | 128 | 1 | 16 |
| 51 | 128 | 2 | 16 |
| 52 | 128 | 4 | 16 |
| 53 | 128 | 1 | 32 |
| 54 | 128 | 2 | 32 |
| 55 | 128 | 1 | 64 |

When rc and rb are not equal, the table below shows the value of the op4..0 field and associated values for size, v, and w: Op5 is the value of h, which controls whether the low-order or high-order half of each partition is shuffled into the result, as shown in Table 10C.

TABLE 10C

| op4..0 | size | v | w |
|---|---|---|---|
| 0 | 256 | 1 | 2 |
| 1 | 256 | 2 | 2 |
| 2 | 256 | 4 | 2 |
| 3 | 256 | 8 | 2 |
| 4 | 256 | 16 | 2 |
| 5 | 256 | 32 | 2 |
| 6 | 256 | 64 | 2 |
| 7 | 256 | 1 | 4 |
| 8 | 256 | 2 | 4 |
| 9 | 256 | 4 | 4 |
| 10 | 256 | 8 | 4 |
| 11 | 256 | 16 | 4 |
| 12 | 256 | 32 | 4 |
| 13 | 256 | 1 | 8 |
| 14 | 256 | 2. | 8 |
| 15 | 256 | 4 | 8 |
| 16 | 256 | 8 | 8 |
| 17 | 256 | 16 | 8 |
| 18 | 256 | 1 | 16 |
| 19 | 256 | 2 | 16 |
| 20 | 256 | 4 | 16 |
| 21 | 256 | 8 | 16 |
| 22 | 256 | 1 | 32 |
| 23 | 256 | 2 | 32 |
| 24 | 256 | 4 | 32 |
| 25 | 256 | 1 | 64 |

TABLE 10C-continued

| $op_{4..0}$ | size | v | w |
|---|---|---|---|
| 26 | 256 | 2 | 64 |
| 27 | 256 | 1 | 128 |

The Definition is as follows:

```
def CrossbarShuffle(major,rd,rc,rb,op)
    c ← RegRead(rc, 128)
    b ← RegRead(rb, 128)
    if rc=rb then
        case of of
            0..55:
                for x ← 2 to 7; for y ← 0 to x-2; for z ← 1 to x-y-1
                    if op = ((x*x*x-3*x*x-4*x)/6-(z*z-z)/2+x*z+y) then
                        for i ← to 127
                            a_i ← c_(i6..x || i_y+z-1..y || i_x-1..y+z || i_y-1..0)
                        end
                    endif
                endfor; endfor; endfor
            56..63:
                raise ReservedInstruction
        endcase
    elseif
        case op_{4..0} of
            0..27:
                cb ← c || b
                x ← 8
                h ← op_5
                for y ← 0 to x-2; for z ← 1 to x-y-1
                    if op_{4..0} = ((17*z-z*z)/2-8+y) then
                        for i ← h*128 to 127+h*128
                            a_{i-h*128} ← cb_(iy+z-1..y || i_x-1..y+z || i_y-1..0)
                        end
                    endif
                endfor; endfor
            28..31;
                raise ReservedInstruction
        endcase
    endif
    RegWrite(rd, 128, a)
enddef.
```

The Exception is a Reserved Instruction.
Crossbar Swizzle
These operations perform calculations with a general register value and immediate values, placing the result in a general register.

TABLE 11

| X.SWIZZLE | Crossbar swizzle |
|---|---|

The Format is as shown in FIG. 17.
Description
The contents of register rc are fetched, and 7-bit immediate values, icopy and iswap, are constructed from the 2-bit in field and from the 6-bit icopya and iswapa fields. The specified operation is performed on these operands. The result is placed into register rd.
The Definition is as follows:

```
def GroupSwizzleImmediate(ih,rd,rc,icopya,iswapa) as
    icopy ← ih_1 || icopya
    iswap ← ih_0 || iswapa
    c ← RegRead(rc, 128)
    for i ← 0 to 127
        a_i ← c_(i & icopy) ^ iswap
    endfor
    RegWrite(rd, 128, a)
enddef.
```

There are no Exceptions.
Crossbar Ternary
These operations take three values from registers, perform a group of calculations on partitions of bits of the operands and place the catenated results in a fourth register.

TABLE 12

| X.SELECT.8 | Crossbar select bytes |
|---|---|

The Format is as shown in FIG. 18.
Description
The contents of registers rd, rc, and rb are fetched. The specified operation is performed on these operands. The result is placed into register ra.
The Definition is as follows:

```
def CrossbarTernary(op,rd,rc,rb,ra) as
    d ← RegRead(rd, 128)
    c ← RegRead(rc, 128)
    b ← RegRead(rb, 128)
    dc ← d || c
    for i ← 0 to 15
        j ← b_{8*i+4..8*i}
        a_{8*i+7..8*i} ← dc_{8*j+7..8*j}
    endfor
    RegWrite(ra, 128, a)
enddef.
```

There are no Exceptions.
Wide Switch
These instructions take an address from a general register to fetch a large operand from memory, a second operand from a general register, perform a group of operations on partitions of bits in the operands, and catenate the results together, placing the result in a general register.

TABLE 13

| W.SWITCH.B | Wide switch big-endian |
|---|---|
| W.SWITCH.L | Wide switch little-endian |

The Format is as shown in FIG. 18.
Description
The contents of register rc is specifies as a virtual address and optionally an operand size, and a value of specified size is loaded from memory. A second value is the catenated contents of registers rd and rb. Eight corresponding bits from the memory value are used to select a single result bit from the second value, for each corresponding bit position. The group of results is catenated and placed in register ra.
The virtual address must either be aligned to 128 bytes, or must be the sum of an aligned address and one-half of the size of the memory operand in bytes. An aligned address must be an exact multiple of the size expressed in bytes. The size of the memory operand must be 8, 16, 32, 64, or 128 bytes. If the address is not valid an "access disallowed by virtual address" exception occurs. When a size smaller than 128 bits is specified, the high order bits of the memory operand are replaced with values corresponding to the bit position, so that the same memory operand specifies a bit selection within symbols of the operand size, and the same operation is performed on each symbol.

The Definition is as follows:

```
def WideSwitch(op,rd,rc,rb,ra)
    d ← RegRead(rd, 128)
    c ← RegRead(rc, 64)
    b ← RegRead(rd, 128)
    if c_{1..0} ≠ 0 then
        raise AccessDisallowedByVirtualAddress
    elseif c_{6..0} ≠ 0 then
        VirtAddr ← c and (c−1)
        w ← wsize ← (c and (0−c)) || 0^1
    else
        VirtAddr ← c
        w ← wsize ← 128
    endif
    msize ← 8*wsize
    lwsize ← log(wsize)
    case op of
        W.SWITCH.B:
            order ← B
        W.SWITCH.L:
            order ← L
    endcase
    m ← LoadMemory(c,VirtAddr,msize,order)
    db ← d || b
    for i ← 0 to 127
        j ← 0 || i_{lwsize−1..0}
        k ← m_{7*w+j} ||m_{6*w+j} ||m_{5*w+j} ||m_{4*w+j} ||m_{3*w+j} ||m_{2*w+j} ||m_{w+j} ||m_{j}
        l ← i_{7..lwsize} || j_{lwsize−1..0}
        a_i ← db_l
    endfor
    RegWrite(ra, 128, a)
enddef.
```

The Exceptions are

Access disallowed by virtual address,

Access disallowed by tag,

Access disallowed by global TB,

Access disallowed by local TB,

Access detail required by tag,

Access detail required by local TB,

Access detail required by global TB,

Local TB miss, and

Global TB miss.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

We claim:

1. A cross-bar circuit that, in response to partially-decoded instruction information and in response to datapath information, (1) allows any bit from a $2^n$-bit input source word to be switched into any bit position of a $2^m$-bit output destination word and (2) provides the ability to set-to-zero any bit in said $2^m$-bit output destination word, said cross-bar circuit comprising:

a switch circuit comprising $2^m$ $2^n$:1 multiplexor circuits, wherein each of said $2^n$:1 multiplexor circuits (a) has a unique n-bit index input, one disable input, and a $2^n$-bit wide source input, (b) receives (i) an n-bit index at said n-bit index input, (ii) a disable bit at said disable input, and (iii) said $2^n$-bit input source word at said $2^n$-bit wide source input, and (c) decodes said n-bit index either (i) to select and output as an output destination bit one bit from said $2^n$-bit input source word if said disable bit has a logic low value or (ii) outputs a logic low as said output destination bit if said disable bit has a logic high value;

a cache memory that (a) has $2^m$ cache datapath inputs and $2^m$ cache index inputs, (b) receives (i) said datapath information on said $2^m$ cache datapath inputs and (ii) $2^m$ n-bit indexes on said $2^m$ cache index inputs, (c) provides a first set of said n-bit indexes for said switch circuit, and (d) comprises a small tightly coupled memory array that stores p entries of $2^m$ n-bit indexes for said switch circuit, said cache memory being logically coupled to said switch circuit; and a control circuit that (a) has a plurality of control inputs, (b) receives said partially-decoded instruction information on said plurality of control inputs, (c) provides a second set of said n-bit indexes for said switch circuit, and (d) provides said disable bits for said switch circuit, said control circuit being logically coupled to said switch circuit and to said cache memory.

2. The cross-bar circuit of claim 1 wherein said cache memory stores switching patterns provided by a datapath logically coupled to said cross-bar circuit.

3. The cross-bar circuit of claim 1 wherein said cache memory stores index patterns generated by instruction decode logic logically coupled to said cross-bar circuit.

4. The cross-bar circuit of claim 1 wherein said control circuit, in response to said partially-decoded instruction information, completes the decoding on said partially-decoded instruction information and, thereby, provides indexes and disable bits, wherein said control circuit further comprises:

an arithmetic logic unit (ALU) for each of the $2^m 2^n$:1 multiplexor circuits in said switch circuit, wherein said ALU adds an n-bit index addend to the m-bit physical address of each said $2^n$:1 multiplexor circuits;

a plurality of multiplexors logically coupled to said ALU and controlled by masks; and a plurality of decoders logically coupled to said plurality of multiplexors that generate said masks that control said multiplexors.

5. The cross-bar circuit of claim 4 wherein said decoding implements the "standard" cross-bar operations provided in an ISA.

6. A switch circuit that (1) allows any bit from a $2^n$-bit input source word to be switched into any bit position of a $2^m$-bit output destination word independently of the switching control of all other bit positions of the output destination word and (2) provides the ability to set-to-zero any bit in said $2^m$-bit output destination word, said switch circuit comprising:

$2^m$ $2^n$:1 multiplexor circuits, wherein each of said $2^n$:1 multiplexor circuits (a) has a unique n-bit index input and one disable input, (b) decodes an n-bit index received at said n-bit index input to select one bit from said $2^n$-bit input source word if a disable bit received at said disable input has a logic low value, and (c) outputs a logic low if said disable bit has a logic high value.

7. A switch circuit that (1) allows any bit from a $2^n$-bit input source word to be switched into any bit position of a $2^m$-bit output destination word and (2) provides the ability to set-to-zero any bit in said $2^m$-bit output destination word, said switch circuit comprising:

$2^m$ $2^n$:1 multiplexor circuits, wherein each of said $2^n$:1 multiplexor circuits (a) has a unique n-bit index input and one disable input (b) decodes an n-bit index received at said n-bit index input to select one bit from said 2n-bit input source word if a disable bit received at said disable input has a logic low value, and (c) outputs a logic low if said disable bit has a logic high value;

wherein each of said $2^n$:1 multiplexor circuits comprises:
  a $2^q$:1 pass gate selector, wherein said $2^q$:1 pass gate selector has $2^q$ precharge/discharge wire-OR bitline inputs;
  a sense amplifier logically coupled to said $2^q$:1 pass gate selector, wherein said sense amplifier (a) receives the output of said $2^q$:1 pass gate selector and (b) receives a dummy bitline input to allow differential sensing of small swing signals on said wire-OR bitline inputs; and
  $2^{n-q}$ unit switch cells per precharge/discharge wire-OR bitline input, each of said unit switch cells (a) being logically coupled to a wire-OR bitline input of said $2^q$:1 pass gate selector, (b) being logically coupled to one of $2^r$ active-LOW "SELA" select wires, and (c) being logically coupled to one of $2^{n-q-r}$ active-HIGH "SELC" select wires.

8. The switch circuit of claim 7 wherein each of said unit switch cells comprises:
  two series connected transistors of the same polarity, wherein the transistor closest to said wire-OR bitline inputs is logically coupled to said one of $2^r$ active-LOW "SELA" select wires and wherein the other transistor is logically coupled to a "SRC" data input wire;
  wherein in each of said unit switch cells, if said one of $2^r$ active-LOW "SELA" select wires has a logic LOW signal and said one of $2^{n-q-r}$ active-HIGH "SELC" select wires has a logic HIGH signal, then a wire-OR bitline logically coupled to said wire-OR bitline input discharges into said one of $2^r$ active-LOW "SELA" select wires if said "SRC" data input wire has a logic HIGH signal.

9. The cross-bar circuit of claim 1 wherein said control circuit, in response to said partially-decoded instruction information, completes the decoding on said partially-decoded instruction information and, thereby, provides indexes and disable bits, wherein said control circuit further comprises:
  an arithmetic logic unit (ALU) for each of the $2^m$ $2^n$:1 multiplexor circuits in said switch circuit, wherein said ALU adds an n-bit index addend to the m-bit physical address of each said $2^n$:1 multiplexor circuits, wherein said ALU comprises a plurality of ALU modules;
  a plurality of multiplexors logically coupled to said ALU and controlled by masks, wherein each of said multiplexors comprises a plurality of multiplexor (MUX) modules; and
  a plurality of decoders logically coupled to said plurality of multiplexors that generate said masks that control said multiplexors, wherein each of said decoders comprises a s-stage chain of NAND/NOR gates.

10. The control circuit of claim 9 wherein one type of said ALU modules comprises:
  a two input XOR gate; and
  a two input NOR gate, wherein the two inputs of said NOR gate are logically coupled to the two inputs of said XOR gate; and
wherein another type of said ALU modules comprises:
  a two input XNOR gate; and
  a two input NAND gate, wherein the two inputs of said XNOR gate are logically coupled to the two inputs of said NAND gate.

11. The control circuit of claim 9 wherein one type of said MUX modules comprises:
  a first two input NOR gate;
  a two input AND gate having its output logically coupled to the first input of said first NOR gate; and
  a second two input NOR gate (a) having its output logically coupled to the second input of said first NOR gate and (b) having an input logically coupled to an input of said AND gate; and
wherein another type of said MUX modules comprises:
  a first two input NAND gate;
  a two input OR gate having its output logically coupled to the first input of said first NAND gate; and
  a second two input NAND gate (a) having its output logically coupled to the second input of said first NAND gate and (b) having an input logically coupled to an input of said OR gate.

12. A cross-bar circuit that, in response to partially-decoded instruction information and in response to datapath information, (1) allows any bit from a $2^n$-bit input source word to be switched into any bit position of a $2^m$-bit output destination word and (2) provides the ability to set-to-zero any bit in said $2^m$-bit output destination word, said cross-bar circuit comprising:
  a switch circuit;
  a cache, wherein said cache (a) is logically coupled to said switch circuit and (b) is physically split into two halves, one half being above said switch circuit and the other half being below said switch circuit; and
  a control circuit, wherein said control circuit (a) is logically coupled to said switch circuit and to said cache and (b) is physically split into two halves, one half being above said switch circuit and the other half being below said switch circuit.

13. A switch circuit that (1) allows any bit from a $2^n$-bit input source word to be switched into any bit position of a $2^m$-bit output destination word independently of the switching control of all other bit positions of the output destination word and (2) provides the ability to set-to-zero any bit in said $2^m$-bit output destination word, said switch circuit comprising:
  $2^m$ $2^n$:1 multiplexor circuits, wherein each of said $2^n$:1 multiplexor circuits (a) has a unique n-bit index input and one disable input, (b) decodes an n-bit index received at said n-bit index input to select one bit from said $2^n$-bit input source word if a disable bit received at said disable input has a logic low value, and (c) outputs a logic low if said disable bit has a logic high value, wherein each of said $2^n$:1 multiplexor circuits has non-unique data inputs such that the same data inputs are applied to each of said $2^n$:1 multiplexor circuits.

* * * * *